(12) United States Patent
Fukagawa

(10) Patent No.: US 7,462,306 B2
(45) Date of Patent: Dec. 9, 2008

(54) CELLULOSE ACYLATE FILM, PROCESS FOR PRODUCING CELLULOSE ACYLATE FILM, POLARIZING PLATE AND LIQUID CRYSTAL DISPLAY DEVICE

(75) Inventor: Nobutaka Fukagawa, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 313 days.

(21) Appl. No.: 11/264,258

(22) Filed: Nov. 2, 2005

(65) Prior Publication Data

US 2006/0093759 A1 May 4, 2006

(30) Foreign Application Priority Data

Nov. 4, 2004 (JP) .............................. 2004-320683

(51) Int. Cl.
*B29D 7/01* (2006.01)
(52) U.S. Cl. ..................... 264/1.34; 264/217; 428/1.33; 428/1.54; 536/61
(58) Field of Classification Search .................. 428/1.1, 428/1.3, 1.31, 1.33, 1.54; 264/217, 1.34; 536/56, 58, 61
See application file for complete search history.

(56) References Cited

U.S. PATENT DOCUMENTS

2003/0020208 A1* 1/2003 Tasaka et al. ............... 264/217

2005/0106334 A1* 5/2005 Kubo et al. ................ 428/1.31

FOREIGN PATENT DOCUMENTS

| JP | 2000111914 A * | 4/2000 |
|----|----|----|
| JP | 2003-170492 | 6/2003 |
| JP | 2003-301049 | 10/2003 |
| WO | WO 02/101447 A1 * | 12/2002 |
| WO | WO 2004038477 A1 * | 5/2004 |

* cited by examiner

*Primary Examiner*—Keith D. Hendricks
*Assistant Examiner*—Sophie Hon
(74) *Attorney, Agent, or Firm*—Buchanan Ingersoll & Rooney PC

(57) ABSTRACT

A cellulose acylate film that has: an in-plane retardation Re and a retardation Rth in a thickness direction at a wavelength of 590 nm, which are satisfied with ranges of expressions (I) to (III); a coefficient of a thermal expansion of from 20 ppm/° C. to 100 ppm/° C.; and a haze of from 0.01 to 0.8, and a polarizing plate and a display device using the same.

| $20 \leq Re \leq 50$ | Expression (I) |
|---|---|
| $70 \leq Rth \leq 200$ | Expression (II) |
| $1.0 \leq Rth/Re \leq 3.0$ | Expression (III) |

In the foregoing expressions, each of Re and Rth is a value at 25° C. and 60% RH, and has a unit of nm.

24 Claims, 3 Drawing Sheets

CELLULOSE ACYLATE FILM, PROCESS FOR PRODUCING CELLULOSE ACYLATE FILM, POLARIZING PLATE AND LIQUID CRYSTAL DISPLAY DEVICE

BACKGROUND OF THE INVENTION

1. Field of the Invention

The present invention relates to a cellulose acylate film, a process for producing a cellulose acylate film, and a polarizing plate and a display device using the subject cellulose acylate film.

2. Description of the Related Art

In recent years, following an increase in the size of a liquid crystal display, the liquid crystal display is started to be used in new utilities such as a television set, and a demand for an image quality improvement becomes remarkably high. Above all, contrast and viewing angle dependency of color are a problem inherent to a liquid crystal display device and are a performance which is especially high in necessity for improvements.

For this reason, in addition to conventional TN modes, there have been proposed new liquid crystal modes such as IPS, VA and OCB modes. However, even in all of these liquid crystal modes, it is difficult to obtain sufficient contrast and viewing angle dependency by a liquid crystal cell alone. Thus, it is general to compensate bireflingence which the liquid cell has by some retardation film, thereby designing to improve the above-described characteristics.

Hitherto, a cellulose acylate film was used as a protective film for polarizing plate. In recent years, there is proposed a method of positively imparting retardation to this cellulose acylate film and using it as an optical compensating film. For example, JP-A-2003-170492 discloses a method for using a tenter-stretched cellulose acylate film as a retardation film of a VA type liquid crystal mode.

However, an existing cellulose acylate film suffers from a problem to be solved. Namely, its haze would be elevated with an increase in retardation and, as a result, the contrast of a liquid crystal display device is lowered.

As a countermeasure thereto, JP-A-2003-301049 discloses a method in which in a stretched cellulose acylate film having secondary particles having an average particle size of from 0.1 µm to 1.5 µm and containing primary fine particles having an average particle size of 0.001 µm or more but less than 0.1 µm, the content of additives in the neighborhood of the secondary particles is made larger than the average content of the additives in the film, thereby suppressing aggregation of the fine particles and reducing haze. However, this method is still insufficient in lowering haze and, therefore, should be further improved. However, in the cellulose acylate film, since its haze increases following stretching, there are involved problems that a lowering of the contrast is remarkable. Thus, improvements were required.

SUMMARY OF THE INVENTION

An object of the invention is to provide a liquid crystal display device which has high front contrast and small viewing angle dependency of contrast and which even upon lighting for a long period of time, can keep high image quality.

To elevate the retardation of a polymer film, it has been a common practice to employ two methods, i.e., (1) elevating the intrinsic birefringence of a polymer, and (2) elevating the orientation degree of the polymer. The present inventors have found out that, in the case of a cellulose acylate film, both of these two methods cause an increase in the haze.

To elevate the intrinsic birefringence of cellulose acylate, there have been employed two methods, i.e., lowering the degree of acylation and doping a compound having a high polarizability anisotropy (hereinafter referred to as a retardation exhibiting agent) in the film to thereby amplify the apparent intrinsic birefringence. However, the former method of lowering the degree of acylation promotes the aggregation of a dispersion of an inorganic compound such as silicon dioxide added as a matting agent and thus causes an increase in the haze. It is further found out that the latter method of adding a retardation exhibiting agent also suffers from a problem that the retardation exhibiting agent aggregates on the matting agent to cause an increase in the haze.

Moreover, there is a problem in the method of stretching at a high ratio to improve the orientation degree of a polymer. In the case of stretching at a small residual solvent content, the haze increases due to crazing in the film. In the case of stretching at a large residual solvent content, on the other hand, the haze increases too due to crystallization.

To overcome these problems, the present inventors have found out that high retardation can be imparted without increasing the haze by the following method, thereby completing the present invention. Accordingly, a matting agent and an additive are prevented from aggregation by adding cellulose acylate at a low concentration to at least one of a matting agent dispersion and an additive solution, mixing the matting agent dispersion with the additive solution and then with a dope solution immediately before casting, and, after the completion of casting, quickly drying the mixture. Furthermore, the aggregation of the additive is inhibited by (a) elevating the ratio of matting agent particles in the neighborhood of the film surface so as to allow the matting agent to effectively function, thereby lowering the addition level of the matting agent, and (b) shortening the contact time of the matting agent with other additive(s) in the solution state. To overcome the problem of crazing caused by stretching, the intrinsic birefringence is substantially elevated by using a high-performance retardation exhibiting agent to thereby exert the retardation at a low stretching ratio.

(1) A cellulose acylate film that has:

an in-plane retardation Re and a retardation Rth in a thickness direction at a wavelength of 590 nm, which are satisfied with ranges of expressions (I) to (III); and a haze of from 0.01 to 0.8:

$20 \leq Re \leq 50$  Expression (I)

$70 \leq Rth \leq 200$  Expression (II)

$1.0 \leq Rth/Re \leq 3.0$  Expression (III)

wherein each of Re and Rth is a value at 25° C. and 60% RH, and has a unit of nm.

(2) A cellulose acylate film that has:

an in-plane retardation Re and a retardation Rth in a thickness direction at a wavelength of 590 nm, which are satisfied with ranges of expressions (IV) to (VI); and a haze of from 0.01 to 0.8:

$50 \leq Re \leq 200$  Expression (IV)

$150 \leq Rth \leq 400$  Expression (V)

$2.0 \leq Rth/Re \leq 10.0$  Expression (VI)

wherein each of Re and Rth is a value at 25° C. and 60% RH, and has a unit of nm.

(3) The cellulose acylate film as described in (1) or (2) above that has a coefficient of thermal expansion of from 20 ppm/° C. to 100 ppm/° C.

(4) The cellulose acylate film as described in any of (1) to (3) above, which comprises:

an additive; and a matting agent having an average primary particle size of from 1 nm to 20 nm, wherein the matting agent has an average secondary particle size of from 0.05 μm to 1.05 μm.

(5) The cellulose acylate film as described in any of (1) to (4) above that has not more than 20 fine particles of 0.2μ to 3μ per 1 mm² when observed under a confocal laser scanning microscope.

(6) The cellulose acylate film as described in any of (1) to (5) above, which is obtained by a process comprising:

mixing an additive with a matting agent solution, so as to form a first mixture, wherein the first mixture comprises a cellulose acylate in a concentration of 0.01% by weight or more but less than 5% by weight;

mixing the first mixture with a dope solution comprising a cellulose acylate in a concentration of from 5% by weight to 35% by weight, so as to form a second mixture;

casting the second mixture, so as to form a film; and stretching the film in a ratio of from 1% to 100% in at least one of a conveyance direction and a widthwise direction.

(7) The cellulose acylate film as described in (6) above, wherein the additive to be preliminarily mixed with the matting agent is at least one member selected from the group consisting of an ultraviolet absorber, a plasticizer, a retardation exhibiting agent, a retardation lowering agent and a degradation preventing agent.

(8) A cellulose acylate film as described in any of (1) to (7) above that has a crystallization index represented by expression (A) of from 0.80 to 1.10:

Crystallization index=(X-ray diffraction intensity at 2θ of 27°)/(X-ray diffraction intensity at 2θ of 25°). (A)

(9) The cellulose acylate film as described in any of (1) to (8) above, which is produced by a process comprising:

casting a dope having a solid content of from 17% by weight to 25% by weight on a support; and drying, immediately after the casting by blowing an air stream at a speed of 1 m/min or above.

(10) The cellulose acylate film as described in any of (1) to (9) above, which is produced via a step wherein a drying temperature on a support and a flow rate are satisfied with a relationship:

[Average temperature of drying air (° C.)×Average flow rate of drying air (m/min)] in a first half of support>[Average temperature of drying air (° C.)×Average flow rate of drying air (m/min)] in a second half of support.

(11) The cellulose acylate film as described in any of (1) to (10) aobve, which is produced by a process comprising:

stretching at a temperature from (glass transition temperature of film with solvent content less than 0.5%−30° C.) to (glass transition temperature of film with solvent content less than 0.5%+10° C.) and a residual solvent content represented by a formula below of from 1% by weight to 30% by weight:

(Residual solvent content)=(Weight of solvent contained in film)/(Total film weight).

(12) The cellulose acylate film as described in any of (1) to (11) above that has an in-plane orientation degree, as determined by X-ray diffraction, of from 0.20 to 0.50.

(13) The cellulose acylate film as described in any of (1) to (12) above, which comprises a retardation exhibiting agent, wherein the retardation exhibiting agent is a rod-like retardation exhibiting agent represented by formula (B):

Ar¹-L¹-X-L²-Ar²  Formula (B)

wherein $Ar^1$ and $Ar^2$ each independently represents an aryl group or an aromatic hetero ring;

$L^1$ and $L^2$ each independently represents —C(=O)O— or —C(=O)NR—;

R represents a hydrogen atom or an alkyl group; and

X represents formula (2) or formula (3):

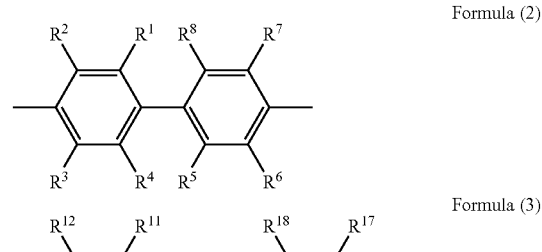

Formula (2)

Formula (3)

wherein $R^1$, $R^2$, $R^3$, $R^4$, $R^5$, $R^6$, $R^7$ and $R^8$ each independently represents a hydrogen atom or a substituent; and $R^{11}$, $R^{12}$, $R^{13}$, $R^{14}$, $R^{15}$, $R^{16}$, $R^{17}$ and $R^{18}$ each independently represents a hydrogen atom or a substituent.

(14) The cellulose acylate film as described in any of (1) to (12) above, which comprises a retardation exhibiting agent, wherein the retardation exhibiting agent is a rod-like retardation exhibiting agent represented by formula (4):

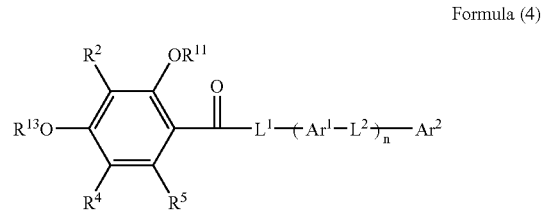

Formula (4)

wherein $R^2$, $R^4$ and $R^5$ each independently represents a hydrogen atom or a substituent;

$R^{11}$ and $R^{13}$ each independently represents a hydrogen atom or an alkyl group;

$L^1$ and $L^2$ each independently represents a single bond or a divalent linking group;

$Ar^1$ represents an arylene group or a divalent aromatic hetero ring;

$Ar^2$ represents an aryl group or a monovalent aromatic hetero ring; and n is an integer of 3 or more, provided that $L^2$'s and $Ar^1$'s in a plural number n may be either the same or different, $R^{11}$ and $R^{13}$ may be either the same or different, and an alkyl group represented by $R^{13}$ has no hetero atom.

(15) The cellulose acylate film as described in any of (1) to (14) above, wherein a cellulose acylate comprised in the cellulose acylate film is a cellulose acetate having a degree of acetylation of from 2.5 to 2.95.

(16) The cellulose acylate film as described in any of (1) to (14) above,
wherein a cellulose acylate comprised in the cellulose acylate film comprises an acetyl group and an acyl group having from 3 to 22 carbon atoms as acyl groups, and a degree of substitution A of the acetyl group and a degree of substitution B of the acyl group having from 3 to 22 carbon atoms are satisfied with ranges of expressions (VII) and (VII):

$$2.0 \leq (A+B) \leq 3.0 \qquad \text{Expression (VII)}$$

$$0.1 \leq A \leq 2.5 \qquad \text{Expression (VIII)}$$

(17) A process for producing a cellulose acylate film as described in any of (1) to (16) above, the process comprising:
mixing a retardation exhibiting agent solution comprising a retardation exhibiting agent with a matting agent solution, so as to form a first mixture, wherein the first mixture comprises a cellulose acylate in a concentration of 0.01% by weight or more but less than 5% by weight;
mixing the first mixture with a dope solution comprising a cellulose acylate in a concentration of from 5% by weight to 35% by weight, so as to form a second mixture;
casting the second mixture, so as to form a film; and
stretching the film in a ratio of from 1% to 100% in at least one of a conveyance direction and a widthwise direction.
(18) A polarizing plate comprising:
a polarizer; and
at least two protective films disposed on both sides of the polarizer,
wherein at least one of the at least two protective films is a cellulose acylate film as described in any of (1) to (16) above.
(19) A liquid crystal display device comprising:
a liquid crystal cell; and
two polarizing plates disposed on both sides of the liquid crystal cell,
wherein at least one of the two polarizing plates is a polarizing plate as described in (18) above.
(20) The liquid crystal display device as described in (19) above,
wherein the liquid crystal cell is a VA mode.

DETAILED DESCRIPTION OF THE INVENTION

Figure 1A:
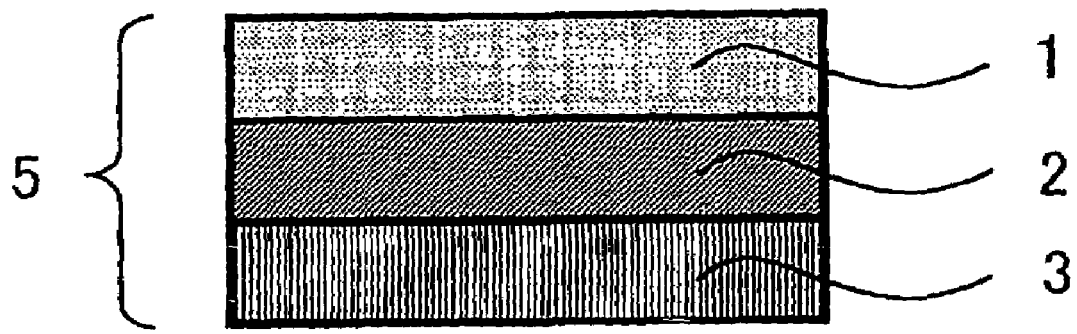
FIG. 1 is one example of a construction of the polarizing plate of the invention complexed with a functional optical film.

The invention will be hereunder described in detail.

(Cellulose Acylate)
First of all, the cellulose acylate of the invention will be described.
The degree of substitution of the cellulose acylate means a proportion at which three hydroxyl groups present in a constitutional unit (a glucose group which undergoes β1→4 glycoside bonding) of a cellulose is acylated. The degree of substitution can be calculated by measuring the amount of a bonded fatty acid per the weight of the constitutional unit of a cellulose. The measurement method is carried out according to ASTM-D817-91.

The cellulose acylate of the invention is preferably cellulose acetate having a degree of acetylation of from 2.5 to 2.95. The degree of acetylation is more preferably from 2.6 to 2.85.
Furthermore, it is preferred to use cellulose acetate having a rate of substitution at the 6-position represented by the expression (A) of 0.31 or more and a total degree of substitution of not more than 2.85.

$$\text{(Rate of substitution at the 6-position)} = \text{(Degree of substitution at the 6-position)}/[\text{(Degree of substitution at the 2-position)} + \text{(Degree of substitution at the 3-position)} + \text{(Degree of substitution at the 6-position)}] \qquad \text{Expression (A)}$$

In addition, another preferred cellulose acylate of the invention is one which contains, as acyl groups, an acetyl group and an acyl group having from 3 to 22 carbon atoms and in which a degree of substitution A of the acetyl group and a degree of substitution B of the acyl group having from 3 to 22 carbon atoms are satisfied with the following expressions (VII) and (VIII).

$$2.0 \leq (A+B) \leq 3.0 \qquad \text{Expression (VII)}$$

$$0.1 \leq A \leq 2.5 \qquad \text{Expression (VIII)}$$

(A+B) is more preferably from 2.2 to 2.95. Furthermore, A is more preferably from 1.0 to 2.2. The acyl group having from 3 to 22 carbon atoms is preferably a propionyl group or a butyryl group.
The cellulose acylate of the invention preferably has a weight average polymerization degree of from 250 to 800, and more preferably from 300 to 600. The cellulose acylate of the invention preferably has a number average molecular weight of from 70,000 to 230,000, more preferably from 75,000 to 230,000, and most preferably from 78,000 to 120,000.
The cellulose acylate of the invention can be synthesized by using an acid anhydride or an acid chloride as an acylating agent. When the acylating agent is an acid anhydride, an organic acid (for example, acetic acid) or methylene chloride is used as a reaction solvent. A protonic catalyst such as sulfuric acid is used as a catalyst. When the acylating agent is an acid chloride, a basic compound is used as a catalyst. In the most general synthesis method from the industrial standpoint, a cellulose is esterified with a mixed organic acid component containing an organic acid corresponding to the acetyl group and other acyl group (for example, acetic acid, propionic acid, and butyric acid) or an acid anhydride thereof (for example, acetic anhydride, propionic anhydride, and butyric anhydride), thereby synthesizing a cellulose ester. In this method, in many cases, a cellulose such as cotton linter and wood pulp is activated with an organic acid such as acetic acid and then esterified using a mixed liquid of the foregoing organic acid component in the presence of a sulfuric acid catalyst. The organic acid anhydride component is in general used in an excessive amount against the amount of the hydroxyl groups present in the cellulose. In this esterification treatment, a hydrolysis reaction (depolymerization reaction) of the cellulose principal chain (β1→4 glycoside bond) proceeds in addition to the esterification reaction. When the hydrolysis reaction of the principal chain proceeds, the degree of polymerization of the cellulose ester is lowered, whereby physical properties of the cellulose ester as produced is lowered. For that reason, it is preferable that the reaction condition such as reaction temperature is determined while taking into consideration the degree of polymerization and molecular weight of the cellulose ester to be obtained.
In order to obtain a cellulose ester having a high degree of polymerization (high molecular weight), it is important to regulate the maximum temperature in the esterification reaction step at not higher than 50° C. The maximum temperature is regulated preferably at from 35 to 50° C., and more preferably at from 37 to 47° C. When the reaction temperature is lower than 35° C., the esterification reaction may possibly not proceed smoothly. When the reaction temperature exceeds 50° C., the degree of polymerization of the cellulose ester is liable to be lowered. After the esterification reaction, by stopping the reaction while suppressing the temperature rise, a lowering of the degree of polymerization can be further suppressed, and a cellulose ester having a high degree of polymerization can be synthesized. That is, when a reaction stopping agent (for example, water and acetic acid) is added after completion of the reaction, the excessive acid anhydride which has not contributed to the esterification reaction is hydrolyzed to form a corresponding organic acid as a by-product. This hydrolysis reaction is accompanied with vigorous heat generation so that the temperature within a reaction device increases. When the rate of addition of the reaction stopping agent is high, a cooling capacity of the reaction device is exceeded so that the heat generation abruptly occurs. For that reason, the hydrolysis reaction of the cellulose principal chain markedly proceeds, whereby the degree of polymerization of the resulting cellulose ester is lowered. Furthermore, a part of the catalyst is coupled with the cellulose during the esterification reaction, and the major part thereof is dissociated from the cellulose during the addition of the reaction stopping agent. However, when the rate of addition of the reaction stopping agent is high, the reaction time for dissociating the catalyst is not sufficient so that a part of the catalyst remains in the coupled state with the cellulose. A cellulose ester in which a strong acid catalyst is partially coupled is very poor in stability so that it is readily decomposed by heat at the time of drying of a product or the like, leading to a lowering of the degree of polymerization. For these reasons, it is desired that after the esterification reaction, the reaction stopping agent is added preferably for 4 minutes or more, and more preferably for from 4 to 30 minutes, thereby stopping the reaction. Incidentally, when the time of addition of the reaction stopping agent exceeds 30 minutes, the industrial productivity is lowered. In general, water or an alcohol capable of decomposing the acid anhydride is used as the reaction stopping agent. However, in the invention, in order to avoid the deposition of a triester having low solubility in various organic solvents, a mixture of water and an organic acid is preferably used as the reaction stopping agent. When the esterification reaction is carried out under the foregoing condition, a cellulose ester with high molecular weight having a weight average polymerization degree of 500 or more can be easily synthesized.

It is preferable that in the cellulose acylate film of the invention, the polymer component constituting the film is substantially made of a cellulose acylate having the foregoing definition. It is meant by the term "substantially" as referred to herein that the cellulose acylate accounts for 55% by weight or more (preferably 70% by weight or more, and more preferably 80% by weight or more) of the polymer component. A raw material for producing the film is preferably a granular shape of the cellulose acylate. It is preferable that 90% by weight or more of the particles to be used has a particle size of from 0.5 to 5 mm. Furthermore, it is preferable that 50% by weight or more of the particles to be used has a particle size of from 1 to 4 mm. It is preferable that the cellulose acylate particle has a shape close to a sphere as far as possible.

In the cellulose acylate film of the invention, it is preferred to mix a retardation exhibiting agent solution and a matting agent solution in a state that the cellulose acylate concentration is 0.01% by weight or more but less than 5% by weight and casting a liquid having mixed therewith a solution having a cellulose acylate concentration of from 5% by weight to 35% by weight.

As the retardation exhibiting agent, a compound having a molecular weight of from 200 to 2,000 and a log P of 2 or more (wherein P represents an octanol water partition coefficient) is preferable because an effect for suppressing the aggregation of a matting agent dispersion is large.

The molecular weight is more preferably 250 to 1,500. The log P is more preferably 4 or more. As the additive as described above, use can be made of a compound having a function as a retardation exhibiting agent, a plasticizer, an ultraviolet light absorber, a retardation lowering agent, a degradation preventing agent or the like.

It is preferable to use a retardation exhibiting agent in the cellulose acylate film of the invention. By substantially improving the intrinsic birefringence of the film by the addition of the retardation exhibiting agent, a high Re can be exhibited at a low stretching ratio and, in its turn, lowering in the haze and exhibition of high retardation can be both established.

The retardation exhibiting agent which is used in the invention will be hereunder described in detail.

(Retardation Exhibiting Agent)

As a preferred example of the retardation exhibiting agent of the invention, a compound represented by the following formula (1) is enumerated. Such a compound will be hereunder described in detail.

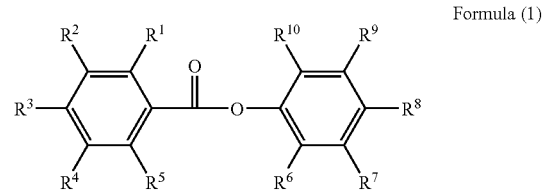

Formula (1)

In the formula (1), $R^1$ to $R^7$, and $R^9$ and $R^{10}$ each independently represents a hydrogen atom or a substituent; and $R^8$ represents a hydrogen atom, an alkyl group having from 1 to 4 carbon atoms, an alkenyl group having from 2 to 6 carbon atoms, an alkynyl group having from 2 to 6 carbon atoms, an aryl group having from 6 to 12 carbon atoms, an alkoxy group having from 1 to 12 carbon atoms, an aryloxy group having from 6 to 12 carbon atoms, an alkoxycarbonyl group having from 2 to 12 carbon atoms, an acylamino having from 2 to 12 carbon atoms, a cyano group, or a halogen atom, and these groups may have a substituent. As the substituent which $R^1$ to $R^{10}$ may each have, a substituent T as described later can be applied.

At least one of $R^1$ to $R^5$ represents an electron donating group. It is preferable that one of $R^1$, $R^3$ and $R^5$ is an electron donating group; and it is more preferable that $R^3$ is an electron donating group.

The "electron donating group" as referred to herein means a group whose Hammett's σp value is 0 or a negative value. A group whose Hammett's σp value as described in *Chem. Rev.*, 91, 165 (1991) is 0 or a negative value can be preferably applied, and a group having a Hammett's σp value of from −0.85 to 0 is more preferably used. Examples thereof include an alkyl group, an alkoxy group, an amino group, and a hydroxyl group.

The electron donating group is preferably an alkyl group or an alkoxy group, and more preferably an alkoxy group (preferably having from 1 to 12 carbon atoms, more preferably from 1 to 8 carbon atoms, further preferably from 1 to 6 carbon atoms, and especially preferably from 1 to 4 carbon atoms).

$R^1$ is preferably a hydrogen atom or an electron donating group; more preferably an alkyl group, an alkoxy group, an amino group, or a hydroxyl group; further preferably an alkyl group having from 1 to 4 carbon atoms or an alkoxy group having from 1 to 12 carbon atoms; especially preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and most preferably a methoxy group.

$R^2$ is preferably a hydrogen atom, an alkyl group, an alkoxy group, an amino group, or a hydroxyl group; more preferably a hydrogen atom, an alkyl group, or an alkoxy group; further preferably a hydrogen atom, an alkyl group (preferably having from 1 to 4 carbon atoms, and more preferably a methyl group), or an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a hydrogen atom, a methyl group, or a methoxy group.

$R^3$ is preferably a hydrogen atom or an electron donating group; more preferably a hydrogen atom, an alkyl group, an alkoxy group, an amino group, or a hydroxyl group; further preferably an alkyl group or an alkoxy group; especially preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and most preferably an n-propoxy group, an ethoxy group, or a methoxy group.

$R^4$ is preferably a hydrogen atom or an electron donating group; more preferably a hydrogen atom, an alkyl group, an alkoxy group, an amino group, or a hydroxyl group; further preferably a hydrogen atom, an alkyl group having from 1 to 4 carbon atoms, or an alkoxy group having from 1 to 12 carbon atoms (preferably having from 1 to 12 carbon atoms, more preferably from 1 to 8 carbon atoms, further preferably from 1 to 6 carbon atoms, and especially preferably from 1 to 4 carbon atoms); especially preferably a hydrogen atom, an alkyl group having from 1 to 4 carbon atoms, or an alkoxy group having from 1 to 4 carbon atoms; and most preferably a hydrogen atom, a methyl group, or methoxy group.

A preferred group of $R^5$ is the same as enumerated in $R^2$.

$R^6$, $R^7$, $R^9$, and $R^{10}$ are each preferably a hydrogen atom, an alkyl group having from 1 to 12 carbon atoms, an alkoxy group having from 1 to 12 carbon atoms, or a halogen atom; more preferably a hydrogen atom or a halogen atom; and further preferably a hydrogen atom.

$R^8$ represents a hydrogen atom, an alkyl group having from 1 to 4 carbon atoms, an alkenyl group having from 2 to 6 carbon atoms, an alkynyl group having from 2 to 6 carbon atoms, an aryl group having from 6 to 12 carbon atoms, an alkoxy group having from 1 to 12 carbon atoms, an aryloxy group having from 6 to 12 carbon atoms, an alkoxycarbonyl group having from 2 to 12 carbon atoms, an acylamino group having from 2 to 12 carbon atoms, a cyano group, or a halogen atom. If possible, $R^8$ may have a substituent, and a substituent T as described later can be applied as the substituent.

$R^8$ is preferably an alkyl group having from 1 to 4 carbon atoms, an alkynyl group having from 2 to 12 carbon atoms, an aryl group having from 6 to 12 carbon atoms, an alkoxy group having from 1 to 12 carbon atoms, an alkoxycarbonyl group having from 2 to 12 carbon atoms, an acylamino group having from 2 to 12 carbon atoms, or a cyano group; more preferably an alkynyl group having from 2 to 12 carbon atoms, an aryl group having from 6 to 12 carbon atoms, an alkoxycarbonyl group having from 2 to 12 carbon atoms, an acylamino group having from 2 to 12 carbon atoms, or a cyano group; further preferably an alkynyl group having from 2 to 7 carbon atoms, an aryl group having from 6 to 12 carbon atoms, an alkoxycarbonyl group having from 2 to 6 carbon atoms, an acylamino group having form 2 to 7 carbon atoms, or a cyano group; and especially preferably a phenylethynyl group, a phenyl group, a p-cyanophenyl group, a p-methoxyphenyl group, a benzoylamino group, an n-propoxycarbonyl group, an ethoxycarbonyl group, a methoxycarbonyl group, or a cyano group.

In the formula (1), the following formula (1-A) is more preferable.

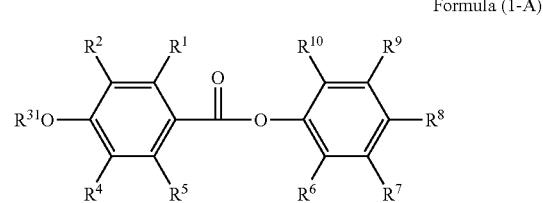

Formula (1-A)

In the formula (1-A), $R^1$, $R^2$, $R^3$, $R^4$, $R^5$, $R^6$, $R^7$, $R^8$, $R^9$, and $R^{10}$ are synonymous with those in the formula (1), respectively, and preferred ranges are also the same.

In the formula (1-A), $R^{31}$ represents an alkyl group, and the alkyl group represented by $R^{31}$ may be linear or branched and may further have a substituent. $R^{31}$ is preferably an alkyl group having from 1 to 12 carbon atoms; more preferably an alkyl group having from 1 to 8 carbon atoms; further preferably an alkyl group having from 1 to 6 carbon atoms; and especially preferably an alkyl group having from 1 to 4 carbon atoms (for example, a methyl group, an ethyl group, an n-propyl group, an iso-propyl group, an n-butyl group, an iso-butyl group, and a tert-butyl group).

In the formula (1), the following formula (1-B) is more preferable.

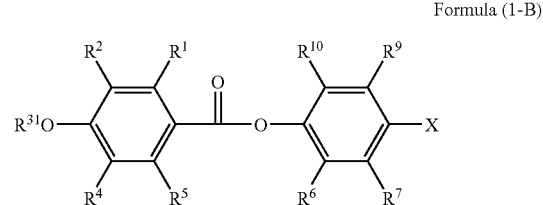

Formula (1-B)

In the formula (1-B), $R^1$, $R^2$, $R^3$, $R^4$, $R^5$, $R^6$, $R^7$, $R^9$, and $R^{10}$ are synonymous with those in the formula (1), respectively, and preferred ranges are also the same.

In the formula (1-B), $R^{31}$ is synonymous with one in the formula (1-A), and a preferred range is also the same.

In the formula (1-B), X represents an alkyl group having from 1 to 4 carbon atoms, an alkynyl group having from 2 to 6 carbon atoms, an aryl group having from 6 to 12 carbon atoms, an alkoxy group having from 1 to 12 carbon atoms, an aryloxy group having from 6 to 12 carbon atoms, an alkoxycarbonyl group having from 2 to 12 carbon atoms, an acylamino group having from 2 to 12 carbon atoms, a carbonyl group, a cyano group, or a halogen atom.

When all of $R^1$, $R^2$, $R^4$, and $R^5$ are a hydrogen atom, X is preferably an alkyl group, an alkynyl group, an aryl group, an alkoxy group, or an aryloxy group; more preferably an aryl group, an alkoxy group, or an aryloxy group; further preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a methoxy group, an ethoxy group, an n-propoxy group, an iso-propoxy group, or an n-butoxy group.

When at least one of $R^1$, $R^2$, $R^4$, and $R^5$ is a substituent, X is preferably an alkynyl group having from 2 to 12 carbon atoms, an aryl group having from 6 to 12 carbon atoms, an alkoxycarbonyl group having from 2 to 12 carbon atoms, an acylamino group having from 2 to 12 carbon atoms, or a cyano group; more preferably an alkynyl group having from 2 to 7 carbon atoms, an aryl group having from 6 to 12 carbon atoms, an alkoxycarbonyl group having from 2 to 6 carbon atoms, an acylamino group having from 2 to 7 carbon atoms, or a cyano group; and especially preferably a phenylethynyl group, a phenyl group, a p-cyanophenyl group, a p-methoxyphenyl group, a benzoylamino group, an n-propoxycarbonyl group, an ethoxycarbonyl group, a methoxycarbonyl group, or a cyano group.

In the formula (1), the following formula (1-C) is further preferable.

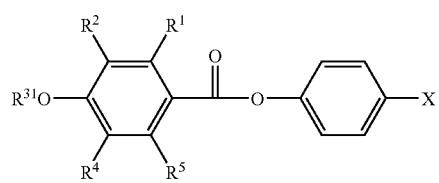

Formula (1-C)

In the formula (1-C), $R^1$, $R^2$, $R^4$, $R^5$, and $R^{31}$ are synonymous with those in the formula (1-B), respectively, and preferred ranges are also the same.

Of the compounds represented by the formula (1), a compound represented by the following formula (1-D) is preferable.

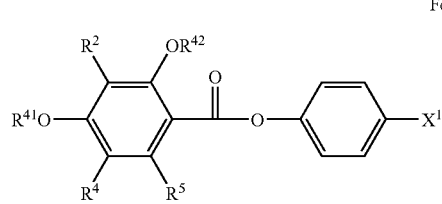

Formula (1-D)

In the formula (1-D), $R^2$, $R^4$, and $R^5$ are synonymous with those in the formula (1-C), respectively, and preferred ranges are also the same. $R^{41}$ and $R^{42}$ each independently represents an alkyl group having from 1 to 4 carbon atoms. $X^1$ represents an alkynyl group having from 2 to 7 carbon atoms, an aryl group having from 6 to 12 carbon atoms, an alkoxycarbonyl group having from 2 to 6 carbon atoms, an acylamino group having from 2 to 7 carbon atoms, or a cyano group.

$R^{41}$ represents an alkyl group having from 1 to 4 carbon atoms; preferably an alkyl group having from 1 to 3 carbon atoms; and more preferably an ethyl group or a methyl group.

$R^{42}$ represents an alkyl group having from 1 to 4 carbon atoms; preferably an alkyl group having from 1 to 3 carbon atoms; more preferably an ethyl group or a methyl group; and further preferably a methyl group.

$X^1$ represents an alkynyl group having from 2 to 7 carbon atoms, an aryl group having from 6 to 12 carbon atoms, an alkoxycarbonyl group having from 2 to 6 carbon atoms, an acylamino group having from 2 to 7 carbon atoms, or a cyano group; and preferably a phenylethynyl group, a phenyl group, a p-cyanophenyl group, a p-methoxyphenyl group, a benzoylamino group, an n-propoxycarbonyl group, an ethoxycarbonyl group, a methoxycarbonyl group, or a cyano group.

In the formula (1), the following formula (1-E) is the most preferable.

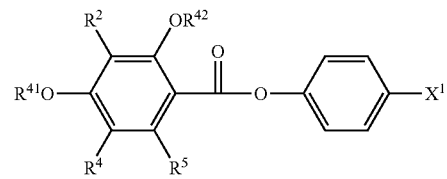

Formula (1-E)

In the formula (1-E), $R^2$, $R^4$, and $R^5$ are synonymous with those in the formula (1-D), respectively, and preferred ranges are also the same, provided that one of $R^2$, $R^4$, and $R^5$ is a group represented by —$OR^{13}$ (wherein $R^{13}$ represents an alkyl group having from 1 to 4 carbon atoms); and $R^{41}$, $R^{42}$, and $X^1$ are synonymous with those in the formula (1-D), respectively, and preferred ranges are also the same.

Preferably, $R^4$ and $R^5$ are each a group represented by —$OR^{13}$; and more preferably, $R^4$ is a group represented by —$OR^{13}$.

$R^{13}$ represents an alkyl group having from 1 to 4 carbon atoms; preferably an alkyl group having from 1 to 3 carbon atoms; more preferably an ethyl group or a methyl group; and further preferably a methyl group.

The foregoing substituent T will be hereunder described.

Examples of the substituent T include an alkyl group (preferably having from 1 to 20 carbon atoms, more preferably from 1 to 12 carbon atoms, and especially preferably from 1 to 8 carbon atoms; for example, a methyl group, an ethyl group, an iso-propyl group, a tert-butyl group, an n-octyl group, an n-decyl group, an n-hexadecyl group, a cyclopropyl group, a cyclopentyl group, and a cyclohexyl group), an alkenyl group (preferably having from 2 to 20 carbon atoms, more preferably from 2 to 12 carbon atoms, and especially preferably from 2 to 8 carbon atoms; for example, a vinyl group, an allyl group, a 2-butenyl group, and a 3-pentenyl group), an alkynyl group (preferably having from 2 to 20 carbon atoms, more preferably from 2 to 12 carbon atoms, and especially preferably from 2 to 8 carbon atoms; for example, a propargyl group and a 3-pentynyl group), an aryl group (preferably having from 6 to 30 carbon atoms, more preferably from 6 to 20 carbon atoms, and especially preferably from 6 to 12 carbon atoms; for example, a phenyl group, a p-methylphenyl group, and a naphthyl group), a substituted or unsubstituted amino group (preferably having from 0 to 20 carbon atoms, more preferably from 0 to 10 carbon atoms, and especially preferably from 0 to 6 carbon atoms; for example, an amino group, a methylamino group, a dimethylamino group, a diethylamino group, and a dibenzylamino group), an alkoxy group (preferably having from 1 to 20 carbon atoms, more preferably from 1 to 12 carbon atoms, and especially preferably from 1 to 8 carbon atoms; for example, a methoxy group, an ethoxy group, and a butoxy group), an aryloxy group (preferably having from 6 to 20 carbon atoms, more preferably from 6 to 16 carbon atoms, and especially from 6 to 12 carbon atoms; for example, a phenyloxy group and a 2-naphthyloxy group), an acyl group (preferably having from 1 to 20 carbon atoms, more preferably from 1 to 16 carbon atoms, and especially preferably from 1 to 12 carbon atoms; for example, an acetyl group, a benzoyl group, a formyl group, and a pivaloyl group), an alkoxycarbonyl group (preferably having from 2 to 20 carbon atoms, more preferably from 2 to 16 carbon atoms, and especially preferably from 2 to 12 carbon atoms; for example, a methoxycarbonyl group and an ethoxycarbonyl group), an aryloxycarbonyl group (preferably having from 7 to 20 carbon atoms, more preferably from 7 to 16 carbon atoms, and especially preferably from 7 to 10 carbon atoms; for example, a phenyloxycarbonyl group), an acyloxy group (preferably having from 2 to 20 carbon atoms, more preferably from 2 to 16 carbon atoms, and especially preferably from 2 to 10 carbon atoms; for example, an acetoxy group and a benzoyloxy group), an acylamino group (preferably having from 2 to 20 carbon atoms, more preferably from 2 to 16 carbon atoms, and especially preferably from 2 to 10 carbon atoms; for example, an acetylamino group and a benzoylamino group), an alkoxycarbonylamino group (preferably having from 2 to 20 carbon atoms, more preferably from 2 to 16 carbon atoms, and especially preferably from 2 to 12 carbon atoms; for example, a methoxycarbonylamino group), an aryloxycarbonylamino group (preferably having from 7 to 20 carbon atoms, more preferably from 7 to 16 carbon atoms, and especially preferably from 7 to 12 carbon atoms; for example, a phenyloxycarbonylamino group), a sulfonylamino group (preferably having from 1 to 20 carbon atoms, more preferably from 1 to 16 carbon atoms, and especially preferably from 1 to 12 carbon atoms; for example, a methanesulfonylamino group and a benzenesulfonylamino group), a sulfamoyl group (preferably having from 0 to 20 carbon atoms, more preferably from 0 to 16 carbon atoms, and especially preferably from 0 to 12 carbon atoms; for example, a sulfamoyl group, a methylsulfamoyl group, a dimethylsulfamoyl group, and a phenylsulfamoyl group), a carbamoyl group (preferably having from 1 to 20 carbon atoms, more preferably from 1 to 16 carbon atoms, and especially preferably from 1 to 12 carbon atoms; for example, a carbamoyl group, a methylcarbamoyl group, a diethylcarbamoyl group, and a phenylcabamoyl group), an alkylthio group (preferably having from 1 to 20 carbon atoms, more preferably from 1 to 16 carbon atoms, and especially preferably from 1 to 12 carbon atoms; for example, a methylthio group and an ethylthio group), an artylthio group (preferably having from 6 to 20 carbon atoms, more preferably from 6 to 16 carbon atoms, and especially preferably from 6 to 12 carbon atoms; for example, a phenylthio group), an alkylsulfonyl group or an arylsulfonyl group (preferably having from 1 to 20 carbon atoms, more preferably from 1 to 16 carbon atoms, and especially preferably from 1 to 12 carbon atoms; for example, a mesyl group and a tosyl group); an alkylsulfinyl group (preferably having from 1 to 20 carbon atoms, more preferably from 1 to 16 carbon atoms, and especially preferably from 1 to 12 carbon atoms; for example, a methanesulfinyl group and a benzenesulfinyl group), a ureido group (preferably having from 1 to 20 carbon atoms, more preferably from 1 to 16 carbon atoms, and especially preferably from 1 to 12 carbon atoms; for example, a ureido group, a methylureido group, and a phenylureido group), a phosphoric acid amide group (preferably having from 1 to 20 carbon atoms, more preferably from 1 to 16 carbon atoms, and especially preferably from 1 to 12 carbon atoms; for example, a diethylphosphoric acid amide group and a phenylphosphoric acid amide group), a hydroxyl group, a mercapto group, a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, and more preferably from 1 to 12 carbon atoms; examples of the hetero atom include a nitrogen atom, an oxygen atom, and a sulfur atom; and specific examples of the heterocyclic group include an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably having from 3 to 40 carbon atoms, more preferably from 3 to 30 carbon atoms, and especially preferably from 3 to 24 carbon atoms; for example, a trimethylsilyl group and a triphenylsilyl group). These substituents may be further substituted.

Furthermore, when two or more substituents are present, these substituents may be the same or different. Moreover, if possible, the substituents may be taken together to form a ring.

Specific examples of the compound represented by the formula (1) will be given below, but it should be construed that the invention is not limited to these specific examples at all.

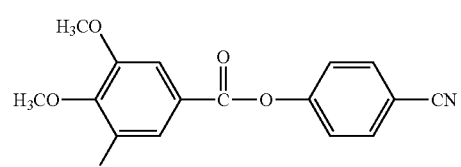

A-1

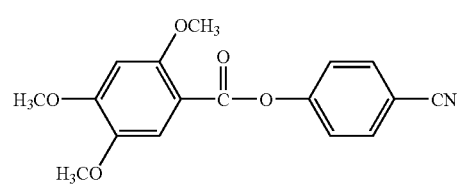

A-2

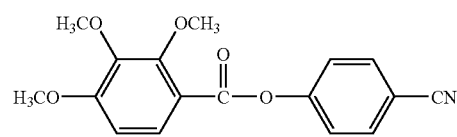

A-3

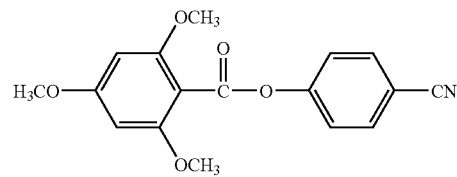

A-4

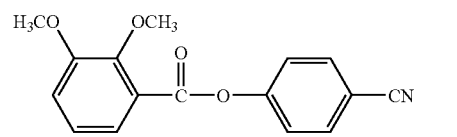

A-5

-continued
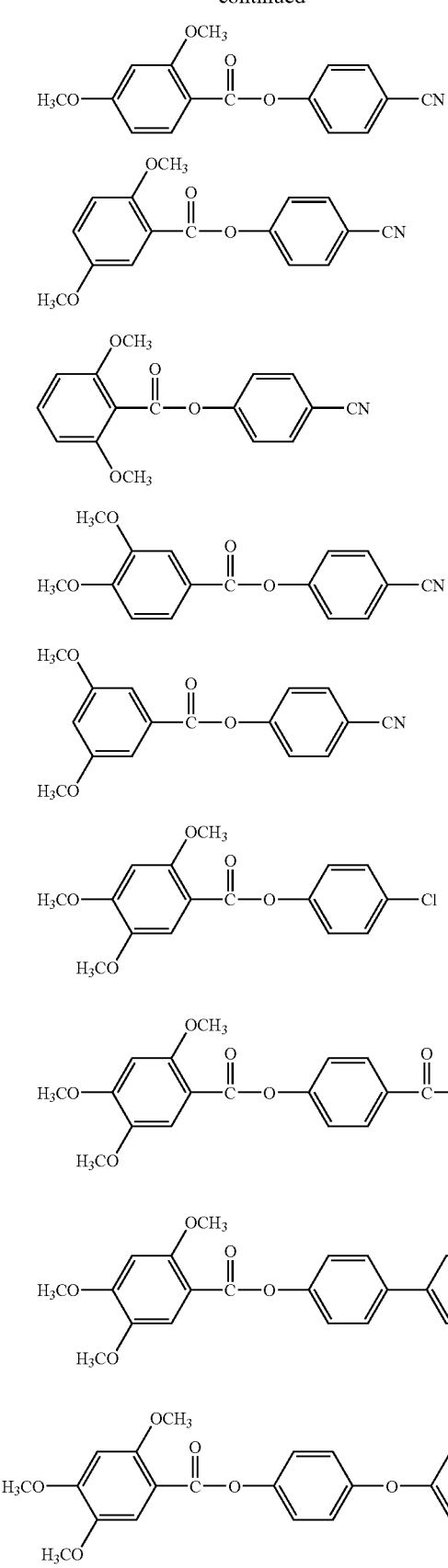
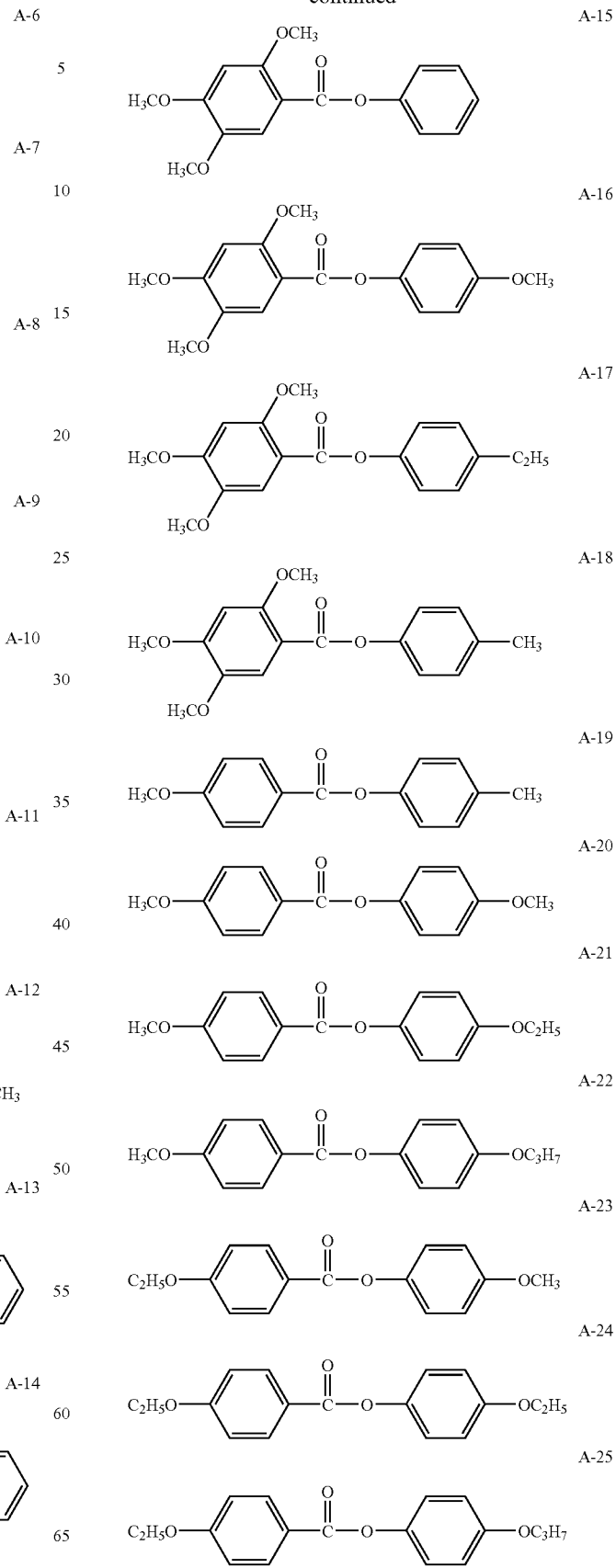

-continued
A-26
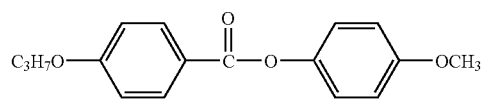
A-27
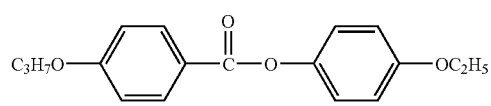
A-28
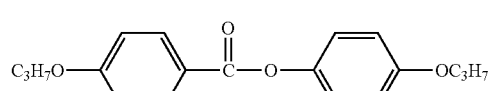
A-29
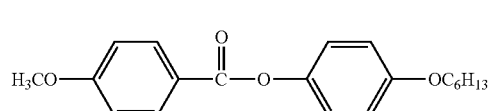
A-30
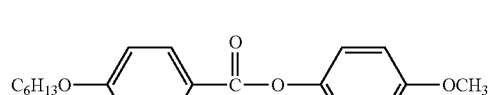
A-31
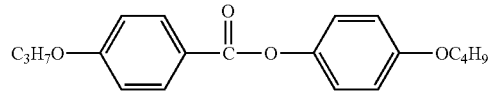
A-32
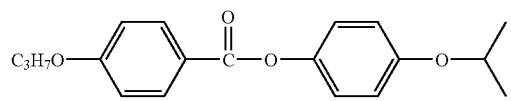
A-33
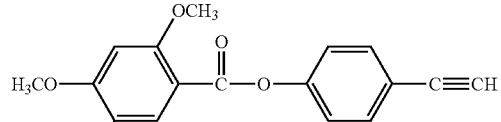
A-34
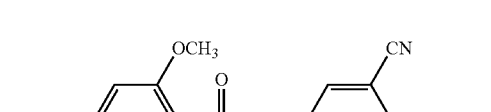
A-35
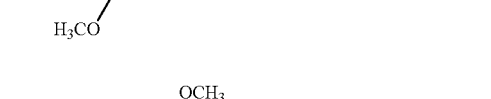
-continued
A-36
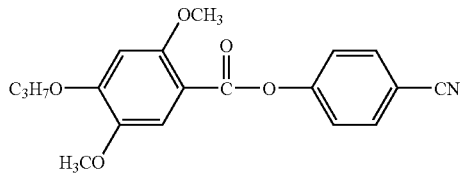
A-37
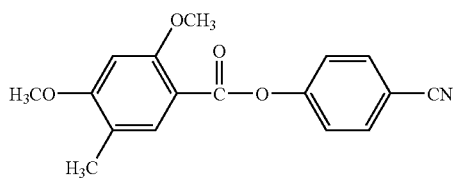
A-38
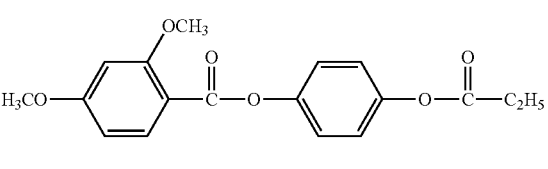
A-39
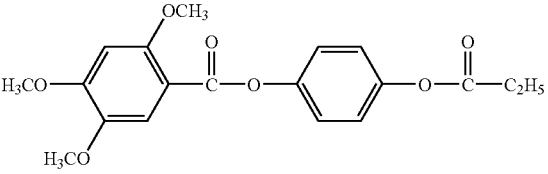
A-40
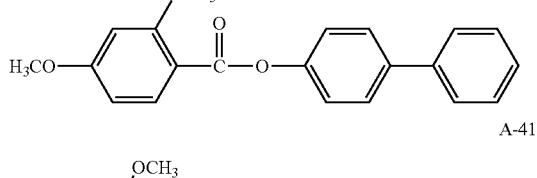
A-41
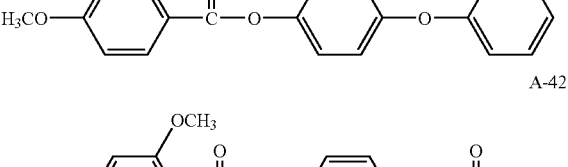
A-42
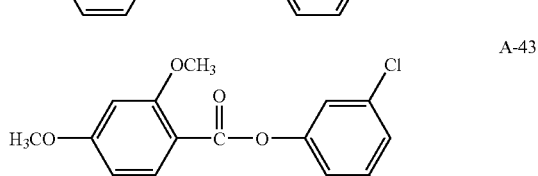
A-43
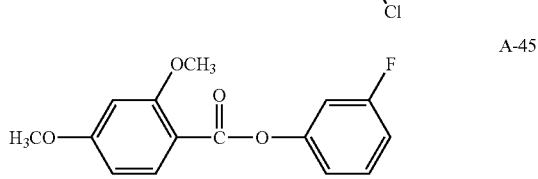
A-45

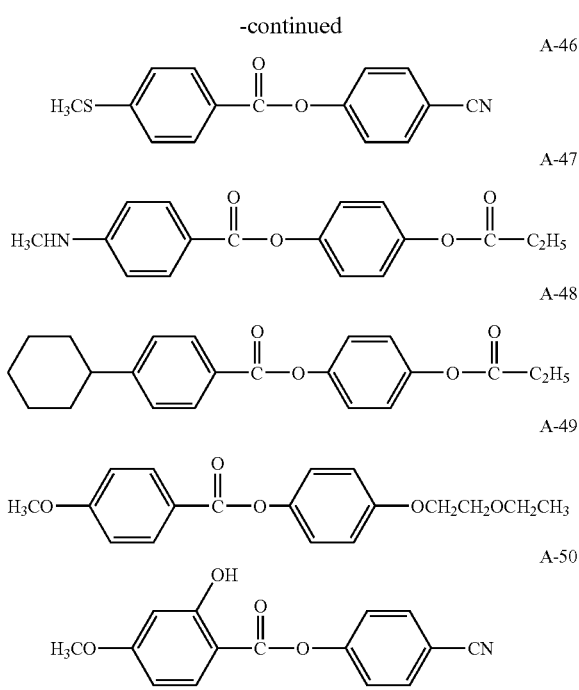

The compound represented by the formula (1) of the invention can be synthesized by a general esterification reaction between a substituted benzoic acid and a phenol derivative, and any reaction may be employed so far as it is an ester bond-forming reaction. Examples thereof include a method for subjecting a substituted benzoic acid to functional group conversion into an acid halide and then condensing with phenol and a method for dehydrating and condensing a substituted benzoic acid and a phenol derivative using a condensing agent or a catalyst.

When a production process and the like are taken into consideration, a method for subjecting a substituted benzoic acid to functional group conversion into an acid halide and then condensing with phenol is preferable.

As a reaction solvent, a hydrocarbon based solvent (preferably toluene and xylene), an ether based solvent (preferably dimethyl ether, tetrahydrofuran, and dioxane), a ketone based solvent, an ester based solvent, acetonitrile, dimethylformamide, dimethylacetamide, and the like can be used. These solvents may be used singly or in admixture of several kinds thereof. Of these, toluene, acetonitrile, dimethylformamide, and dimethylacetamide are preferable as the reaction solvent.

The reaction temperature is preferably from 0 to 150° C., more preferably from 0 to 100° C., further preferably from 0 to 90° C., and especially preferably from 20° C. to 90° C.

It is preferable that a base is not used in the present reaction. When a base is used, any of an organic base and an inorganic base is employable, and an organic base is preferable. Examples thereof include pyridine and tertiary alkylamines (preferably triethylamine and ethyldiisopropylamine).

The synthesis method of the compound of the invention will be specifically described below, but it should be construed that the invention is not limited to the following specific examples at all.

SYNTHESIS EXAMPLE 1

Synthesis of Illustrative Compound A-1

24.6 g (0.116 moles) of 3,4,5-trimethoxybenzoic acid, 100 mL of toluene, and 1 mL of N,N-dimethylformamide were heated at 60° C., 15.2 g (0.127 moles) of thionyl chloride was then added dropwise step by step, and the mixture was heated at 60° C. for 2 hours. Thereafter, a solution of 15.1 g (0.127 moles) of 4-cyanophenol previously dissolved in 50 mL of acetonitrile was added dropwise step by step, and after completion of the dropwise addition, the mixture was stirred upon heating at 60° C. for 3 hours. The reaction mixture was cooled to room temperature and then subjected to a liquid separation operation with ethyl acetate and water. Water was removed from the resulting organic phase by using sodium sulfate, and the solvent was then distilled off in vacuo. 100 mL of acetonitrile was added to the resulting solid, and the mixture was subjected to a recrystallization operation. The acetonitrile solution was cooled to room temperature, and a deposited crystal was recovered by filtration to obtain 11.0 g (yield: 11%) of a targeted compound as a white crystal. Incidentally, the compound was identified by $^1$H-NMR (400 MHz) and mass spectrum analysis.

$^1$H-NMR (CDCl$_3$) δ3.50 (br, 9H), 7.37 (d, 2H), 7.45 (s, 2H), 7.77 (s, 2H) Mass spectrum: m/z 314 (M+H)$^+$ The resulting compound had a melting point of 172 to 173° C.

SYNTHESIS EXAMPLE 2

Synthesis of Illustrative Compound A-2

106.1 g (0.5 moles) of 2,4,5-trimethoxybenzoic acid, 340 mL of toluene, and 1 mL of dimethylformamide were heated at 60° C., 65.4 g (0.55 moles) of thionyl chloride was then added dropwise step by step, and the mixture was heated at 65 to 70° C. for 2 hours. Thereafter, a solution of 71.5 g (0.6 moles) of 4-cyanophenol previously dissolved in 150 mL of acetonitrile was added dropwise step by step, and after completion of the dropwise addition, the mixture was stirred upon heating at 80 to 85° C. for 2 hours. The reaction mixture was cooled to room temperature and then subjected to a liquid separation operation with ethyl acetate (1 L) and water. Water was removed from the resulting organic phase by using sodium sulfate, and about 500 mL of the solvent was then distilled off in vacuo. 1 L of methanol was added, and the mixture was subjected to a recrystallization operation. A deposited crystal was recovered by filtration to obtain 125.4 g (yield: 80%) of a targeted compound as a white crystal. Incidentally, the compound was identified by $^1$H-NMR (400 MHz) and mass spectrum analysis.

$^1$H-NMR (CDCl$_3$) δ3.91 (s, 3H), 3.93 (s, 3H), 3.98 (s, 3H), 6.59 (s, 1H), 7.35 (d, 2H), 7.58 (s, 1H), 7.74 (d, 2H) Mass spectrum: m/z 314 (M+H)$^+$ The resulting compound had a melting point of 116° C.

SYNTHESIS EXAMPLE 3

Synthesis of Illustrative Compound A-3

10.1 g (47.5 mmoles) of 2,3,4-trirethoxybenzoic acid, 40 mL of toluene, and 0.5 mL of dimethylformamide were heated at 80° C., 6.22 g (52.3 mmoles) of thionyl chloride was then added dropwise step by step, and the mixture was stirred upon heating at 80° C. for 2 hours. Thereafter, a solution of 6.2 g (52.3 mmoles) of 4-cyanophenol previously dissolved in 20 mL of acetonitrile was added dropwise step by step, and after completion of the dropwise addition, the mixture was stirred upon heating at 80 to 85° C. for 2 hours. The reaction mixture was cooled to room temperature and then subjected to a liquid separation operation with ethyl acetate and water. Water was removed from the resulting organic phase by using sodium sulfate, and the solvent was then distilled off in vacuo.

50 mL of methanol was added, and the mixture was subjected to a recrystallization operation. A deposited crystal was recovered by filtration to obtain 11.9 g (yield: 80%) of a targeted compound as a white crystal. Incidentally, the compound was identified by $^1$H-NMR (400 MHz) and mass spectrum analysis.

$^1$H-NMR (CDCl$_3$) δ3.50 (br, 9H), 7.37 (d, 2H), 7.45 (s, 2H), 7.77 (s, 2H) Mass spectrum: m/z 314 (M+H)$^+$ The resulting compound had a melting point of 102 to 103° C.

SYNTHESIS EXAMPLE 4

Synthesis of Illustrative Compound A-4

25.0 g (118 mmoles) of 2,4,6-trimethoxybenzoic acid, 100 mL of toluene, and 1 mL of dimethylformamide were heated at 60° C., 15.4 g (129 mmoles) of thionyl chloride was then added dropwise step by step, and the mixture was stirred upon heating at 60° C. for 2 hours. Thereafter, a solution of 15.4 g (129 mmoles) of 4-cyanophenol previously dissolved in 50 mL of acetonitrile was added dropwise step by step, and after completion of the dropwise addition, the mixture was stirred upon heating at 80 to 85° C. for 4.5 hours. The reaction mixture was cooled to room temperature and then subjected to a liquid separation operation with ethyl acetate and water. Water was removed from the resulting organic phase by using sodium sulfate, and the solvent was then distilled off in vacuo. 500 mL of methanol and 100 mL of acetonitrile were added, and the mixture was subjected to a recrystallization operation. A deposited crystal was recovered by filtration to obtain 10.0 g (yield: 27%) of a targeted compound as a white crystal. Incidentally, the compound was identified by mass spectrum analysis.

Mass spectrum: m/z 314 (M+H)$^+$

The resulting compound had a melting point of 172 to 173° C.

SYNTHESIS EXAMPLE 5

Synthesis of Illustrative Compound A-5

15.0 g (82.3 mmoles) of 2,3-dimethoxybenzoic acid, 60 mL of toluene, and 0.5 mL of dimethylformamide were heated at 60° C., 10.7 g (90.5 mmoles) of thionyl chloride was then added dropwise step by step, and the mixture was stirred upon heating at 60° C. for 2 hours. Thereafter, a solution of 10.8 g (90.5 mmoles) of 4-cyanophenol previously dissolved in 30 mL of acetonitrile was added dropwise step by step, and after completion of the dropwise addition, the mixture was stirred upon heating at 70 to 80° C. for 7 hours. The reaction mixture was cooled to room temperature, and 90 mL of isopropyl alcohol was added. A deposited crystal was recovered by filtration to obtain 12.3 g (yield: 53%) of a targeted compound as a white crystal. Incidentally, the compound was identified by mass spectrum analysis.

Mass spectrum: m/z 284 (M+H)$^+$

The resulting compound had a melting point of 104° C.

SYNTHESIS EXAMPLE 6

Synthesis of Illustrative Compound A-6

A targeted compound was synthesized in the same manner as in Illustrative Compound A-5, except for changing the 2,3-dimethoxybenzoic acid to 2,4-dimethoxybenzoic acid. Furthermore, the compound was identified by mass spectrum analysis.

Mass spectrum: m/z 284 (M+H)$^+$

The resulting compound had a melting point of 134 to 136° C.

SYNTHESIS EXAMPLE 7

Synthesis of Illustrative Compound A-7

25.0 g (137 mmoles) of 2,5-dimethoxybenzoic acid, 100 mL of toluene, and 1.0 mL of dimethylformamide were heated at 60° C., 18.0 g (151 mmoles) of thionyl chloride was then added dropwise step by step, and the mixture was stirred upon heating at 60° C. for 2 hours. Thereafter, a solution of 18.0 g (151 mmoles) of 4-cyanophenol previously dissolved in 50 mL of acetonitrile was added dropwise step by step, and after completion of the dropwise addition, the mixture was stirred upon heating at 70 to 80° C. for 7.5 hours. The reaction mixture was cooled to room temperature and then subjected to a liquid separation operation with ethyl acetate and saturated salt water. Water was removed from the resulting organic phase by using sodium sulfate, and the solvent was then distilled off in vacuo. The residue was subjected to a purification operation by silica gel column chromatography (hexane/ethyl acetate (9/1, V/V) to obtain 18.8 g (yield: 48%) of a targeted compound as a white crystal. Furthermore, the compound was identified by mass spectrum analysis.

Mass spectrum: m/z 284 (M+H)$^+$

The resulting compound had a melting point of 79 to 80° C.

SYNTHESIS EXAMPLE 8

Synthesis of Illustrative Compound A-8

A targeted compound was synthesized in the same manner as in Illustrative Compound A-5, except for changing the 2,3-dimethoxybenzoic acid to 2,6-dimethoxybenzoic acid. Furthermore, the compound was identified by mass spectrum analysis.

Mass spectrum: m/z 284 (M+H)$^+$

The resulting compound had a melting point of 130 to 131° C.

SYNTHESIS EXAMPLE 9

Synthesis of Illustrative Compound A-11

A targeted compound was synthesized in the same manner as in Illustrative Compound A-2, except for changing 71.5 g of 4-cyanophenol to 76.9 g of 4-chlorophenol. Furthermore, the compound was identified by $^1$H-NMR (400 MHz) and mass spectrum analysis.

$^1$H-NMR (CDCl$_3$) δ3.90 (s, 3H), 3.94 (s, 3H), 3.99 (s, 3H), 6.58 (s, 1H), 7.15 (d, 2H), 7.37 (d, 2H), 7.56 (s, 1H) Mass spectrum: m/z 323 (M+H)$^+$ The resulting compound had a melting point of 127 to 129° C.

SYNTHESIS EXAMPLE 10

Synthesis of Illustrative Compound A-12

45.0 g (212 mmoles) of 2,4,5-trimethoxybenzoic acid, 180 mL of toluene, and 1.8 mL of dimethylformamide were heated at 60° C., 27.8 g (233 mmoles) of thionyl chloride was then added dropwise step by step, and the mixture was stirred under heating at 60° C. for 2.5 hours. Thereafter, a solution of 35.4 g (233 mmoles) of methyl 4-hydroxybenzoate previously dissolved in 27 mL of dimethylformamide was added dropwise step by step, and the mixture was stirred upon heating at 80° C. for 3 hours. Thereafter, the reaction mixture was cooled to room temperature, to which was then added 270 mL of methanol. A deposited crystal was recovered by filtration to obtain 64.5 g (yield: 88%) of a targeted compound as a white crystal. Furthermore, the compound was identified by $^1$H-NMR (400 MHz) and mass spectrum analysis.

$^1$H-NMR (CDCl$_3$) δ3.95 (m, 9H), 3.99 (s, 3H), 6.57 (s, 1H), 7.28 (d, 2H), 7.57 (s, 1H), 8.11 (d, 2H) Mass spectrum: m/z 347 (M+H)$^+$ The resulting compound had a melting point of 121 to 123° C.

SYNTHESIS EXAMPLE 11

Synthesis of Illustrative Compound A-13

20.0 g (94.3 mmoles) of 2,4,5-trimethoxybenzoic acid, 100 mL of toluene, and 1 mL of dimethylformamide were heated at 60° C., 12.3 g (104 mmoles) of thionyl chloride was then added dropwise step by step, and the mixture was stirred under heating at 60° C. for 3.5 hours. Thereafter, a solution of 17.7 g (104 mmoles) of 4-phenylphenol previously dissolved in 150 mL of toluene was added dropwise step by step, and the mixture was stirred upon heating at 80° C. for 3 hours. Thereafter, the reaction mixture was cooled to room temperature, to which was then added 250 mL of methanol. A deposited crystal was recovered by filtration to obtain 21.2 g (yield: 62%) of a targeted compound as a white crystal. Furthermore, the compound was identified by $^1$H-NMR (400 MHz) and mass spectrum analysis.

$^1$H-NMR (CDCl$_3$) δ3.93 (s, 3H), 3.96 (s, 3H), 3.99 (s, 3H), 6.59 (s, 1H), 7.26 to 7.75 (m, 10H) Mass spectrum: m/z 365 (M+H)$^+$ The resulting compound had a melting point of 131 to 132° C.

SYNTHESIS EXAMPLE 12

Synthesis of Illustrative Compound A-14

12.9 g (61 mmoles) of 2,4,5-trimethoxybenzoic acid, 50 mL of toluene, and 0.6 mL of dimethylformamide were heated at 60° C., 8.0 g (67 mmoles) of thionyl chloride was then added dropwise step by step, and the mixture was stirred under heating at 60° C. for 3.5 hours. Thereafter, a solution of 17.7 g (104 mmoles) of 4-phenylphenol previously dissolved in 25 mL of acetonitrile was added dropwise step by step, and the mixture was stirred upon heating at 80° C. for 3 hours. Thereafter, the reaction mixture was cooled to room temperature, to which was then added 100 mL of methanol. A deposited crystal was recovered by filtration to obtain 21.6 g (yield: 93%) of a targeted compound as a white crystal. Incidentally, the compound was identified by mass spectrum analysis.

Mass spectrum: m/z 381 (M+H)$^+$

The resulting compound had a melting point of 91 to 92° C.

SYNTHESIS EXAMPLE 13

Synthesis of Illustrative Compound A-15

A targeted compound was synthesized in the same manner as in Illustrative Compound A-2, except for changing 71.5 g of 4-cyanophenol to 56.4 g of phenol. Incidentally, the compound was identified by $^1$H-NMR (400 MHz) and mass spectrum analysis.

$^1$H-NMR (CDCl$_3$) δ3.91 (s, 3H), 3.93 (s, 3H), 3.99 (s, 3H), 6.58 (s, 1H), 7.19 to 7.27 (m, 3H), 7.42 (m, 2H), 7.58 (s, 1H) Mass spectrum: m/z 365 (M+H)$^+$ The resulting compound had a melting point of 105 to 108° C.

Mass spectrum: m/z 289 (M+H)$^+$

SYNTHESIS EXAMPLE 14

Synthesis of Illustrative Compound A-16

A targeted compound was synthesized in the same manner as in Illustrative Compound A-2, except for changing 71.5 g of 4-cyanophenol to 74.4 g of 4-methoxyphenol. Incidentally, the compound was identified by $^1$H-NMR (400 MHz) and mass spectrum analysis.

$^1$H-NMR (CDCl$_3$) δ3.84 (s, 3H), 3.92 (s, 3H), 3.93 (s, 3H), 3.99 (s, 3H), 6.58 (s, 1H), 6.92 (d, 2H), 7.12 (d, 2H), 7.42 (m, 2H), 7.58 (s, 1H) Mass spectrum: m/z 319 (M+H)$^+$ The resulting compound had a melting point of 102 to 103° C.

SYNTHESIS EXAMPLE 15

Synthesis of Illustrative Compound A-17

A targeted compound was synthesized in the same manner as in Illustrative Compound A-2, except for changing 71.5 g of 4-cyanophenol to 73.3 g of 4-ethylphenol. Incidentally, the compound was identified by $^1$H-NMR (400 MHz) and mass spectrum analysis.

Mass spectrum: m/z 317 (M+H)$^+$

The resulting compound had a melting point of 70 to 71° C.

SYNTHESIS EXAMPLE 16

Synthesis of Illustrative Compound A-24

27.3 g (164 mmoles) of 4-ethoxybenzoic acid, 108 mL of toluene, and 1 mL of dimethylformamide were heated at 60° C., 21.5 g (181 mmoles) of thionyl chloride was then added dropwise step by step, and the mixture was stirred under heating at 60° C. for 2 hours. Thereafter, a solution of 25.0 g (181 mmoles) of 4-ethoxyphenol previously dissolved in 50 mL of acetonitrile was added dropwise step by step, and the mixture was stirred upon heating at 80° C. for 4 hours.

Thereafter, the reaction mixture was cooled to room temperature, to which was then added 100 mL of methanol. A deposited crystal was recovered by filtration to obtain 30.6 g (yield: 65%) of a targeted compound as a white crystal. Incidentally, the compound was identified by $^1$H-NMR (400 MHz) and mass spectrum analysis.

$^1$H-NMR (CDCl$_3$) δ1.48 to 1.59 (m, 6H), 4.05 (q, 2H), 4.10 (q, 2H), 6.89 to 7.00 (m, 4H), 7.10 (d, 2H), 8.12 (d, 2H) Mass spectrum: m/z 287 (M+H)$^+$ The resulting compound had a melting point of 113 to 114° C.

SYNTHESIS EXAMPLE 17

Synthesis of Illustrative Compound A-25

24.7 g (149 mmoles) of 4-ethoxybenzoic acid, 100 mL of toluene, and 1 mL of dimethylformamide were heated at 60° C., 19.5 g (164 mmoles) of thionyl chloride was then added dropwise step by step, and the mixture was stirred under heating at 60° C. for 2 hours. Thereafter, a solution of 25.0 g (165 mmoles) of 4-propoxyphenol previously dissolved in 50 mL of acetonitrile was added dropwise step by step, and the mixture was stirred upon heating at 80° C. for 4 hours. Thereafter, the reaction mixture was cooled to room temperature, to which was then added 100 mL of methanol. A deposited crystal was recovered by filtration, and 100 mL of methanol was added to the resulting solid, thereby performing a recrystallization operation. The resulting crystal was recovered by filtration to obtain 33.9 g (yield: 76%) of a targeted compound as a white crystal. Incidentally, the compound was identified by $^1$H-NMR (400 MHz) and mass spectrum analysis.

$^1$H-NMR (CDCl$_3$) δ1.04 (t, 3H), 1.45 (t, 3H), 1.82 (q, 2H), 3.93 (q, 2H), 4.04 (q, 2H), 6.89 to 7.00 (m, 4H), 7.10 (d, 2H), 8.12 (d, 2H) Mass spectrum: m/z 301 (M+H)$^+$ The resulting compound had a melting point of 107° C.

SYNTHESIS EXAMPLE 18

Synthesis of Illustrative Compound A-27

A targeted compound was synthesized in the same manner as in Illustrative Compound A-24, except for changing 27.3 g of 4-ethoxybenzoic acid to 29.5 g of 4-propoxybenzoic acid. Incidentally, the compound was identified by mass spectrum analysis.

Mass spectrum: m/z 301 (M+H)$^+$

The resulting compound had a melting point of 88 to 89° C.

SYNTHESIS EXAMPLE 19

Synthesis of Illustrative Compound A-28

A targeted compound was synthesized in the same manner as in Illustrative Compound A-25, except for changing 24.7 g of 4-ethoxybenzoic acid to 26.8 g of 4-propoxybenzoic acid. Incidentally, the compound was identified by mass spectrum analysis.

Mass spectrum: m/z 315 (M+H)$^+$

The resulting compound had a melting point of 92° C.

SYNTHESIS EXAMPLE 20

Synthesis of Illustrative Compound A-40

20.0 g (109 mmoles) of 2,4-dimethoxybenzoic acid, 80 mL of toluene, and 0.8 mL of dimethylformamide were heated at 60° C., 14.4 g (121 mmoles) of thionyl chloride was then added dropwise step by step, and the mixture was stirred under heating at 60° C. for 3.5 hours. Thereafter, a solution of 20.5 g (121 mmoles) of 4-phenylphenol previously dissolved in 50 mL of acetonitrile was added dropwise step by step, and the mixture was stirred upon heating at 80° C. for 6 hours. Thereafter, the reaction mixture was cooled to room temperature, to which was then added 100 mL of methanol. A deposited crystal was recovered by filtration to obtain 31.7 g (yield: 86%/0) of a targeted compound as a white crystal. Incidentally, the compound was identified by mass spectrum analysis.

Mass spectrum: m/z 335 (M+H)$^+$

The resulting compound had a melting point of 161 to 162° C.

SYNTHESIS EXAMPLE 21

Synthesis of Illustrative Compound A-42

30.0 g (165 mmoles) of 2,4-dimethoxybenzoic acid, 120 mL of toluene, and 1.2 mL of dimethylformamide were heated at 60° C., 21.6 g (181 mmoles) of thionyl chloride was then added dropwise step by step, and the mixture was stirred under heating at 60° C. for 2 hours. Thereafter, a solution of 27.6 g (181 mmoles) of methyl 4-hydroxybenzoate previously dissolved in 40 mL of dimethylformamide was added dropwise step by step, and the mixture was stirred upon heating at 80° C. for 6 hours. Thereafter, the reaction mixture was cooled to room temperature, to which was then added 140 mL of methanol. A deposited crystal was recovered by filtration to obtain 24.4 g (yield: 47%) of a targeted compound as a white crystal. Incidentally, the compound was identified by $^1$H-NMR (400 MHz) and mass spectrum analysis.

$^1$H-NMR (CDCl$_3$) δ3.92 (m, 9H), 6.56 (m, 2H), 7.27 (m, 2H), 8.09 (m, 3H) Mass spectrum: m/z 217 (M+H)$^+$ The resulting compound had a melting point of 122 to 123° C.

As the retardation exhibiting agent of the invention, a compounds represented by the following formulae (B) and (C) are especially preferable because their effects for suppressing the aggregation of the matting agent are large.

The compound represented by the formula (B) will be hereunder described in detail.

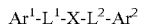

Formula (B)

In the foregoing formula (B), Ar$^1$ and Ar$^2$ each independently represents an aryl group or an aromatic hetero ring; L$^1$ and L$^2$ each independently represents —C(=O)O— or —C(=O)NR—; R represents a hydrogen atom or an alkyl group; and X represents the following formula (2) or (3).

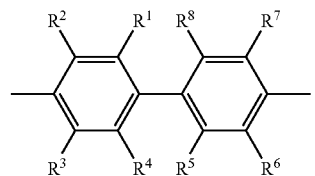

Formula (2)

In the foregoing formula (2), R$^1$, R$^2$, R$^3$, R$^4$, R$^5$, R$^6$, R$^7$, and R$^8$ each independently represents a hydrogen atom or a substituent.

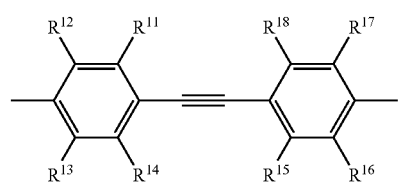

Formula (3)

In the foregoing formula (3), R$^{11}$, R$^{12}$, R$^{13}$, R$^{14}$, R$^{15}$, R$^{16}$, R$^{17}$, and R$^{18}$ each independently represents a hydrogen atom or a substituent.

In the formula (B), Ar$^1$ and Ar$^2$ each independently represents an aryl group or an aromatic hetero ring. As the aryl group represented by Ar$^1$ and Ar$^2$, an aryl group having from 6 to 30 carbon atoms is preferable. The aryl may be a monocyclic ring or may be taken together with other ring to form a fused ring. Furthermore, if possible, the aryl group may have a substituent. As the substituent, the substituent T as described later can be applied.

In the formula (B), the aryl group represented by Ar$^1$ and Ar$^2$ is more preferably an aryl group having from 6 to 20 carbon atoms, and especially preferably from 6 to 12 carbon atoms. Examples thereof include a phenyl group, a p-methylphenyl group, and a naphthyl group.

In the formula (B), as the aromatic hetero ring represented by $Ar^1$ and $Ar^2$, any aromatic hetero ring containing at least one of an oxygen atom, a nitrogen atom, and a sulfur atom is employable. The aromatic hetero ring is preferably a 5-membered or 6-membered aromatic hetero ring containing at least one of an oxygen atom, a nitrogen atom, and a sulfur atom. Furthermore, if possible, the aromatic hetero group may have a substituent. As the substituent, the substituent T as described later can be applied.

In the formula (B), specific examples of the aromatic hetero ring represented by $Ar^1$ and $Ar^2$ include a furan ring group, a pyrrole ring group, a thiophene ring group, an imidazole ring group, a pyrazole ring group, a pyridine ring group, a pyrazine ring group, a pyridazine ring group, a triazole ring group, a triazine ring group, an indole ring group, an indazole ring group, a purine ring group, a thiazoline ring group, a thiazole ring group, a thiadiazole ring group, an oxazoline ring group, an oxazole ring group, an oxadiazole ring group, a quinoline ring group, an isoquinoline ring group, a phthalazine ring group, a naphthylidine ring group, a quinoxaline ring group, a quinazoline ring group, a cinnoline ring group, a pteridine ring group, an acridine ring group, a phenanthroline ring group, a phenazine ring group, a tetrazole ring group, a benzinmdazole ring group, a benzoxazole ring group, a benzthiazole ring group, a benzotriazole ring group, a tetrazaindene ring group, a pyrrolotriazole ring group, and a pyrazolotriazole ring group. As the aromatic hetero ring, a benzimidazole ring, a benzoxazole ring group, a benzthiazole ring group, and a benzotriazole ring group are preferable.

In the formula (B), $L^1$ and $L^2$ each independently represents —C(=O)O— or —C(=O)NR— (wherein R represents a hydrogen atom or an alkyl group), the both of which are similarly preferable.

R represents a hydrogen atom or an alkyl group. R is preferably a hydrogen atom or an alkyl group having from 1 to 6 carbon atoms; more preferably a hydrogen atom or an alkyl group having from 1 to 4 carbon atoms; further preferably a hydrogen atom or a methyl group; and especially preferably a hydrogen atom.

$R^1$, $R^2$, $R^3$, $R^4$, $R^5$, $R^6$, $R^7$, and $R^8$ each independently represents a hydrogen atom or a substituent. As the substituent, the substituent T as described later can be applied.

$R^1$, $R^2$, $R^3$, $R^4$, $R^5$, $R^6$, $R^7$, and $R^8$ are each preferably a hydrogen atom, an alkyl group, an amino group, an alkoxy group, a hydroxyl group, or a halogen atom; more preferably a hydrogen atom, an alkyl group having from 1 to 4 carbon atoms, an alkoxy group having from 1 to 4 carbon atoms, a hydroxyl group, or a halogen atom; further preferably a hydrogen atom, a methyl group, a methoxy group, a hydroxyl group, a chlorine atom, or a fluorine atom; especially preferably a hydrogen atom or a fluorine atom; and most preferably a hydrogen atom.

$R^{11}$, $R^{12}$, $R^{13}$, $R^{14}$, $R^{15}$, $R^{16}$, $R^{17}$, and $R^{18}$ each independently represents a hydrogen atom or a substituent. As the substituent, the substituent T as described later can be applied.

$R^{11}$, $R^{12}$, $R^{13}$, $R^{14}$, $R^{15}$, $R^{16}$, $R^{17}$, and $R^{18}$ are each preferably a hydrogen atom, an alkyl group, an amino group, an alkoxy group, a hydroxyl group, or a halogen atom; more preferably a hydrogen atom, an alkyl group having from 1 to 4 carbon atoms, an alkoxy group having from 1 to 4 carbon atoms, a hydroxyl group, or a halogen atom; further preferably a hydrogen atom, a methyl group, a methoxy group, a hydroxyl group, a chlorine atom, or a fluorine atom; especially preferably a hydrogen atom or a fluorine atom; and most preferably a hydrogen atom.

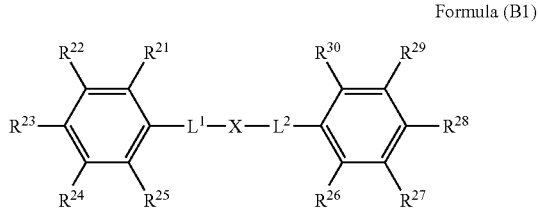

Formula (B1)

In the foregoing formula (B1), $R^{21}$, $R^{22}$, $R^{23}$, $R^{24}$, $R^{25}$, $R^{26}$, $R^{27}$, $R^{28}$, $R^{29}$, and $R^{30}$ each independently represents a hydrogen atom or a substituent; and $L^1$, $L^2$, and X are synonymous with those in the formula (1), respectively, and preferred ranges are also the same.

$R^{21}$ and $R^{26}$ each independently represents a hydrogen atom or a substituent. $R^{21}$ and $R^{26}$ are each preferably an alkyl group, an alkoxy group, an amino group, or a hydroxyl group; more preferably an alkyl group having from 1 to 4 carbon atoms or an alkoxy group having from 1 to 12 carbon atoms; further preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a methoxy group.

$R^{22}$ and $R^{27}$ each independently represents a hydrogen atom or a substituent. $R^{22}$ and $R^{27}$ are each preferably a hydrogen atom, an alkyl group, an alkoxy group, an amino group, or a hydroxyl group; more preferably a hydrogen atom, an alkyl group, or an alkoxy group; further preferably a hydrogen atom, an alkyl group (preferably having from 1 to 4 carbon atoms, and more preferably a methyl group), or an alkoxy group (preferably having from 1 to 12 carbon atoms, more preferably from 1 to 8 carbon atoms, further preferably from 1 to 6 carbon atoms, and especially preferably from 1 to 4 carbon atom); and especially preferably a hydrogen atom, a methyl group, or a methoxy group.

$R^{23}$ and $R^{28}$ each independently represents a hydrogen atom or a substituent. $R^{23}$ and $R^{28}$ are each preferably a hydrogen atom, an alkyl group, an alkoxy group, an amino group, or a hydroxyl group; more preferably an alkyl group or an alkoxy group; especially preferably an alkoxy group (preferably having from 1 to 12 carbon atoms, more preferably from 1 to 8 carbon atoms, further preferably from 1 to 6 carbon atoms, and especially preferably from 1 to 4 carbon atoms); and most preferably an n-propoxy group, an ethoxy group, or a methoxy group.

$R^{24}$ and $R^{29}$ each independently represents a hydrogen atom or a substituent. $R^{24}$ and $R^{29}$ are each preferably a hydrogen atom, an alkyl group, an alkoxy group, an amino group, or a hydroxyl group; more preferably a hydrogen atom, an alkyl group having from 1 to 4 carbon atoms, or an alkoxy group having from 1 to 12 carbon atoms (preferably having from 1 to 12 carbon atoms, more preferably from 1 to 8 carbon atoms, further preferably from 1 to 6 carbon atoms, and especially preferably from 1 to 4 carbon atoms); especially preferably a hydrogen atom, an alkyl group having from 1 to 4 carbon atoms, or an alkoxy group having from 1 to 4 carbon atoms; and most preferably a hydrogen atom, a methyl group, or a methoxy group.

$R^{25}$ and $R^{30}$ each independently represents a hydrogen atom or a substituent. $R^{25}$ and $R^{30}$ are each preferably a hydrogen atom, an alkyl group, an alkoxy group, an amino group, or a hydroxyl group; more preferably a hydrogen atom, an alkyl group, or an alkoxy group; further preferably a hydrogen atom, an alkyl group (preferably having from 1 to 4 carbon atoms, and more preferably a methyl group), or an alkoxy group (preferably having from 1 to 12 carbon atoms, more preferably from 1 to 8 carbon atoms, further preferably from 1 to 6 carbon atoms, and especially preferably from 1 to 4 carbon atoms); and especially preferably a hydrogen atom, a methyl group, or a methoxy group.

In the formula (B), the following formula (B2) is more preferable.

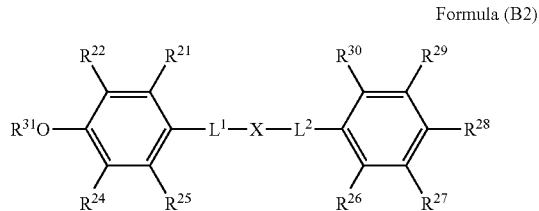

Formula (B2)

In the foregoing formula (B2), $R^{21}$, $R^{22}$, $R^{23}$, $R^{24}$, $R^{25}$, $R^{26}$, $R^{27}$, $R^{28}$, $R^{29}$, $R^{30}$, $L^1$, $L^2$, and X are synonymous with those in the formula (B1), respectively, and preferred ranges are also the same. $R^{31}$ represents an alkyl group having from 1 to 12 carbon atoms.

In the formula (B2), $R^{31}$ represents an alkyl group having from 1 to 12 carbon atoms. The alkyl group represented by $R^{31}$ may be linear or branched and may also have a substituent. The alkyl group represents preferably an alkyl group having from 1 to 12 carbon atoms; more preferably an alkyl group having from 1 to 8 carbon atoms; further preferably an alkyl group having from 1 to 6 carbon atoms; and especially preferably an alkyl group having from 1 to 4 carbon atoms (for example, a methyl group, an ethyl group, an n-propyl group, an iso-propyl group, an n-butyl group, an iso-butyl group, and a tert-butyl group).

In the formula (B), the following formula (B3) is further preferable.

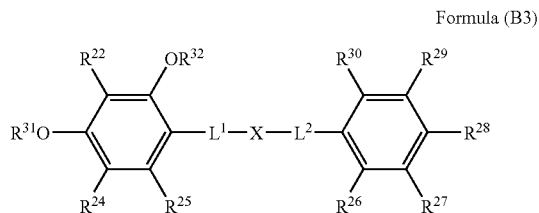

Formula (B3)

In the foregoing formula (B3), $R^{22}$, $R^{23}$, $R^{24}$, $R^{25}$, $R^{26}$, $R^{27}$, $R^{28}$, $R^{29}$, $R^{30}$, $R^3$, $L^1$, $L^2$, and X are synonymous with those in the formula (B2), respectively, and preferred ranges are also the same. $R^{32}$ represents a hydrogen atom or an alkyl group having from 1 to 4 carbon atoms.

$R^{32}$ represents a hydrogen atom or an alkyl group having from 1 to 4 carbon atoms; preferably a hydrogen atom or an alkyl group having from 1 to 3 carbon atoms; more preferably a hydrogen atom, a methyl group, or an ethyl group; further preferably a hydrogen atom or a methyl group; and especially preferably a methyl group.

In the formula (B), the following formula (B4) is especially preferable.

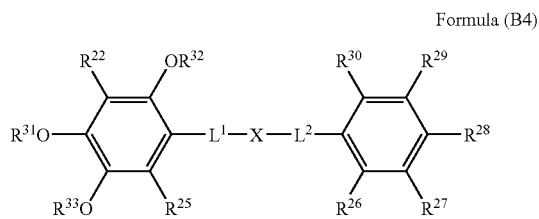

Formula (B4)

In the foregoing formula (B3), $R^{22}$, $R^{23}$, $R^{25}$, $R^{26}$, $R^{27}$, $R^{28}$, $R^{29}$, $R^{30}$, $R^{31}$, $R^{32}$, $L^1$, $L^2$, and X are synonymous with those in the formula (B3), respectively, and preferred ranges are also the same. $R^{33}$ represents an alkyl group having from 1 to 4 carbon atoms.

$R^{33}$ represents an alkyl group having from 1 to 4 carbon atoms; preferably an alkyl group having from 1 to 3 carbon atoms; more preferably a methyl group or an ethyl group; and further preferably a methyl group.

The foregoing substituent T will be hereunder described.

Examples of the substituent T include an alkyl group (preferably having from 1 to 20 carbon atoms, more preferably from 1 to 12 carbon atoms, and especially preferably from 1 to 8 carbon atoms; for example, a methyl group, an ethyl group, an iso-propyl group, a tert-butyl group, an n-octyl group, an n-decyl group, an n-hexadecyl group, a cyclopropyl group, a cyclopentyl group, and a cyclohexyl group), an alkenyl group (preferably having from 2 to 20 carbon atoms, more preferably from 2 to 12 carbon atoms, and especially preferably from 2 to 8 carbon atoms; for example, a vinyl group, an allyl group, a 2-butenyl group, and a 3-pentenyl group), an alkynyl group (preferably having from 2 to 20 carbon atoms, more preferably from 2 to 12 carbon atoms, and especially preferably from 2 to 8 carbon atoms; for example, a propargyl group and a 3-pentynyl group), an aryl group (preferably having from 6 to 30 carbon atoms, more preferably from 6 to 20 carbon atoms, and especially preferably from 6 to 12 carbon atoms; for example, a phenyl group, a p-methylphenyl group, and a naphthyl group), a substituted or unsubstituted amino group (preferably having from 0 to 20 carbon atoms, more preferably from 0 to 10 carbon atoms, and especially preferably from 0 to 6 carbon atoms; for example, an amino group, a methylamino group, a dimethylamino group, a diethylamino group, and a dibenzylamino group), an alkoxy group (preferably having from 1 to 20 carbon atoms, more preferably from 1 to 12 carbon atoms, and especially preferably from 1 to 8 carbon atoms; for example, a methoxy group, an ethoxy group, and a butoxy group), an aryloxy group (an aryloxy group having from 6 to 20 carbon atoms, more preferably from 6 to 16 carbon atoms, and especially from 6 to 12 carbon atoms; for example, a phenyloxy group and a 2-naphthyloxy group), an acyl group (preferably having from 1 to 20 carbon atoms, more preferably from 1 to 16 carbon atoms, and especially preferably from 1 to 12 carbon atoms; for example, an acetyl group, a benzoyl group, a formyl group, and a pivaloyl group), an alkoxycarbonyl group (preferably having from 2 to 20 carbon atoms, more preferably from 2 to 16 carbon atoms, and especially preferably from 2 to 12 carbon atoms; for example, a methoxycarbonyl group and an ethoxycarbonyl group), an aryloxycarbonyl group (preferably having from 7 to 20 carbon atoms, more preferably from 7 to 16 carbon atoms, and especially preferably from 7 to 10 carbon atoms; for example, a phenyloxycarbonyl group), an acyloxy group (preferably having from 2 to 20 carbon atoms, more preferably from 2 to 16 carbon atoms, and especially preferably from 2 to 10 carbon atoms; for example, an acetoxy group and a benzoyloxy group), an acylamino group (preferably having from 2 to 20 carbon atoms, more preferably from 2 to 16 carbon atoms, and especially preferably from 2 to 10 carbon atoms; for example, an acetylamino group and a benzoylamino group), an alkoxycarbonylamino group (preferably having from 2 to 20 carbon atoms, more preferably from 2 to 16 carbon atoms, and especially preferably from 2 to 12 carbon atoms; for example, a methoxycarbonylamino group), an aryloxycarbonylamino group (preferably having from 7 to 20 carbon atoms, more preferably from 7 to 16 carbon atoms, and especially preferably from 7 to 12 carbon atoms; for example, a phenyloxycarbonylamino group), a sulfonylamino group (preferably having from 1 to 20 carbon atoms, more preferably from 1 to 16 carbon atoms, and especially preferably from 1 to 12 carbon atoms; for example, a methanesulfonylamino group and a benzenesulfonylamino group), a sulfamoyl group (preferably having from 0 to 20 carbon atoms, more preferably from 0 to 16 carbon atoms, and especially preferably from 0 to 12 carbon atoms; for example, a sulfamoyl group, a methylsulfamoyl group, a dimethylsulfamoyl group, and a phenylsulfamoyl group), a carbamoyl group (preferably having from 1 to 20 carbon atoms, more preferably from 1 to 16 carbon atoms, and especially preferably from 1 to 12 carbon atoms; for example, a carbamoyl group, a methylcarbamoyl group, a diethylcarbamoyl group, and a phenylcabamoyl group), an alkylthio group (preferably having from 1 to 20 carbon atoms, more preferably from 1 to 16 carbon atoms, and especially preferably from 1 to 12 carbon atoms; for example, a methylthio group and an ethylthio group), an artylthio group (preferably having from 6 to 20 carbon atoms, more preferably from 6 to 16 carbon atoms, and especially preferably from 6 to 12 carbon atoms; for example, a phenylthio group), a sulfonyl group (preferably having from 1 to 20 carbon atoms, more preferably from 1 to 16 carbon atoms, and especially preferably from 1 to 12 carbon atoms; for example, a mesyl group and a tosyl group); a sulfinyl group (preferably having from 1 to 20 carbon atoms, more preferably from 1 to 16 carbon atoms, and especially preferably from 1 to 12 carbon atoms; for example, a methanesulfinyl group and a benzenesulfinyl group), a ureido group (preferably having from 1 to 20 carbon atoms, more preferably from 1 to 16 carbon atoms, and especially preferably from 1 to 12 carbon atoms; for example, a ureido group, a methylureido group, and a phenylureido group), a phosphoric acid amide group (preferably having from 1 to 20 carbon atoms, more preferably from 1 to 16 carbon atoms, and especially preferably from 1 to 12 carbon atoms; for example, a diethylphosphoric acid amide group and a phenylphosphoric acid amide group), a hydroxyl group, a mercapto group, a halogen atom (for example, a fluorine atom, a chlorine atom, a bromine atom, and an iodine atom), a cyano group, a sulfo group, a carboxyl group, a nitro group, a hydroxamic acid group, a sulfino group, a hydrazino group, an imino group, a heterocyclic group (preferably having from 1 to 30 carbon atoms, and more preferably from 1 to 12 carbon atoms; examples of the hetero atom include a nitrogen atom, an oxygen atom, and a sulfur atom; and specific examples of the heterocyclic group include an imidazolyl group, a pyridyl group, a quinolyl group, a furyl group, a piperidyl group, a morpholino group, a benzoxazolyl group, a benzimidazolyl group, and a benzthiazolyl group), and a silyl group (preferably having from 3 to 40 carbon atoms, more preferably from 3 to 30 carbon atoms, and especially preferably from 3 to 24 carbon atoms; for example, a trimethylsilyl group and a triphenylsilyl group). These substituents may be further substituted.

Furthermore, when two or more substituents are present, these substituents may be the same or different. Moreover, if possible, the substituents may be taken together to form a ring.

Specific examples of the compound represented by the formula (B) will be given below, but it should be construed that the invention is not limited to these specific examples at all.

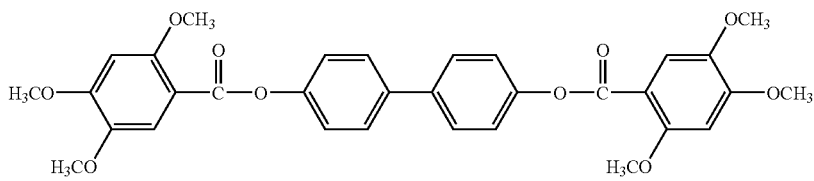

B-1

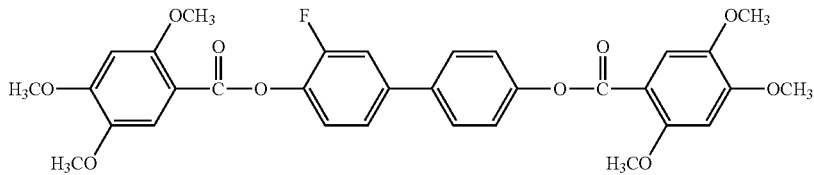

B-2

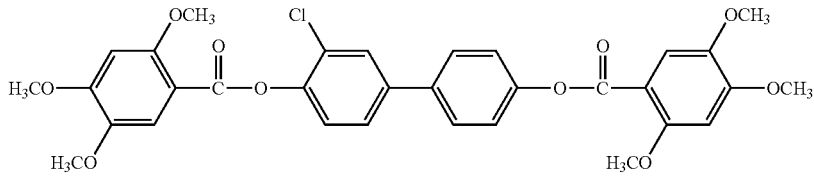

B-3

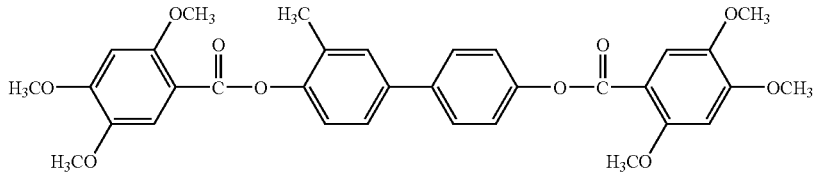

B-4

-continued
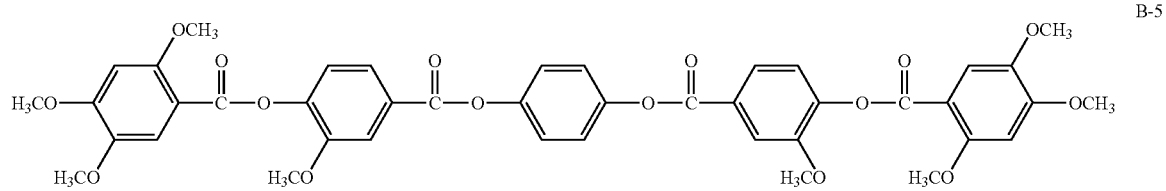
B-5
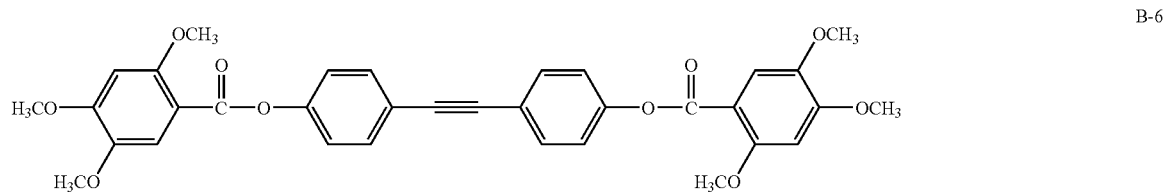
B-6
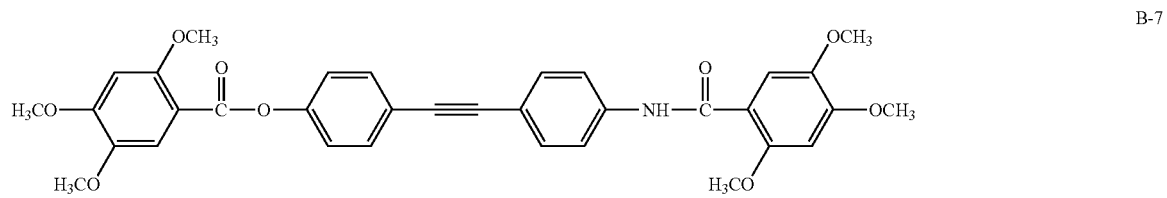
B-7
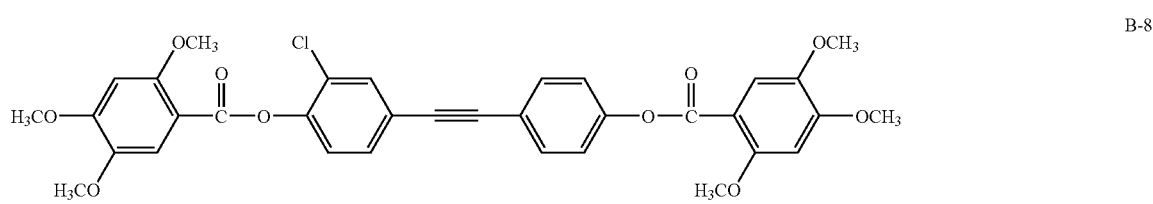
B-8
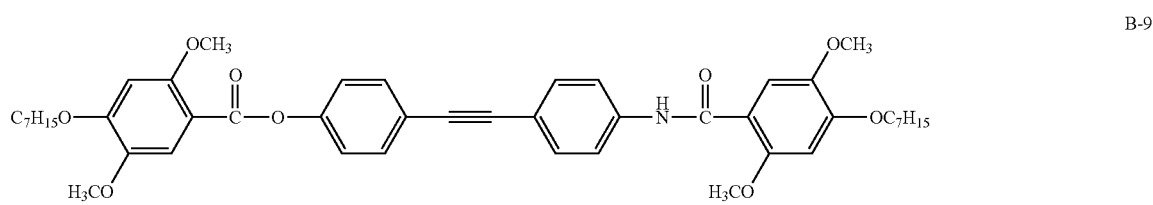
B-9
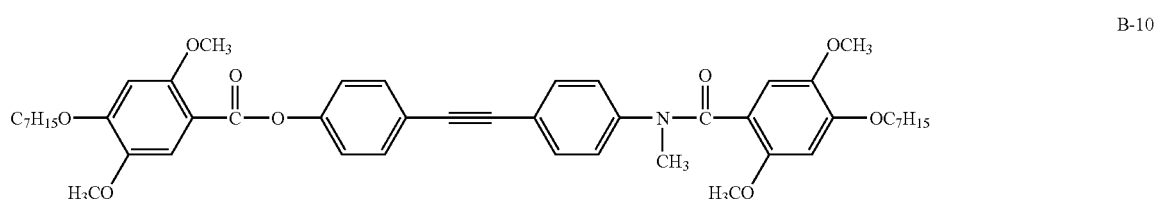
B-10
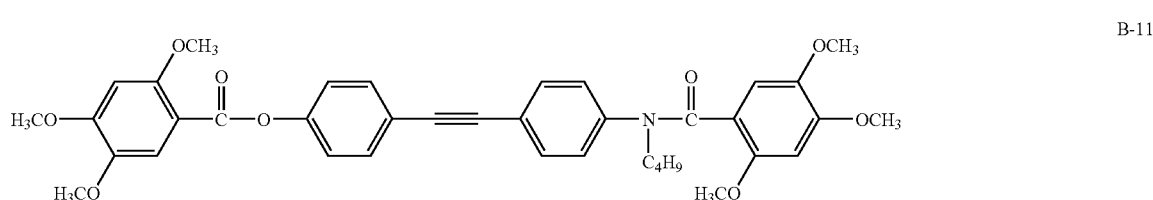
B-11
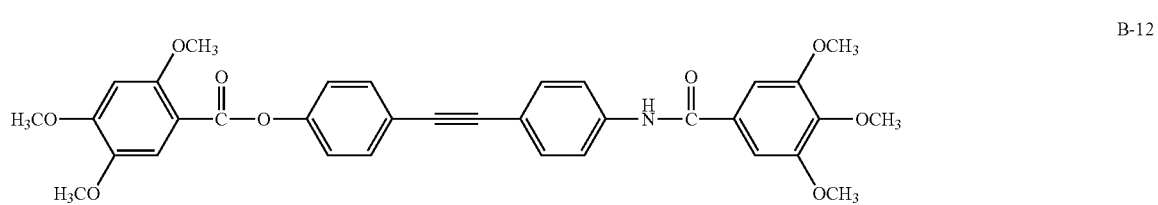
B-12

-continued
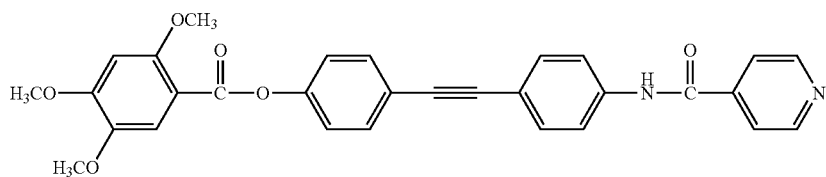
B-13
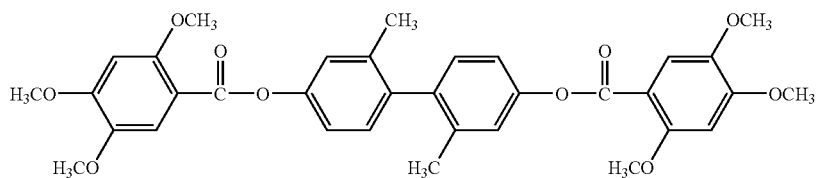
B-14
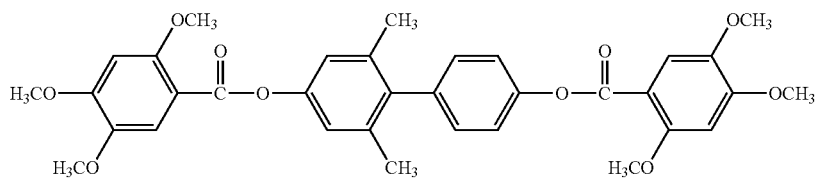
B-15
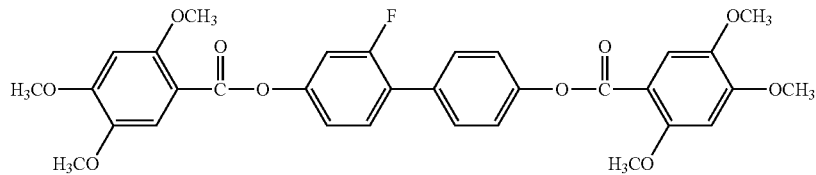
B-16
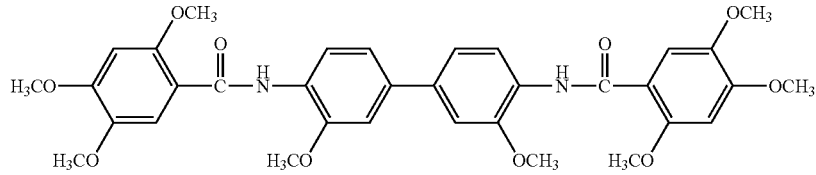
B-17
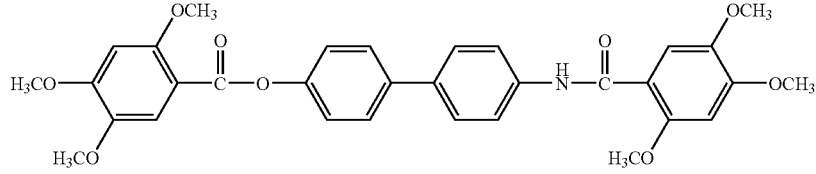
B-18
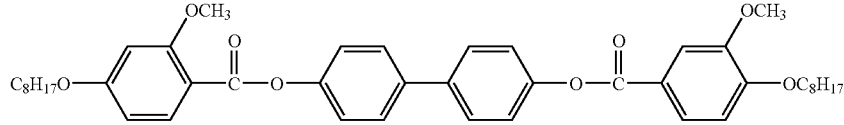
B-19
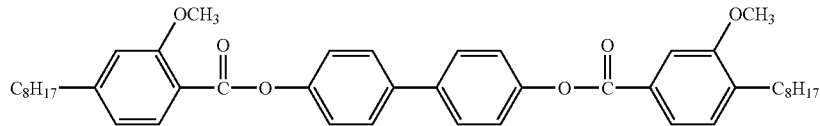
B-20
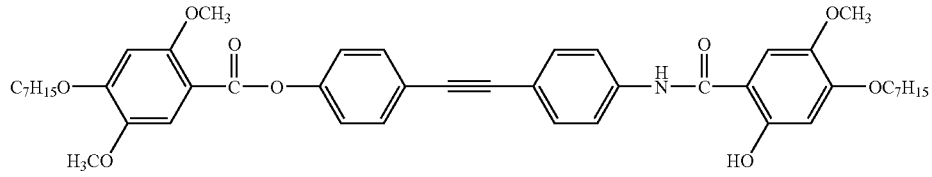
B-21

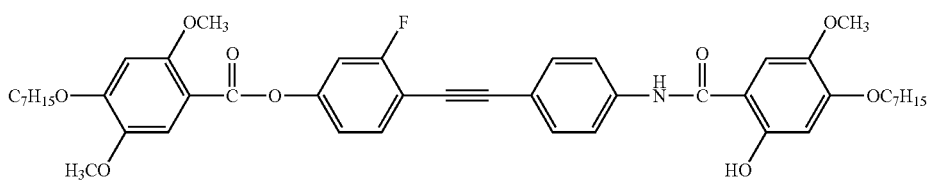

B-22

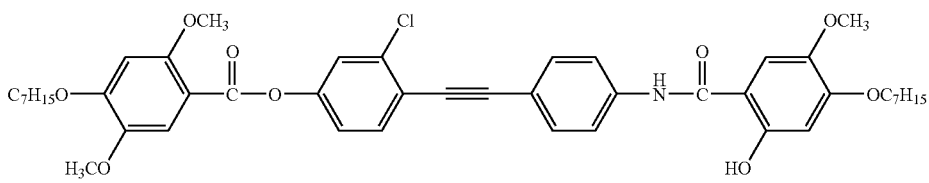

B-23

The compounds represented by the formulae (B) to (B4) of the invention can be synthesized by a general esterification reaction or amidation reaction between a substituted benzoic acid and phenol or an aniline derivative, and any reaction may be employed so far as it is an ester bond-forming reaction. Examples thereof include a method for subjecting a substituted benzoic acid to functional group conversion into an acid halide and then condensing with phenol or an aniline derivative and a method for dehydrating and condensing a substituted benzoic acid and phenol or an aniline derivative using a condensing agent or a catalyst.

When a production process and the like are taken into consideration, a method for subjecting a substituted benzoic acid to functional group conversion into an acid halide and then condensing with phenol or an aniline derivative is preferable.

As a reaction solvent, a hydrocarbon based solvent (preferably toluene and xylene), an ether based solvent (preferably dimethyl ether, tetrahydrofuran, and dioxane), a ketone based solvent, an ester based solvent, acetonitrile, dimethylformamide, dimethylacetamide, and the like can be used. These solvents may be used singly or in admixture of several kinds thereof. Of these, toluene, acetonitrile, dimethylformamide, and dimethylacetamide are preferable as the reaction solvent.

The reaction temperature is preferably from 0 to 150° C., more preferably from 0 to 100° C., further preferably from 0 to 90° C., and especially preferably from 20° C. to 90° C.

It is preferable that a base is not used in the present reaction. When a base is used, any of an organic base and an inorganic base is employable, and an organic base is preferable. Examples thereof include pyridine and tertiary alkylamines (preferably triethylamine and ethyldiisopropylamine).

The synthesis method of the compound of the invention will be specifically described below, but it should be construed that the invention is not limited to the following specific examples at all.

SYNTHESIS EXAMPLE 1

Synthesis of Illustrative Compound B-1

40.1 g (189 mmoles) of 2,4,5-trimethoxybenzoic acid, 16.75 g (90 mmoles) of 4,4'-dihydroxybiphenyl, 200 mL of toluene, and 2 mL of dimethylformamide were heated at 70° C., and 23.6 g (198 mmoles) of thionyl chloride was then added dropwise step by step. The mixture was stirred upon heating at 70° C. for 2.5 hours. Thereafter, the reaction mixture was cooled to room temperature, to which was then added 300 mL of methanol. A deposited crystal was recovered by filtration to obtain 48.4 g (yield: 94%) of a targeted compound as a white crystal. Furthermore, the compound was identified by $^1$H-NMR (400 MHz).

$^1$H-NMR (CDCl$_3$) δ3.93 (s, 6H), 3.95 (s, 6H), 3.99 (s, 6H), 6.58 (s, 2H), 7.28 (d, 4H), 7.62 (m, 6H)

The resulting compound had a melting point of 227 to 229° C.

SYNTHESIS EXAMPLE 2

Synthesis of Illustrative Compound B-2

34 g (160 mmoles) of 2,4,5-trimethoxybenzoic acid, 15 g (73 mmoles) of 4,4'-dihydroxy-3-fluorobiphenyl, 110 mL of toluene, and 1.6 mL of dimethylformamide were heated at 70° C., and 20.9 g (176 mmoles) of thionyl chloride was then added dropwise step by step. The mixture was stirred upon heating at 70° C. for 2.5 hours. Thereafter, the reaction mixture was cooled to room temperature, to which was then added 300 mL of methanol. A deposited crystal was recovered by filtration to obtain 37 g (yield: 86%) of a targeted compound as a white crystal. Furthermore, the compound was identified by $^1$H-NMR (400 MHz).

$^1$H-NMR (CDCl$_3$) δ3.93 (s, 6H), 3.95 (s, 6H), 4.00 (s, 6H), 6.59 (s, 2H), 7.26 to 7.45 (m, 5H), 7.63 (m, 4H)

The resulting compound had a melting point of 197 to 199° C.

SYNTHESIS EXAMPLE 3

Synthesis of Illustrative Compound B-3

23.3 g (110 mmoles) of 2,4,5-trimethoxybenzoic acid, 15 g (50 mmoles) of 4,4'-dihydroxy-3-chlorobiphenyl, 75 mL of toluene, and 1.1 mL of dimethylformamide were heated at 70° C., and 14.4 g (121 mmoles) of thionyl chloride was then added dropwise step by step. The mixture was stirred upon heating at 80° C. for 2.5 hours. Thereafter, the reaction mixture was cooled to room temperature, to which was then added 250 mL of methanol. A deposited crystal was recovered by filtration to obtain 26 g (yield: 85%) of a targeted compound as a white crystal. Furthermore, the compound was identified by $^1$H-NMR (400 MHz).

$^1$H-NMR (CDCl$_3$) δ3.90 to 4.00 (m, 18H), 6.59 (s, 2H), 7.26 to 7.70 (m, 9H)

The resulting compound had a melting point of 168 to 170° C.

SYNTHESIS EXAMPLE 4

Synthesis of Illustrative Compound B-4

30.3 g (143 mmoles) of 2,4,5-trimethoxybenzoic acid, 15 g (65 mmoles) of 4,4'-dihydroxy-3-methylbiphenyl, 100 mL of toluene, and 1.4 mL of dimethylformamide were heated at 70° C., and 18.7 g (157 mmoles) of thionyl chloride was then added dropwise step by step. The mixture was stirred upon heating at 70° C. for 2.5 hours. Thereafter, the reaction mixture was cooled to room temperature, to which was then added 300 mL of methanol. A deposited crystal was recovered by filtration to obtain 27.4 g (yield: 72%) of a targeted compound as a white crystal. Furthermore, the compound was identified by $^1$H-NMR (400 MHz) and mass spectrum analysis.

$^1$H-NMR (CDCl$_3$) δ2.31 (s, 2H), 3.95 (s, 6H), 4.00 (s, 6H), 6.60 (s, 2H), 7.10 (m, 2H), 7.27 (m, 3H), 7.40 (m, 2H), 7.63 (d, 2H) Mass spectrum: m/z 589 (M+H)$^+$ The resulting compound had a melting point of 188 to 189° C.

SYNTHESIS EXAMPLE 5

Synthesis of Illustrative Compound B-6

5.72 g (26.9 mmoles) of 2,4,5-trimethoxybenzoic acid, 3.5 g (27 mmoles) of diisopropylethylamine, and 20 mL of tetrahydrofuran were cooled by ice water, and 3.1 g (27 mmoles) of methanesulfonyl chloride was then added dropwise step by step. After the dropwise addition, the mixture was stirred at room temperature for 2 hours. Thereafter, the reaction mixture was cooled in ice water, and a solution of 2.9 g (13.7 mmoles) of bis(4-hydroxyphenyl)acetylene and 3.5 g (27 mmoles) of diisopropylethylamine previously dissolved in 40 mL of tetrahydrofuran was added dropwise step by step. After the dropwise addition, the mixture was stirred at room temperature for 3 hours and then at 50° C. for one hour. Thereafter, 160 mL of water was added, and the resulting crystal was recovered by filtration. 100 mL of methanol was added, and the mixture was subjected to a recrystallization operation. A deposited crystal was recovered by filtration to obtain 3.0 g (yield: 19%) of a targeted compound as a white crystal. Furthermore, the compound was identified by $^1$H-NMR (400 MHz) and mass spectrum analysis.

$^1$H-NMR (CDCl$_3$) δ3.93 (s, 6H), 3.95 (s, 6H), 3.99 (s, 6H), 6.57 (s, 2H), 7.24 (m, 4H), 7.58 (m, 6H) Mass spectrum: m/z 599 (M+H)$^+$ The resulting compound had a melting point of 201 to 203° C.

SYNTHESIS EXAMPLE 6

Synthesis of Illustrative Compound B-7

6-1: Synthesis of 2,4,5-trimethoxybenzoic acid 4-ethynylanilide 21.2 g (100 mmoles) of 2,4,5-trimethoxybenzoic acid, 12.9 g (100 mmoles) of diisopropylethylamine, and 126 mL of tetrahydrofuran were cooled by ice water, and 11.4 g (100 mmoles) of methanesulfonyl chloride was then added dropwise step by step. After the dropwise addition, the mixture was stirred at room temperature for 2 hours. Thereafter, the reaction mixture was cooled in ice water, and a solution of 11.7 g (100 mmoles) of 4-ethynylaniline, and 12.9 g (100 mmoles) of diisopropylethylamine previously dissolved in 42 mL of tetrahydrofuran was added dropwise step by step. After the dropwise addition, the mixture was stirred at room temperature for 6 hours. Thereafter, 200 mL of ethyl acetate was added, and an organic phase was rinsed successively with water, a saturated sodium hydrogencarbonate aqueous solution, a 0.5 moles/L hydrochloric acid aqueous solution, and saturated salt water. Sodium sulfate was added to the organic phase, and the mixture was subjected to a dehydration operation. The sodium sulfate was filtered off by filtration, and the organic solvent was distilled off in vacuo.

350 mL of methanol was added, and the mixture was subjected to a recrystallization operation. A deposited crystal was recovered by filtration to obtain 15.0 g (yield: 48%) of a targeted compound as a white crystal.

6-2: Synthesis of Illustrative Compound B-7

3.1 g (10 mmoles) of 2,4,5-trimethoxybenzoic acid 4-ethynylanilide, 4.1 g (10 mmoles) of 4-iodophenyl 2,4,5-trimethoxybenzoate, 5.56 mL (40 mmoles) of triethylamine, and 15 mL of tetrahydrofuran were stirred at room temperature in a nitrogen atmosphere, to which were then added 22.8 mg (0.12 mmoles) of cuprous chloride, 131 mg (0.5 mmoles) of triphenylphosphine, and 70 mg (0.11 mmoles) of bis(triphenylphosphine)palladium chloride. The mixture was stirred under heating at 60° C. for 3 hours. Thereafter, the reaction mixture was cooled to room temperature, and 200 mL of water was added. The resulting crystal was filtered and subjected to a recrystallization operation from 100 mL of methanol to obtain 5.6 g (yield: 94%) of a targeted compound as a yellowish white crystal.

Incidentally, the compound was identified by $^1$H-NMR (400 MHz).

$^1$H-NMR (DMSO-d$_6$) δ3.92 (s, 3H), 3.93 (s, 3H), 4.05 (m, 9H), 4.15 (s, 3H), 6.96 (br, 2H), 7.46 (d, 2H), 7.55 (s, 1H), 7.62 (s, 1H), 7.69 (d, 2H), 7.76 (d, 2H), 7.98 (d, 2H), 10.30 (s, 1H)

The resulting compound had a melting point of 216 to 218° C.

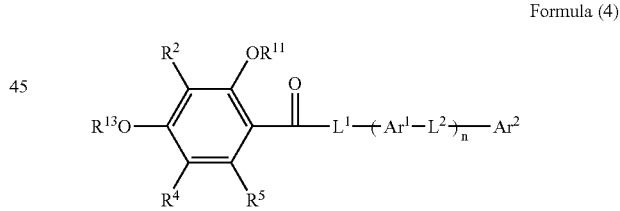

Formula (4)

In the formula (4), $R^2$, $R^4$ and $R^5$ each independently represents a hydrogen atom or a substituent; $R^{11}$ and $R^{13}$ each independently represents a hydrogen atom or an alkyl group; $L^1$ and $L^2$ each represents a single bond or a divalent linking group; $Ar^1$ represents an arylene group or a divalent aromatic hetero ring; $Ar^2$ represents an aryl group or a monovalent aromatic hetero ring; and n is an integer of 3 or more, provided that $L^2$'s and $Ar^1$'s in the plural number n may be either the same or different, $R^{11}$ and $R^{13}$ may be either the same or different, and an alkyl group represented by $R^{13}$ has no hetero atom.

In the formula (4), $R^2$, $R^4$ and $R^5$ each independently represents a hydrogen atom or a substituent. As the substituent, a substituent T as described later can be applied.

$R^2$ in the formula (4) is preferably a hydrogen atom, an alkyl group, an alkoxy group, an amino group, or a hydroxyl group; more preferably a hydrogen atom, an alkyl group or an alkoxy group; further preferably a hydrogen atom, an alkyl group (preferably having from 1 to 4 carbon atoms, more preferably a methyl group) or an alkoxy group (preferably having from 1 to 12 carbon atoms, more preferably from 1 to 8 carbon atoms, further preferably from 1 to 6 carbon atoms and especially preferably from 1 to 4 carbon atoms); especially preferably a hydrogen atom, a methyl group or a methoxy group; and most preferably a hydrogen atom.

$R^4$ in the formula (4) is preferably a hydrogen atom or an electron donating group; more preferably a hydrogen atom, an alkyl group, an alkoxy group, an amino group, or a hydroxyl group; further preferably a hydrogen atom, an alkyl group having from 1 to 4 carbon atoms or an alkoxy group having from 1 to 12 carbon atoms (preferably having from 1 to 12 carbon atoms, more preferably from 1 to 8 carbon atoms, further preferably from 1 to 6 carbon atoms and especially preferably from 1 to 4 carbon atoms); especially preferably a hydrogen atom, an alkyl group having from 1 to 4 carbon atoms or an alkoxy group having from 1 to 4 carbon atoms; and most preferably a hydrogen atom or a methoxy group.

$R^5$ in the formula (4) is preferably a hydrogen atom, a halogen atom, an alkyl group, an alkoxy group, an amino group or a hydroxyl group; more preferably a hydrogen atom, an alkyl group or an alkoxy group; further preferably a hydrogen atom, an alkyl group (preferably having from 1 to 4 carbon atoms and more preferably a methyl group), or an alkoxy group (preferably having from 1 to 12 carbon atoms, more preferably from 1 to 8 carbon atoms, further preferably from 1 to 6 carbon atoms and especially preferably from 1 to 4 carbon atoms); especially preferably a hydrogen atom, a methyl group or a methoxy group; and most preferably a hydrogen atom.

$R^{11}$ and $R^{13}$ in the formula (4) each independently represents a hydrogen atom or an alkyl group. $R^{11}$ and $R^{13}$ are different from each other and an alkyl group represented by $R^{13}$ has no hetero atom. The term "hetero atom" as used herein means an atom other than a hydrogen atom or a carbon atom and examples thereof include an oxygen atom, a nitrogen atom, a sulfur atom, phosphorus, silicon, halogen atoms (F, Cl Br and I) and boron.

The alkyl groups represented by $R^{11}$ and $R^{13}$ are alkyl groups which may be either linear, branched or cyclic and may further have a substituent. Preferable examples thereof include substituted or unsubstituted alkyl groups having from 1 to 30 carbon atoms, substituted or unsubstituted cycloalkyl groups having from 3 to 30 carbon atoms, substituted or unsubstituted bicycloalkyl groups having from 5 to 30 carbon atoms (i.e., monovalent groups remaining after taking off one hydrogen atom from bicycloalkane having from 5 to 30 carbon atoms), and tricyclo structures having more cyclic structures.

Preferable examples of the alkyl groups represented by $R^{11}$ and $R^{13}$ include a methyl group, an ethyl group, an n-propyl group, an isopropyl group, an n-butyl group, a sec-butyl group, a t-butyl group, an n-pentyl group, an iso-pentyl group, an n-hexyl group, an n-heptyl group, an n-octyl group, a tert-octyl group, a 2-ethylhexyl group, an n-nonyl group, a 1,1,3-trimethylhyxyl group, an n-decyl group, a 2-hexyldecyl group, a cyclohexyl group, a cycloheptyl group, a 2-hexenyl group, an oleyl group, a linoleyl group, a linolenyl group and so on. Examples of the cycloalkyl groups include a cyclohexyl group, a cyclopentyl group and 4-n-dodecylcyclohexyl group. Examples of the bicycloalkyl groups include a bicyclo[1,2,2]heptan-2-yl and bicyclo[2,2,2]octan-3-yl group.

$R^{11}$ is more preferably a hydrogen atom, a methyl group, an ethyl group, an n-propyl group or an isopropyl group; especially preferably a hydrogen atom or a methyl group and most preferably a methyl group.

$R^{13}$ is more preferably an alkyl group having 2 or more carbon atoms; further preferably an alkyl group having 3 or more carbon atoms; and especially preferably an alkyl group having a branched or cyclic structure.

Specific examples (O-1 to O-20) of the alkyl group represented by $R^{13}$ will be given below, but it should be construed that the invention is not limited to these specific examples at all. In the following specific examples, "#" means the oxygen atom side.

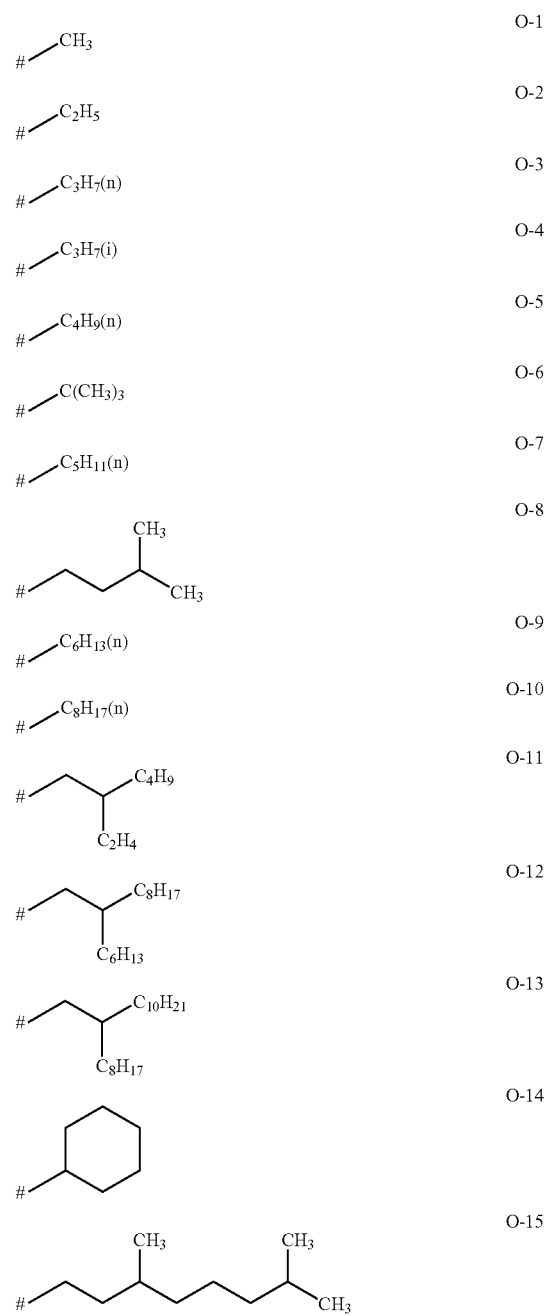

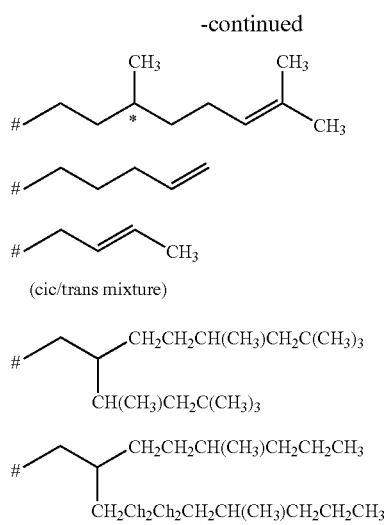

(cic/trans mixture)

In the above specific examples, "#" means the oxygen atom side.

$Ar^1$ in the formula (4) represents an arylene group or an aromatic hetero ring and $Ar^1$'s in the repeating units may be either all the same or different. $Ar^2$ represents an aryl group or an aromatic hetero ring.

The arylene group of $Ar^1$ in the formula (4) is preferably an arylene group having from 6 to 30 carbon atoms. It may be either a single ring or a fused ring formed together with another ring. It may further have a substituent if possible. As the substituent, the substituent T as described later can be applied. More preferably, the arylene group represented by $Ar^1$ has from 6 to 20 carbon atoms, especially preferably from 6 to 12 carbon atoms. Examples thereof include a phenylene group, a p-methylphenylene group and a naphthylene group.

The arylene group of $Ar^2$ in the formula (4) is preferably an arylene group having from 6 to 30 carbon atoms. It may be either a single ring or a fused ring formed together with another ring. It may further have a substituent if possible. As the substituent, the substituent T as described later can be applied. More preferably, the arylene group represented by $Ar^2$ has from 6 to 20 carbon atoms, especially preferably from 6 to 12 carbon atoms. Examples thereof include a phenylene group, a p-methylphenylene group and a naphthylene group.

The aromatic hetero rings represented by $Ar^1$ and $Ar^2$ in the formula (4) may be aromatic hetero rings containing at least one member selected from an oxygen atom, a nitrogen atom and a sulfur atom, preferably 5- or 6-membered aromatic hetero rings containing at least one member selected from an oxygen atom, a nitrogen atom and a sulfur atom. If possible, they may further have a substituent. As the substituent, the substituent T as described later can be applied.

Specific examples of the aromatic hetero rings represented by $Ar^1$ and $Ar^2$ in the formula (4) include furan, pyrrole, thiophene, imidazole, pyrazole, pyridine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzthiazole, a benzotriazole, tetrazaindene, pyrrolotriazole, pyrazolotriazole and so on. As the aromatic hetero ring, benzimidazole, benzoxazole, benzthiazole and benzotriazole are preferable.

In the formula (4), $L^1$ and $L^2$ each independently represents a single bond or a divalent linking group. $L^1$ and $L^2$ may be either the same or different. $L^2$'s in the repeating units may be either all the same or different.

Preferable examples of the divalent linking group include —O—, —NR— (wherein R represents a hydrogen atom or an alkyl group or an aryl group which may have a substituent), —CO—, —SO$_2$—, —S—, an alkylene group, a substituted alkylene group, an alkenylene group, a substituted alkenylene group, an alkynylene group and groups obtained by combining two or more of these divalent groups. Among all, —O—, —NR—, —CO—, —SO$_2$NR—, —NRSO$_2$—, —CONR—, —NRCO—, —COO— and —OCO— and an alknylene group are preferred. R preferably represents a hydrogen atom.

In the compound represented by the formula (4), $Ar^1$ binds to $L^1$ and $L^2$. In the case where $Ar^1$ is a phenylene group, it is most preferable that $L^1$-$Ar^1$-$L^2$ and $L^2$-$Ar^1$-$L^2$ are in the meta-positions (1,4-positions).

In the formula (4), n is an integer of 3 or more, preferably from 3 to 7, more preferably from 3 to 6 and further preferably from 3 to 5.

Among the compounds represented by the formula (4), compounds represented by the following formulae (5) and (6) are particularly preferably usable.

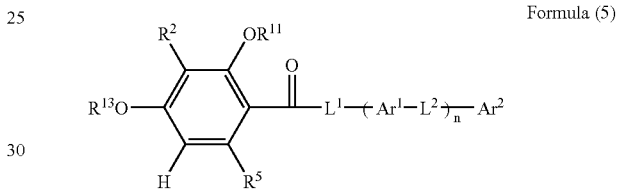

Formula (5)

In the formula (5), $R^2$ and $R^5$ each independently represents a hydrogen atom or a substituent; $R^{11}$ and $R^{13}$ each independently represents a hydrogen atom or an alkyl group; $L^1$ and $L^2$ each independently represents a single bond or a divalent linking group; $Ar^1$ represents an arylene group or a divalent aromatic hetero ring; $Ar^2$ represents an aryl group or a monovalent aromatic hetero ring; and n is an integer of 3 or more, provided that $L^2$'s and $Ar^1$'s in the plural number n may be either the same or different, $R^{11}$ and $R^{13}$ are different from each other, and an alkyl group represented by $R^{13}$ has no hetero atom.

In the formula (5), $R^2$, $R^5$, $R^{11}$ and $R^{13}$ have the same meaning as defined in the formula (4) of the formula (III) and preferable ranges thereof are also the same. Similarly, $L^1$, $L^2$, $Ar^1$ and $Ar^2$ have the same meaning as defined in the formula (4) of the formula (III) and preferable ranges thereof are also the same.

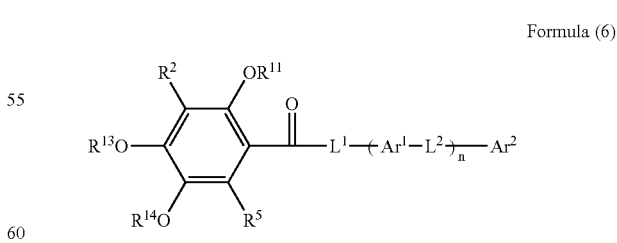

Formula (6)

In the formula (6), $R^2$ and $R^5$ each independently represents a hydrogen atom or a substituent; $R^{11}$ and $R^{13}$ each independently represents a hydrogen atom or an alkyl group; $L^1$ and $L^2$ each independently represents a single bond or a divalent linking group; $Ar^1$ represents an arylene group or a divalent aromatic hetero ring; $Ar^2$ represents an aryl group or a monovalent aromatic hetero ring; and n is an integer of 3 or more, provided that $L^2$'s and $Ar^1$'s in the plural number n may be either the same or different, $R^{11}$ and $R^{13}$ are different from each other, and an alkyl group represented by $R^{13}$ has no hetero atom.

In the formula (6), $R^2$, $R^5$, $R^{11}$ and $R^{13}$ have the same meaning as defined in the formula (4) and preferable ranges thereof are also the same. Similarly, $L^1$, $L^2$, $Ar^1$ and $Ar^2$ have the same meaning as defined in the formula (4) and preferable ranges thereof are also the same.

In the formula (6), $R^{14}$ represents a hydrogen atom or an alkyl group. As the alkyl group, use may be preferably made of the alkyl groups cited above as preferable examples of $R^{11}$ and $R^{13}$.

The above-described $R^{14}$ is preferably a hydrogen atom or an alkyl group having from 1 to 4 carbon atoms, more preferably a hydrogen atom or an alkyl group having from 1 to 3 carbon atoms, and further preferably a methyl group. Although $R^{11}$ and $R^{14}$ may be either the same or different, it is especially preferred that both of them are methyl groups.

As the compound represented by the above formula (6), compounds represented by the formula (6-A) or the formula (6-B) are also preferred.

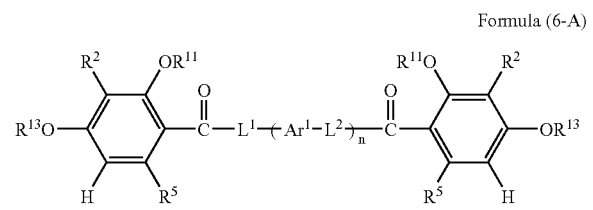

Formula (6-A)

In the formula (6-A), $R^2$ and $R^5$ each independently represents a hydrogen atom or a substituent; $R^{11}$ and $R^{13}$ each independently represents a hydrogen atom or an alkyl group; $L^1$ and $L^2$ each independently represents a single bond or a divalent linking group; $Ar^1$ represents an arylene group or an aromatic hetero ring; and n is an integer of 3 or more, provided that $L^1$'s and $Ar^2$'s in the plural number n may be either the same or different, $R^{11}$ and $R^{13}$ are different from each other, and an alkyl group represented by $R^{13}$ has no hetero atom.

In the formula (6-A), $R^2$, $R^5$, $R^{11}$, $R^{13}$, $L^1$, $L^2$, $Ar^1$ and n have the same meaning as defined in the formula (4) and preferable ranges thereof are also the same.

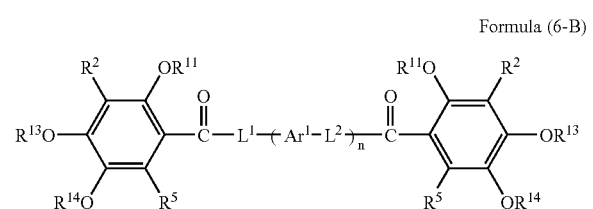

Formula (6-B)

In the formula (6-B), $R^2$ and $R^5$ each independently represents a hydrogen atom or a substituent; $R^{11}$, $R^{13}$ and $R^{14}$ each independently represents a hydrogen atom or an alkyl group; $L^1$ and $L^2$ each independently represents a single bond or a divalent linking group; $Ar^1$ represents an arylene group or an aromatic hetero ring; and n is an integer of 3 or more, provided that $L^1$'s and $Ar^2$'s in the plural number n may be either the same or different, $R^{11}$ and $R^{13}$ are different from each other, and an alkyl group represented by $R^{13}$ has no hetero atom.

In the formula (6-B), $R^2$, $R^5$, $R^{11}$, $R^{13}$, $R^{14}$, $L^1$, $L^2$, $Ar^1$ and n have the same meaning as defined in the formula (4) and the formula (6) and preferable ranges thereof are also the same.

The foregoing substituent T will be hereunder described.

Namely, the substituent T preferably represents a halogen atom (for example, a fluorine atom, a chlorine atom, a bromine atom and an iodine atom), an alkyl group (preferably having from 1 to 30 carbon atoms; for example, a methyl group, an ethyl group, an n-propyl group, an isopropyl group, a t-butyl group, an n-octyl group and a 2-ethylhexyl group), a cycloalkyl group (a substituted or unsubstituted cycloalkyl group preferably having from 3 to 30 carbon atoms; for example, a cyclohexyl group, a cyclopentyl group and a 4-n-dodecylcyclohexyl group), a bicycloalkyl group (a substituted or unsubstituted bicycloalkyl group preferably having from 5 to 30 carbon atoms, i.e., a monovalent group remaining after removing one hydrogen atom from a bicycloalkane having from 5 to 30 carbon atoms; for example, bicyclo[1,2,2,]heptan-2-yl and bicyclo[2,2,2]octan-3-yl), an alkenyl group (a substituted or unsubstituted alkenyl group preferably having from 2 to 30 carbon atoms; for example, a vinyl group and an allyl group), a cycloalkenyl group (a substituted or unsubstituted cycloalkenyl group preferably having from 3 to 30 carbon atoms, i.e., a monovalent group remaining after removing one hydrogen atom from a bicycloalkene having from 3 to 30 carbon atoms; for example, 2-cyclopenten-1-yl and 2-cyclohexen-1-yl), a bicycloalkenyl group (a substituted or unsubstituted bicycloalkenyl group preferably having from 5 to 30 carbon atoms, i.e., a monovalent group remaining after removing one hydrogen atom from a bicycloalkene having one double bond; for example, bicyclo[2,2,1]hept-2-en-1-yl and bicyclo[2,2,2]oct-2-en-4-yl), an alkynyl group (a substituted or unsubstituted alkynyl group preferably having from 2 to 30 carbon atoms; for example, an ethynyl group and a propargyl group), an aryl group (a substituted or unsubstituted aryl group preferably having from 6 to 30 carbon atoms; for example, a phenyl group, a p-tolyl group and a naphthyl group), heterocyclic groups (a monovalent group remaining after removing one hydrogen atom from a substituted or unsubstituted, preferably 5- or 6-membered, aromatic or non-aromatic compound, more preferably a 5- or 6-memebred aromatic heterocyclic group having from 3 to 30 carbon atoms; for example, a 2-furyl group, a 2-thienyl group, a 2-pyrimidinyl group and a 2-benzothiazolyl group), a cyano group, a hydroxyl group, a nitro group, a carboxyl group, an alkoxy group (a substituted or unsubstituted alkoxy group preferably having from 1 to 30 carbon atoms; for example, a methoxy group, an ethoxy group, an isopropoxy group, a t-butoxy group, an n-octyloxy group and a 2-methoxyethoxy group), an aryloxy group (a substituted or unsubstituted aryloxy group preferably having from 6 to 30 carbon atoms; for example, a phenoxy group, a 2-methylphenoxy group, a 4-tert-butylphenoxy group, a 3-nitrophenoxy group and a 2-tetradecanoylaminophenoxy group), a silyloxy group (a silyloxy group preferably having from 3 to 20 carbon atoms; for example, a trimethylsilyloxy group and a tert-butyldimethylsilyloxy group), a heterocyclic oxy group (a substituted or unsubstituted heterocyclic oxy group preferably having from 2 to 30 carbon atoms; for example, a 1-phenyltetrazol-5-oxy group and a 2-tetrahydropyranyloxy group), an acyloxy group (preferably a formyloxy group, a substituted or unsubstituted alkylcarbonyloxy group having from 2 to 30 carbon atoms, a substituted or unsubstituted arylcarbonyloxy group having from 6 to 30 carbon atoms; for example, a formyloxy group, an acetyloxy group, a pivaloyloxy group, a stearoyloxy group, a benzoyloxy group and a p-methoxyphenylcarbonyloxy group), a carbamoyloxy group (a substituted or unsubstituted carbamoyloxy group preferably having from 1 to 30 carbon atoms; for example, an N,N-dimethylcarbamoyloxy group, an N,N-diethylcarbamoyloxy group, a morpholinocarbonyloxy group, an N,N-di-n-octylaminocarbonyloxy group, and an N-n-octylcarbamoyloxy group), an alkoxycarbonyloxy group (a substituted or unsubstituted alkoxycarbonyloxy group preferably having from 2 to 30 carbon atoms; for example, a methoxycarbonyloxy group, an ethoxycarbonyloxy group, a tert-butoxycarbonyloxy group and an n-octylcarbonyloxy group), an aryloxycarbonyloxy group (a substituted or unsubstituted aryloxycarbonyloxy group preferably having from 7 to 30 carbon atoms; for example, a phenoxycarbonyloxy group, a p-methoxyphenoxycarbonyloxy group and a p-n-hexadecyloxyphenoxycarbonyloxy group), an amino group (preferably an amino group, a substituted or unsubstituted alkylamino group having from 1 to 30 carbon atoms, a substituted or unsubstituted anilino group having from 6 to 30 carbon atoms; for example, an amino group, a methylamino group, a dimethylamino group, an anilino group, an N-methyl-anilino group and a diphenylamino group), an acylamino group (preferably a formylamino group, a substituted or unsubstituted alkylcarbonylamino group having form 1 to 30 carbon atoms, a substituted or unsubstituted arylcarbonylamino group having from 6 to 30 carbon atoms; for example, a formylamino group, an acetylamino group, a pivaloylamino group, a lauroylamino group and a benzoylamino group), an aminocarbonylamino group (a substituted or unsubstituted aminocarbonylamino group preferably having from 1 to 30 carbon atoms; for example, a carbamoylamino group, an N,N-dimethylaminocarbonylamino group, an N,N-diethylaminocarbonylamino group and a morpholinocarbonylamino group), an alkoxycarbonylamino group (a substituted or unsubstituted alkoxycarbonylamino group preferably having from 2 to 30 carbon atoms; for example, a methoxycarbonylamino group, an ethoxycarbonylamino group, a tert-butoxycarbonylamino group, an n-octadecyloxycarbonylamino group and an N-methyl-methoxycarbonylamino group), an aryloxycarbonylamino group (a substituted or unsubstituted aryloxycarbonylamino group preferably having from 7 to 30 carbon atoms; for example, a phenoxycarbonylamino group, a p-chlorophenoxycarbonylamino group and m-n-octyloxyphenoxycarbonylamino group), a sulfamoylamino group (a substituted or unsubstituted sulfamoylamino group preferably having from 0 to 30 carbon atoms; for example, a sulfamoylamino group, an N,N-dimethylaminosulfonylamino group and an N-n-octylaminosulfonylamino group), an alkyl- or arylsulfonylamino group (a substituted or unsubstituted alkylsulfonylamino preferably having from 1 to 30 carbon atoms, a substituted or unsubstituted arylsulfonylamino group preferably having from 6 to 30 carbon atoms; for example, a methylsulfonylamino group, a butylsulfonylamino group, a phenylsulfonylamino group, a 2,3,5-trichlorophenylsulfonylamino group and a p-methylphenylsulfonylamino group), a mercapto group, an alkylthio group (a substituted or unsubstituted alkylthio group preferably having from 1 to 30 carbon atoms; for example, a methylthio group, an ethylthio group and an n-hexadecyltio group), an arylthio group (a substituted or unsubstituted arylthio group preferably having from 6 to 30 carbon atoms; for example, a phenylthio group, a p-chlorophenylthio group and an m-methoxyphenylthio group), a heterocyclic thio group (a substituted or unsubstituted heterocyclic thio group preferably having from 2 to 30 carbon atoms; for example, a 2-benzothiazolylthio group and a 1-phenyltetrazol-5-ylthio group), a sulfamoyl group (a substituted or unsubstituted sulfamoyl group preferably having from 0 to 30 carbon atoms; for example, an N-ethylsulfamoyl group, an N-(3-dodecyloxypropyl)sulfamoyl group, an N,N-dimetylsulfamoyl group, an N-acetylsulfamoyl group, an N-benzoylsulfamoyl group and an N—(N''-phenylcarbamoyl)sulfamoyl group), a sulfo group, an alkyl-aryl-sulfinyl group (a substituted or unsubstituted alkylsulfinyl group preferably having from 1 to 30 carbon atoms, a substituted or unsubstituted arylsulfinyl group preferably having from 6 to 30 carbon atoms; for example, a methylsulfinyl group, an ethylsulfinyl group, a phenylsulfinyl group and a p-methylphenylsulfinyl group), an alkyl- or arylsulfonyl group (a substituted or unsubstituted alkylsulfonyl group preferably having from 1 to 30 carbon atoms, a substituted or unsubstituted arylsulfonyl group preferably having from 6 to 30 carbon atoms; for example, a methylsulfonyl group, an ethylsulfonyl group, a phenylsulfonyl group and a p-methylphenylsulfonyl group), an acyl group (preferably a formyl group, a substituted or unsubstituted alkylcarbonyl group having from 2 to 30 carbon atoms, a substituted or unsubstituted arylcarbonyl group having from 7 to 30 carbon atoms; for example, an acetyl group and a pivaloylbenzoyl group), an aryloxycarbonyl group (a substituted or unsubstituted aryloxycarbonyl group preferably having from 7 to 30 carbon atoms; for example, a phenoxycarbonyl group, an o-chlorophenoxycarbonyl group, an m-nitrophenoxycarbonyl group and a p-tert-butylphenoxycarbonyl group), an alkoxycarbonyl group (a substituted or unsubstituted alkoxycarbonyl group preferably having from 2 to 30 carbon atoms; for example, a methoxycarbonyl group, an ethoxycarbonyl group, a tert-butoxycarbonyl group and an n-octadecyloxycarbonyl group), a carbamoyl group (a substituted or unsubstituted carbamoyl group preferably having from 1 to 30 carbon atoms; for example, a carbamoyl group, an N-methylcarbamoyl group, an N,N-dimethylcarbamoyl group, an N,N-di-n-octylcarbamoyl group and an N-(methylsulfonyl)carbamoyl group), aryl- and heterocyclic azo groups (a substituted or unsubstituted arylazo group preferably having from 6 to 30 carbon atoms, a substituted or unsubstituted heterocyclic azo group preferably having from 3 to 30 carbon atoms; for example, a phenylazo group, a p-chlorophenylazo group and a 5-ethylthio-1,3,4-thiaziazol-2-ylazo group), an imido group (preferably an N-succinimido group and an n-phthalimido group), a phosphino group (a substituted or unsubstituted phosphino group preferably having from 2 to 30 carbon atoms; for example, a dimethylphosphino group, a diphenylphosphino group and a methylphenoxyphosphino group), a phosphinyl group (a substituted or unsubstituted phosphinyl group preferably having from 2 to 30 carbon atoms; for example, a phosphinyl group, a dioctyloxyphosphinyl group and a diethoxyphosphinyl group), a phosphinyloxy group (a substituted or unsubstituted phosphinyloxy group preferably having from 2 to 30 carbon atoms; for example, a diphenoxyphosphinyloxy group and a dioctyloxyphosphinyloxy group), a phosphinylamino group (a substituted or unsubstituted phosphinylamino group preferably having from 2 to 30 carbon atoms; for example, a dimethoxyphosphinylamino group and a dimethylaminophosphinylamino group), or a silyl group (a substituted or unsubstituted silyl group preferably having from 3 to 30 carbon atoms; for example, a trimethylsilyl group, a tert-butyldimethylsilyl group and a phenyldimethylsilyl group).

In substituents having hydrogen atom(s) from among those cited above, the hydrogen atom(s) may be removed and further substituted by such substituents as cited above. Examples of such functional groups include an alkylcarbonylaminosulfonyl group, an arylcarbonylaminosulfonyl group, an alkylsulfonylaminocarbonyl group and an arylsulfonylaminocarbonyl group. Specific examples thereof include a methylsulfonylaminocarbonyl group, a p-methylphenylsulfonylaminocarbonyl group, an acetylaminosulfonyl group and a benzoylaminosulfonyl group.

Furthermore, when two or more substituents are present, these substituents may be the same or different. Moreover, if possible, the substituents may be taken together to form a ring.

In the compounds represented by the formula (6-A) and the formula (6-B), a preferable compound is one wherein $R^{11}$'s are all methyl groups; $R^2$ and $R^5$ are both hydrogen atoms; $R^{13}$ is an alkyl group having 3 or more carbon atoms; $L^1$ is a single bond, —O—, —CO—, —NR—, —SO$_2$NR—, —NRSO$_2$—, —CONR—, —NRCO—, COO— or an alkynylene group (wherein R represents a hydrogen atom, an optionally substituted alkyl group or an aryl group, preferably a hydrogen atom); $L^2$ is —O= or —NR— (wherein R represents a hydrogen atom, an optionally substituted alkyl group or an aryl group, preferably a hydrogen atom); $Ar^1$ is an arylene group; and n is from 3 to 6.

Specific examples of the compounds represented by the formulae (6-A) and (6-B) will be given below, but it should be construed that the invention is not limited to these specific examples at all.

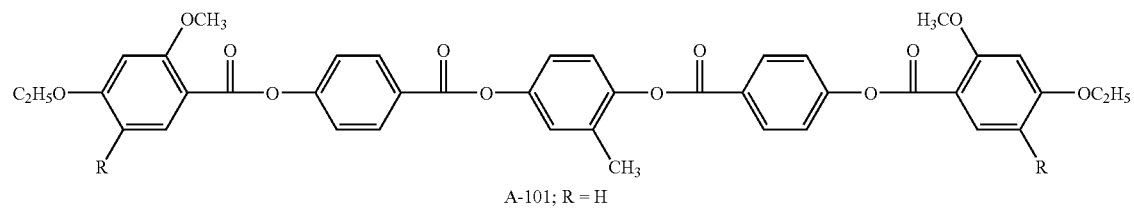

A-101; R = H
B-101; R = OCH$_3$

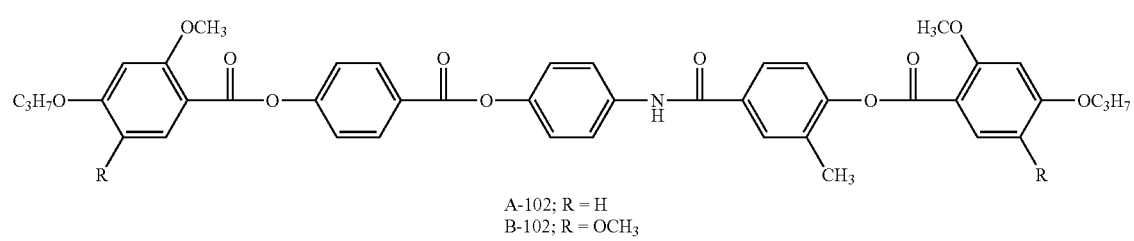

A-102; R = H
B-102; R = OCH$_3$

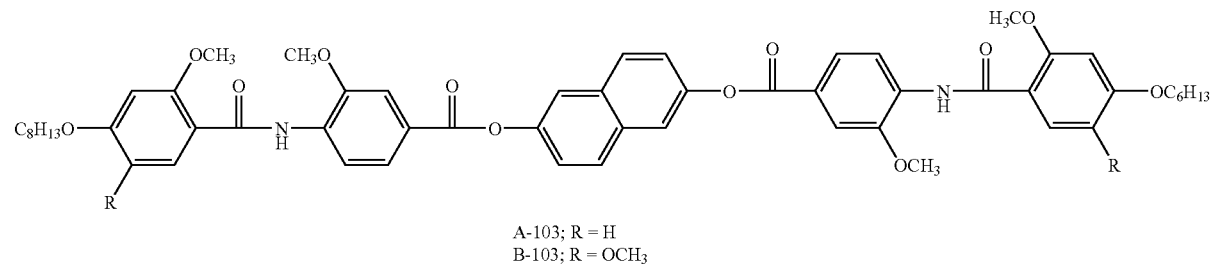

A-103; R = H
B-103; R = OCH$_3$

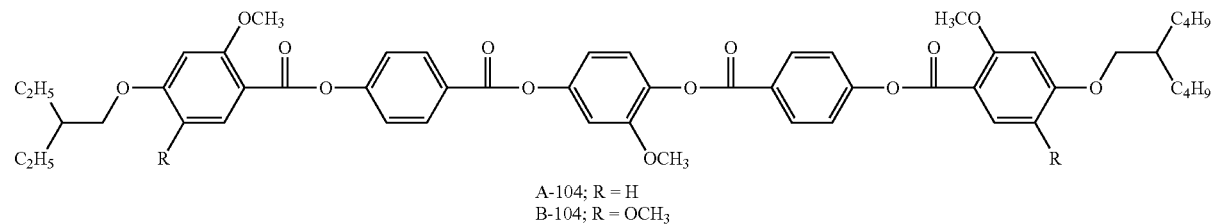

A-104; R = H
B-104; R = OCH$_3$

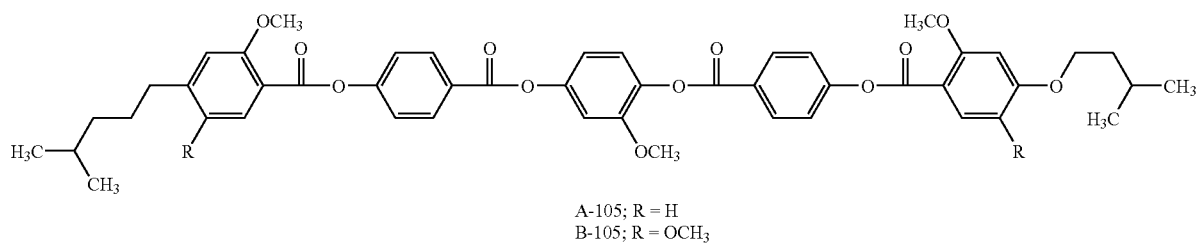

A-105; R = H
B-105; R = OCH$_3$

-continued
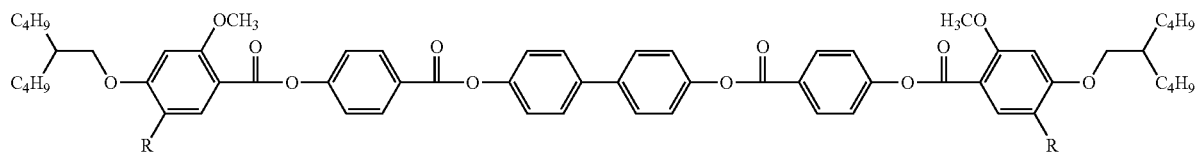
A-106; R = H
B-106; R = OCH₃
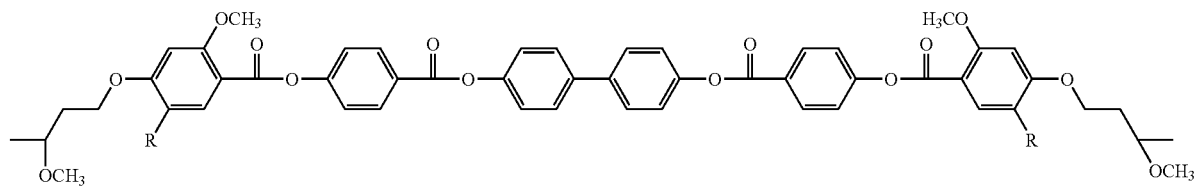
A-107; R = H
B-107; R = OCH₃
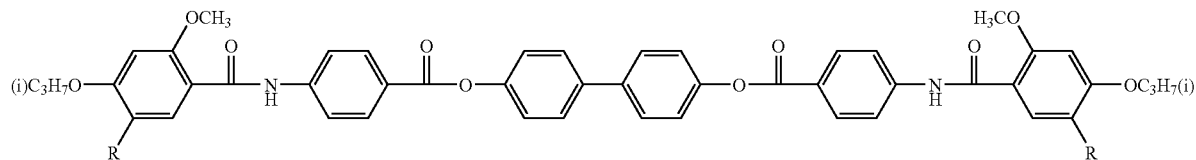
A-108; R = H
B-108; R = OCH₃
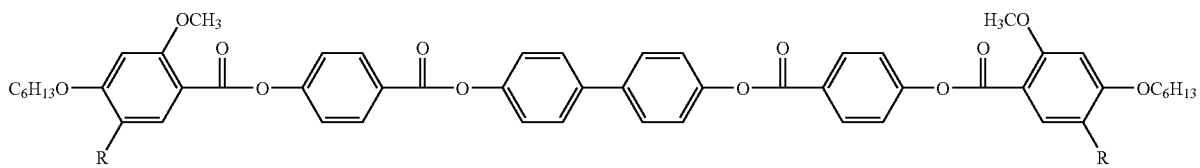
A-109; R = H
B-109; R = OCH₃
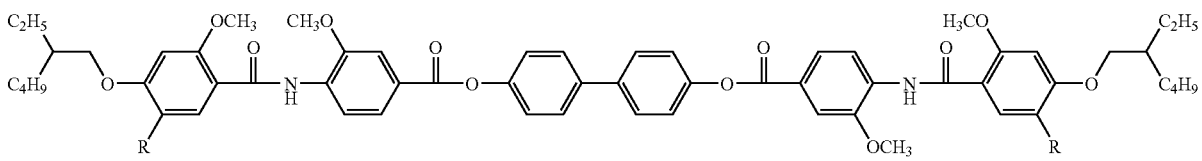
A-110; R = H
B-110; R = OCH₃
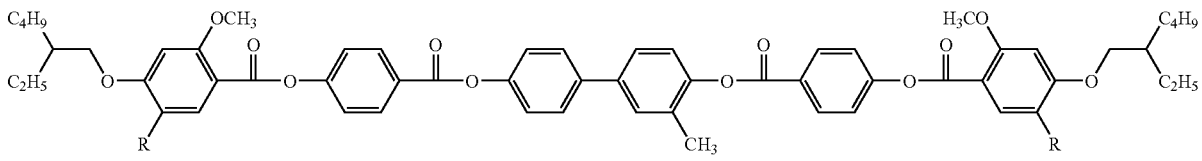
A-111; R = H
B-111; R = OCH₃
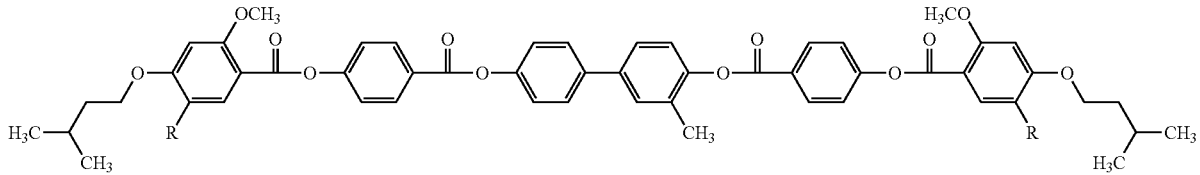
A-112; R = H
B-112; R = OCH₃

-continued
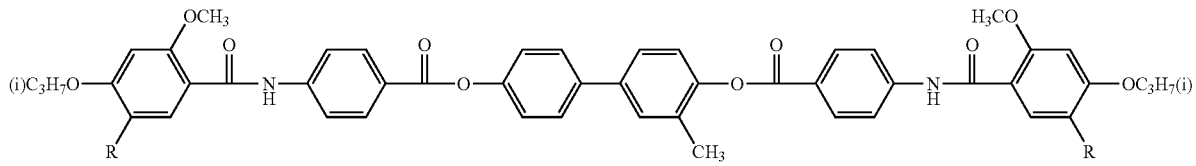
A-113; R = H
B-113; R = OCH₃
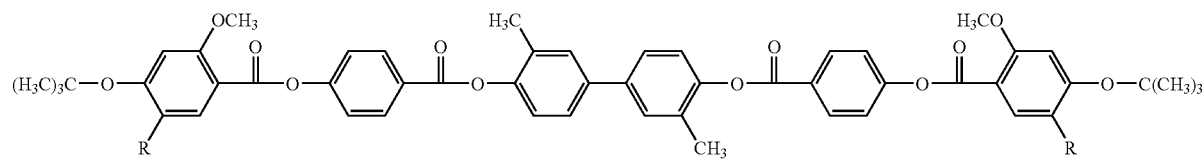
A-114; R = H
B-114; R = OCH₃
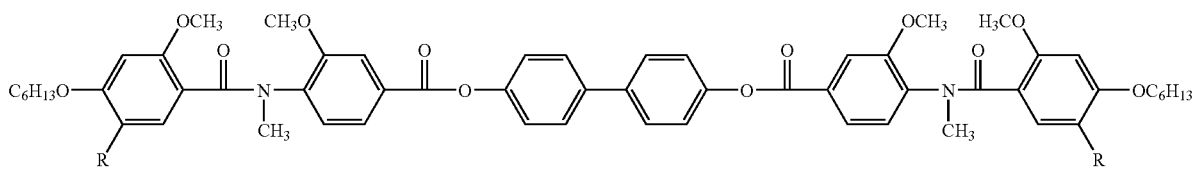
A-115; R = H
B-115; R = OCH₃
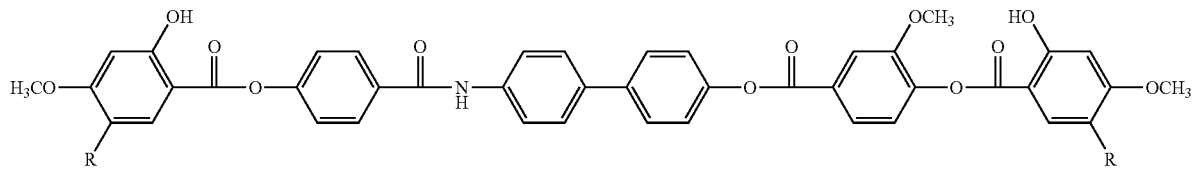
A-116; R = H
B-116; R = OCH₃
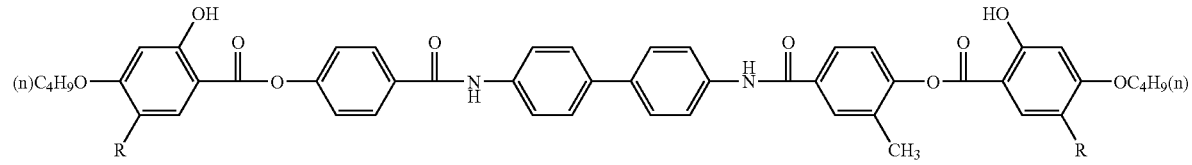
A-117; R = H
B-117; R = OCH₃
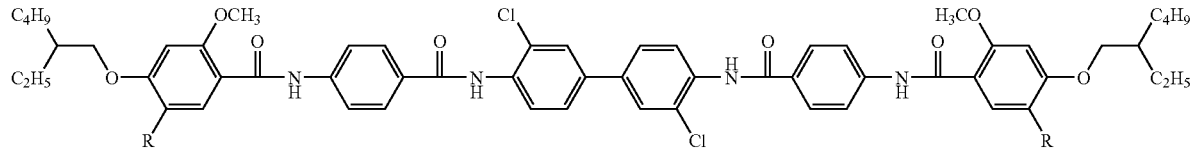
A-118; R = H
B-118; R = OCH₃
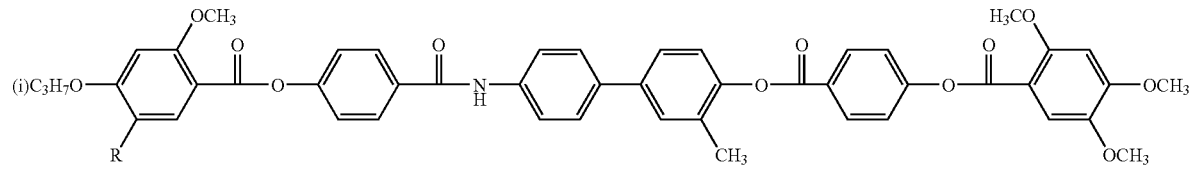
A-119; R = H
B-119; R = OCH₃

-continued
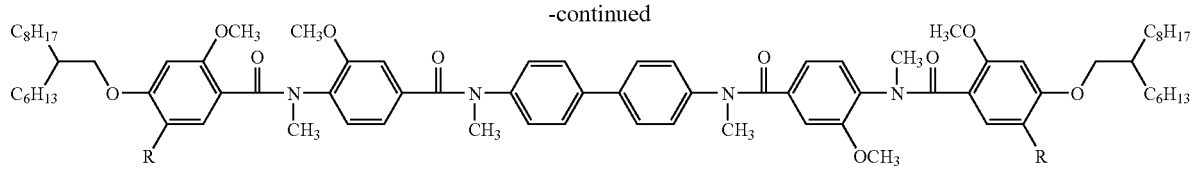
A-120; R = H
B-120; R = OCH₃
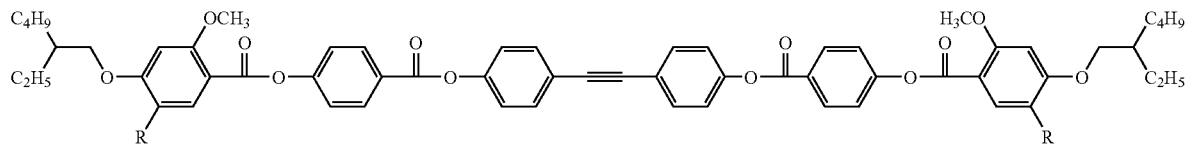
A-121; R = H
B-121; R = OCH₃
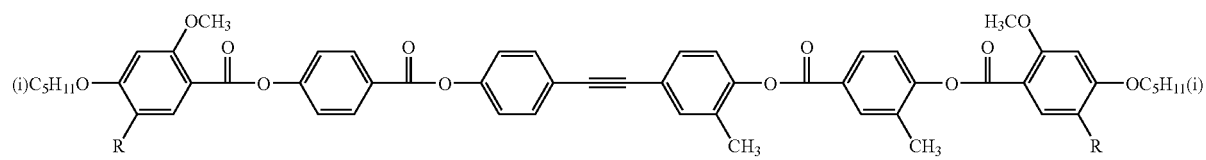
A-122; R = H
B-122; R = OCH₃
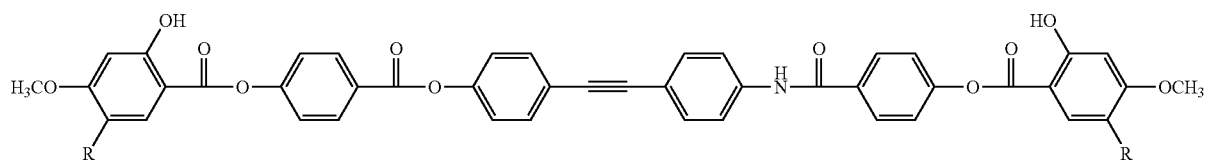
A-123; R = H
B-123; R = OCH₃
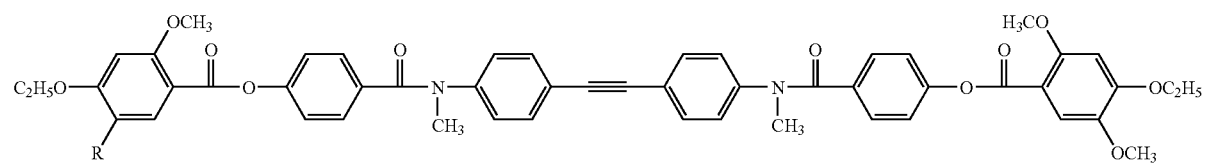
A-124; R = H
B-124; R = OCH₃
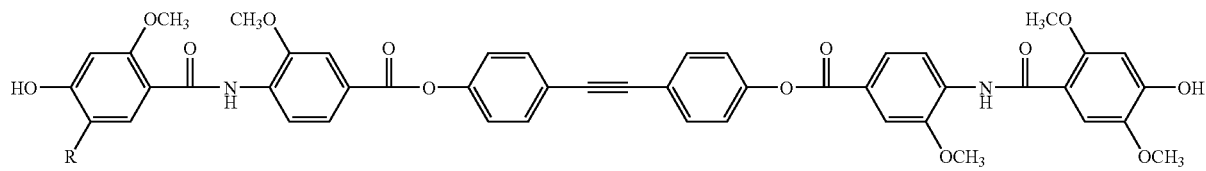
A-125; R = H
B-125; R = OCH₃
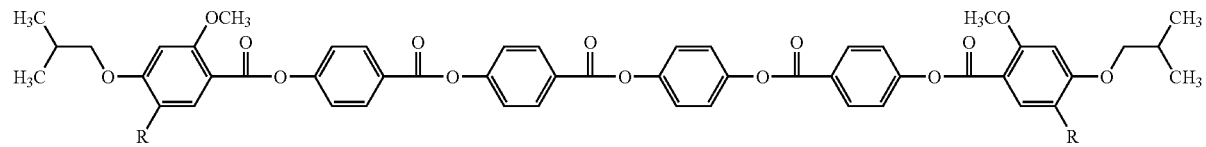
A-126; R = H
B-126; R = OCH₃

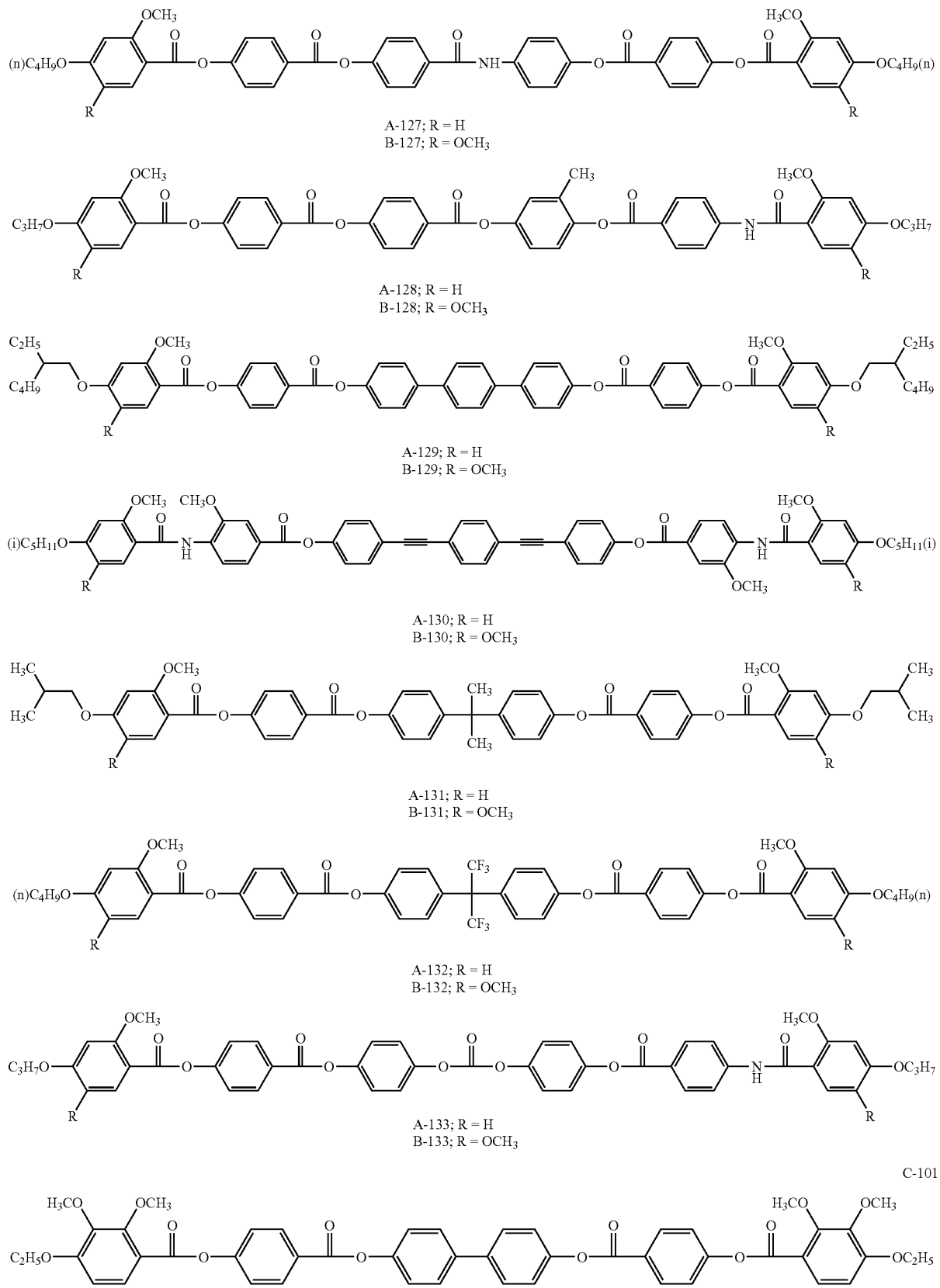

-continued

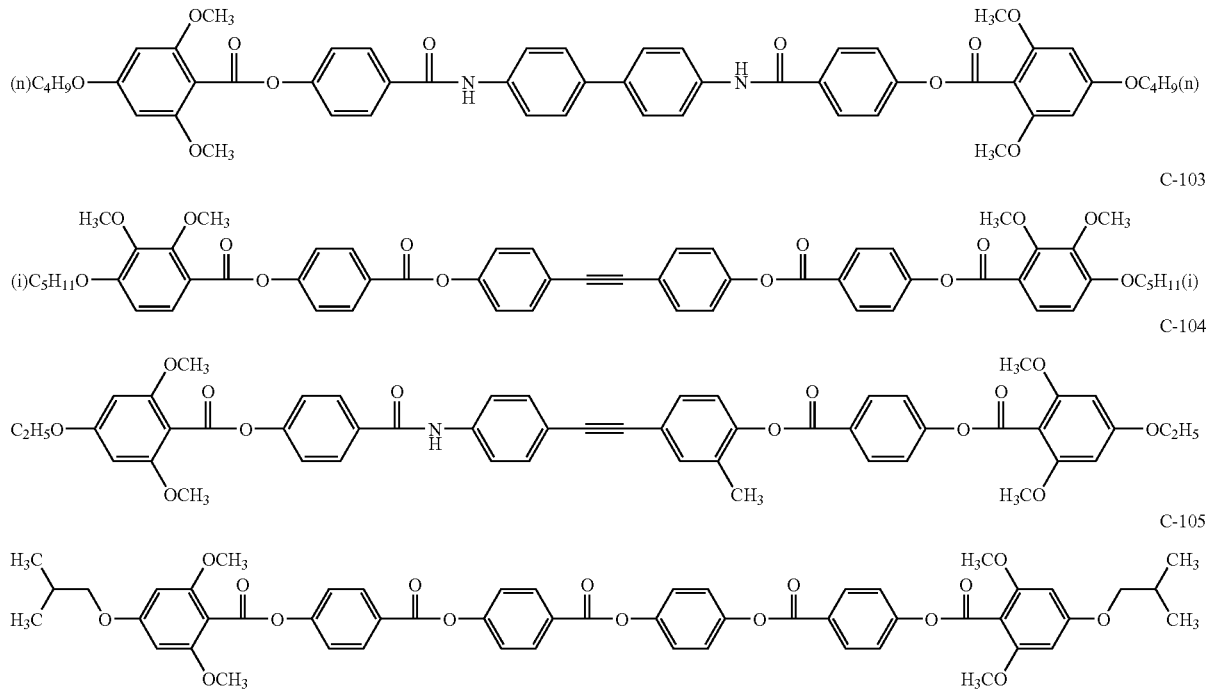

The compound represented by the formula (4) can be synthesized by first synthesizing a substituted benzoic acid and then subjecting the substituted benzoic acid to a general esterification reaction or an amidation reaction with a phenol derivative or an aniline derivative. Any reaction may be employed so far as it is an ester bond-forming or an amido bond-forming reaction. Examples thereof include a method for subjecting a substituted benzoic acid to functional group conversion into an acid halide and then condensing with a phenol derivative or an aniline derivative, and a method for dehydrating and condensing a substituted benzoic acid and a phenol derivative or an aniline derivative using a condensing agent or a catalyst.

When a production process and the like are taken into consideration, a method for subjecting a substituted benzoic acid to functional group conversion into an acid halide and then condensing with a phenol derivative or an aniline derivative is preferable as a method for producing the compound represented by the formula (4).

As a reaction solvent in the method for producing the compound represented by the formula (4), a hydrocarbon based solvent (preferably toluene and xylene), an ether based solvent (preferably dimethyl ether, tetrahydrofuran, and dioxane), a ketone based solvent, an ester based solvent, acetonitrile, dimethylformamide, dimethylacetamide, and the like can be used. These solvents may be used singly or in admixture of several kinds thereof. Of these, toluene, acetonitrile, dimethylformamide, and dimethylacetamide are preferable as the reaction solvent.

The reaction temperature is preferably from 0 to 150° C., more preferably from 0 to 100° C., further preferably from 0 to 90° C., and especially preferably from 20° C. to 90° C.

It is preferable that a base is not used in the present reaction. When a base is used, any of an organic base and an inorganic base is employable, and an organic base is preferable. Examples thereof include pyridine and tertiary alkylamines (preferably triethylamine and ethyldiisopropylamine).

The compounds represented by the formulae (6-A) and (6-B) can be synthesized by publicly known methods. For example, a compound wherein n is 4 can be obtained by reacting a starting compound having the following structure A with a derivative having a reactive site such as a hydroxyl group or an amino group and then linking two molecules of the intermediate B thus obtained to one molecule of the following compound C. However, the methods for synthesizing the compounds of the formulae (6-A) and (6-B) are not restricted to the above case.

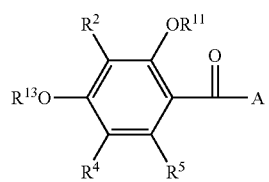

Structure A wherein A represents a reactive group such as a hydroxyl group or a halogen atom; $R^{11}$, $R^2$, $R^{13}$ and $R^5$ are each as defined above; and $R^4$ is a hydrogen atom or a linking group represented by $OR^{14}$ as described above.

A starting compound having this structure A is reacted with a derivative having a reactive site such as a hydroxyl group or an amino group. Then, the intermediate thus obtained:

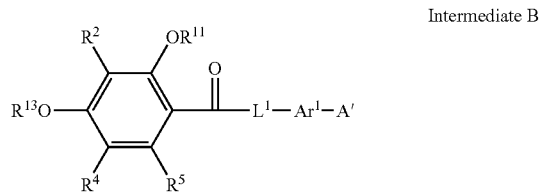

Intermediate B wherein A' represents a reactive group such as a carboxyl group; and $R^{11}, R^2, R^{13}, R^4, R^5, Ar^1$ and $L^1$ are each as defined above.

Two molecules of this intermediate B are linked to:

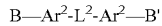                         Compound C wherein B and B' represents a reactive group such as a hydroxyl group or an amino group; and $Ar^2$ and $L^2$ have the same meanings respectively as $Ar^1$ and $L^1$.

The amount of addition of the retardation exhibiting agent of the invention is preferably from 1 to 30% by weight, and more preferably from 2 to 25% by weight based on 100 parts by weight of the cellulose acylate. When the foregoing compound is used within this range, it is possible to raise the retardation without causing bleedout.

It is preferable that the retardation exhibiting agent of the invention is dissolved in an organic solvent such as an alcohol, methylene chloride, and dioxolan in a state that the cellulose acylate concentration is 0.01% by weight or more but less than 5% by weight, the solution is mixed with a matting agent dispersion, and the mixture is then added a cellulose acylate solution (dope) having a cellulose acylate concentration of from 5% by weight to 35% by weight. The cellulose acylate concentration of the retardation exhibiting agent solution is more preferably 0.1% by weight or more but less than 3% by weight.

Furthermore, the cellulose acylate concentration in the cellulose acylate solution is more preferably from 10% by weight to 30% by weight. By employing such an addition method, it is possible to obtain a cellulose acylate film having desired retardation and low haze.

(Matting Agent Fine Particle)

It is preferable that a fine particle is added as a matting agent in the cellulose acylate film of the invention. Examples of the fine particle which can be used in the invention include silicon dioxide, titanium dioxide, aluminum oxide, zirconium oxide, calcium carbonate, calcium carbonate, talc, clay, calcined kaolin, calcined calcium silicate, hydrated calcium silicate, aluminum silicate, magnesium silicate, and calcium phosphate. Of these fine particles, ones containing silicon are preferable because the turbidity is low, and silicon dioxide is especially preferable. The fine particle of silicon dioxide preferably has an average primary particle size of from 1 nm to 20 nm and an apparent specific gravity of 70 g/liter or more. One having a small average primary particle size as from 5 to 16 nm is more preferable because it can reduce the haze. The apparent specific gravity is preferably from 90 to 200 g/liter, and more preferably from 100 to 200 g/liter. When the apparent specific gravity is large, it becomes possible to prepare a dispersion with high concentration, and the haze and aggregation are improved, and therefore, such is preferable.

Such a fine particle usually forms a secondary particle having an average particle of from 0.05 to 2.0 μm and is present as an aggregate in the film, thereby forming irregularities of from 0.05 to 2.0 μm on the film surface. The average secondary particle size is from 0.05 μm to 1.0 μm, more preferably from 0.1 μm to 0.7 μm, and most preferably from 0.1 μm to 0.4 μm. With respect to the primary or secondary particle size, particles in the film were observed by a scanning electron microscope, and a diameter of a circle which is circumscribed on the particle was defined as the particle size. Furthermore, 200 parts are observed by changing the place, and an average value thereof is defined as the average particle size.

As the fine particle of silicon dioxide, for example, commercially available products such as AEROSIL R972, AEROSIL R972V, AEROSIL R974, AEROSIL R812, AEROSIL 200, AEROSIL 200V, AEROSIL 300, AEROSIL R202, AEROSIL OX50, and AEROSIL TT600 (all of which are manufactured by Nippon Aerosil Co., Ltd.) can be used. As the fine particle of zirconium oxide, for example, commercially available products such as AEROSIL R976 and AEROSIL R811 (all of which are manufactured by Nippon Aerosil Co., Ltd.) can be used. Of these, AEROSIL 200V and AEROSIL R972V are especially preferable because they are a fine particle of silicon dioxide have an average primary particle size of not more than 20 nm and an apparent specific gravity of 70 g/liter or more and have an effect for decreasing a coefficient of friction while keeping the haze of an optical film low.

It is preferable that the matting agent of the invention is prepared by the following method. That is, a method in which a fine particle dispersion resulting from stirring and mixing a solvent and a fine particle is previously prepared, this fine particle dispersion is added to a solution as separately prepared which has a cellulose acylate concentration of less than 5% by weight and contains from 1 to 40% by weight of an additive having a molecular weight of from 200 to 2,000 and a log P of 2 or more, and the mixture is stirred for dissolution and then further mixed with the main cellulose acylate dope solution is preferable. By stretching the film as cast by this method, a retardation film having low haze and desired retardation is obtained.

For mixing of the matting agent dispersion and the additive solution and further mixing with the cellulose acylate solution, it is preferred to use an in-line mixer. Though the invention is not limited to such a method, in mixing a silicon dioxide fine particle with a solvent, etc. and dispersing the mixture, the concentration of silicon dioxide is preferably from 5 to 30% by weight, more preferably from 10 to 25% by weight, and most preferably from 15 to 20% by weight. When the dispersing concentration is high, the turbidity against the amount of addition of the same amount is low and the haze and aggregation are improved, and therefore, such is preferable. The amount of addition of the matting agent in the final cellulose acylate dope solution is preferably from 0.001 to 1.0% by weight, more preferably from 0.005 to 0.5% by weight, and most preferably from 0.01 to 0.1% by weight.

(Production of Cellulose Acylate Film)

The cellulose acylate film of the invention is produced by a solvent casting method. In the solvent casting method, the film is produced by using a solution (dope) having an cellulose acylate dissolved in an organic solvent.

The organic solvent preferably includes a solvent selected from an ether having from 3 to 12 carbon atoms, a ketone having from 3 to 12 carbon atoms, an ester having from 3 to 12 carbon atoms, and a halogenated hydrocarbon having from 1 to 6 carbon atoms.

The ether, the ketone and the ester may each have a cyclic structure. A compound containing any two or more of functional groups of the ether, the ketone and the ester (that is, —O—, —CO—, and —COO—) can also be used as the organic solvent. The organic solvent may contain other functional group such as an alcoholic hydroxyl group. In the case of an organic solvent containing two or more kinds of functional groups, it is preferable that the number of carbon atom thereof falls within the foregoing preferred range of the number of carbon atom of the solvent containing any functional group.

Examples of the ether having from 3 to 12 carbon atoms include diisopropyl ether, dimethoxymethane, dimethoxyethane, 1,4-dioxane, 1,3-ioxolan, tetrahydrofuran, anisole, and phenetole.

Examples of the ketone having from 3 to 12 carbon atoms include acetone, methyl ethyl ketone, diethyl ketone, diisobutyl ketone, cyclohexanone, and methylcyclohexanone.

Examples of the ester having from 3 to 12 carbon atoms include ethyl formate, propyl formate, pentyl formate, methyl acetate, ethyl acetate, and pentyl acetate.

Examples of the organic solvent containing two or more kinds of functional groups include 2-thoxyethyl acetate, 2-methoxyethanol, and 2-butoxyethanol.

The number of carbon atom of the halogenated hydrocarbon is preferably 1 or 2, and most preferably 1. The halogen of the halogenated hydrocarbon is preferably chlorine. A proportion of the hydrogen atom of the halogenated hydrocarbon as substituted with the halogen is preferably from 25 to 75% by mole, more preferably from 30 to 70% by mole, further preferably from 35 to 65% by mole, and most preferably from 40 to 60% by mole. Methylene chloride is a representative halogenated hydrocarbon.

As the organic solvent of the invention, the use of a mixture of methylene chloride with an alcohol is preferable. A rate of methylene chloride to the alcohol is preferably from 1% by weight to 50% by weight, more preferably from 10% by weight to 40% by weight, and most preferably from 12% by weight to 30% by weight. As the alcohol, methanol, ethanol, and n-butanol are preferable, and a mixture of two or more kinds of alcohols may be used.

The cellulose acylate solution can be prepared by a general method including the treatment at a temperature of 0° C. or higher (normal temperature or high temperature). The preparation of the solution can be carried out by using a preparation method of a dope and a device in the usual solvent casting method. Incidentally, in the case of the general method, it is preferred to use a halogenated hydrocarbon (in particular, methylene chloride) as the organic solvent.

The amount of the cellulose acylate is preferably adjusted such that it is contained in an amount of from 10 to 40% by weight in the resulting solution. The amount of the cellulose acylate is more preferably from 10 to 30% by weight. An arbitrary additive as described later may be added in the organic solvent (prime solvent).

The solution can be prepared by stirring the cellulose acylate and the organic solvent at the normal temperature (from 0 to 40° C.). The solution with high concentration may be stirred under a pressurizing and heating condition. Concretely, the cellulose acylate and the organic solvent are charged in a pressure vessel, and after closing the vessel, the mixture is stirred under a pressure while heating at a temperature in the range of from the boiling point of the solvent at the normal temperature to a temperature at which the solvent is not boiled.

The heating temperature is usually 40° C. or higher, preferably from 60 to 200° C., and more preferably from 80 to 110° C.

The respective components may be previously roughly mixed and then charged in the vessel. Also, they may be successively charged in the vessel. The vessel must be constructed such that stirring can be achieved. The vessel can be pressurized by injecting an inert gas such as a nitrogen gas. Furthermore, an increase of the vapor pressure of the solvent due to heating may be utilized. Alternatively, after closing the vessel, the respective components may be added under a pressure.

In the case of heating, it is preferable that the heating is carried out from the outside of the vessel. For example, a jacket type heating device can be employed. Furthermore, the whole of the vessel can be heated by providing a plate heater in the outside of the vessel, piping and circulating a liquid.

It is preferred to provide a stirring blade in the inside of the vessel and perform stirring using it. As the stirring blade, one having a length such that it reaches the vicinity of the wall of the vessel is preferable. It is preferred to provide a scraping blade for renewing a liquid film on the wall of the vessel.

The vessel may be equipped with a measuring instrument such as a pressure gauge and a thermometer. The respective components are dissolved in the solvent within the vessel. A prepared dope is cooled and then taken out from the vessel, or is taken out from the vessel and then cooled by using a heat exchanger, etc.

The solution can also be prepared by a dissolution method under cooling. According to the dissolution method under cooling, it is possible to dissolve the cellulose acylate even in an organic solvent capable of hardly dissolving the cellulose acylate therein by a usual dissolution method. Incidentally, the dissolution method under cooling has an effect for rapidly obtaining a uniform solution even by using a solvent capable of dissolving the cellulose acylate therein by a usual dissolution method.

In the dissolution method under cooling, first of all, the cellulose acylate is added in an organic solvent at room temperature while stirring step by step. It is preferred to adjust the amount of the cellulose acylate such that the cellulose acylate is contained in an amount of from 10 to 40% by weight in this mixture. The amount of the cellulose acylate is more preferably from 10 to 30% by weight. In addition, an arbitrary additive as described later may be added in the mixture.

Next, the mixture is cooled to from −100 to −10° C. (preferably from −80 to −10° C., more preferably from −50 to −20° C., and most preferably from −50 to −30° C.). The cooling can be carried out in, for example, a dry ice-methanol bath (at −75° C.) or a cooled diethylene glycol solution (at from −30 to −20° C.). The mixture of the cellulose acylate and the organic solvent is solidified by cooling.

The cooling rate is preferably 4° C./min or more, more preferably 8° C./min or more, and most preferably 12° C./min or more. It is preferable that the cooling rate is fast as far as possible.

However, 10,000° C./sec is a theoretical upper limit, 1,000° C./sec is a technical upper limit, and 100° C./sec is an upper limit for practical use. Incidentally, the cooling rate is a value obtained by dividing a difference between the temperature at the time of start of cooling and the final cooling temperature by a time for reaching the final cooling temperature from the start of cooling.

In addition, when the solid is heated to from 0 to 200° C. (preferably from 0 to 150° C., more preferably from 0 to 120° C., and most preferably from 0 to 50° C.), the cellulose acylate is dissolved in the organic solvent. The temperature elevation may be achieved by allowing it to stand at room temperature or by heating in a warm bath.

The heating rate is preferably 4° C./min or more, more preferably 8° C./min or more, and most preferably 12° C./min or more. It is preferable that the heating rate is fast as far as possible. However, 10,000° C./sec is a theoretical upper limit, 1,000° C./sec is a technical upper limit, and 100° C./sec is an upper limit for practical use. Incidentally, the heating rate is a value obtained by dividing a difference between the temperature at the time of start of heating and the final heating temperature by a time for reaching the final heating temperature from the start of heating.

In this way, a uniform solution is obtained. Incidentally, in the case where dissolution is insufficient, the cooling or heating operation may be repeated. Whether or not the dissolution is sufficient can be judged only by visually observing the appearance of the solution. In the dissolution method under cooling, in order to avoid incorporation of water due to dew condensation at the time of cooling, it is desired to use a closed vessel. Furthermore, in the cooling or heating operation, when pressurization is carried out at the time of cooling or pressure reduction is carried out at the time of heating, the dissolution time can be shortened. In carrying out the pressurization or pressure reduction, it is desired to use a pressure vessel. Incidentally, in a 20% by weight solution of cellulose acetate (degree of acetylation:

60.9%, viscosity average polymerization degree: 299) dissolved in methyl acetate by the dissolution method under cooling, according to the measurement by a differential scanning calorimeter (DSC), a pseudo phase transition temperature between a sol state and a gel state is present in the vicinity of 33° C., and the solution becomes in a uniform gel state at a temperature of not higher than this temperature. Accordingly, this solution must be kept at a temperature of the pseudo phase transition temperature or higher, and preferably at a temperature of (gel phase transition temperature) plus about 10° C. However, this pseudo phase transition temperature varies depending upon the degree of acetylation, viscosity average polymerization degree and solution concentration of cellulose acetate and the organic solvent as used.

It is preferred to produce the cellulose acylate film of the invention by using a dope having a solid content of from 17% by weight to 25% by weight, more preferably from 18% by weight to 24% by weight and most preferably from 19% by weight to 22% by weight.

By producing the film with the use of a dope having such a solid content as defined above, the crystallization of cellulose acylate can be suppressed in the course of the film formation and failure of flatness caused by insoluble matters can be prevented.

A cellulose acylate film is produced from the prepared cellulose acylate solution (dope) by the solvent casting method. It is preferred to add the retardation exhibiting agent in the dope.

The dope is cast on a drum or band, and the solvent is vaporized to form the film. It is preferred to adjust the concentration of the dope before casting such that the solids content is from 18 to 35%. It is preferred to finish the surface of the drum or band in a mirror state. It is preferred to cast the dope on a drum or band at a surface temperature of not higher than 10° C.

A drying method in the solvent casting method is described in U.S. Pat. Nos. 2,336,310, 2,367,603, 2,492,078, 2,492,977, 2,492,978, 2,607,704, 2,739,069 and 2,739,070, U.K. Patents Nos. 640,731 and 736,892, JP-B-45-4554, JP-B-49-5614, JP-A-60-176834, JP-A-60-203430, and JP-A-62-115035. Drying on the band or drum can be carried out by blowing air or an inert gas such as nitrogen.

To produce the cellulose acylate film of the invention, it is preferred to dry the dope by blowing an air stream at a speed of 1 m/min or above immediately after casting. The speed of the drying air stream is preferably 3 in/min or above, more preferably 5 m/min or above and most preferably 10 m/min or above.

It is also preferred to produce the cellulose acylate film of the invention via the step wherein the average drying temperature on the support and the average flow rate are satisfied with the following relationship:

[Average temperature of drying air (° C.)×Average flow rate of drying air (m/min)] in the first half of support>[Average temperature of drying air (° C.)×Average flow rate of drying air (m/min)] in the second half of support;

still preferably:

[Average temperature of drying air (° C.)×Average flow rate of drying air (m/min)] in the first half of support>[Average temperature of drying air (° C.)×Average flow rate of drying air (m/min)] in the second half of support+400.

The term "average temperature of drying air" means the average of the temperature of the drying air measured at intervals of 10 seconds within a fixed time, while the term "average flow rate" means the average of the flow rate of the drying air measured at intervals of 10 seconds within a fixed time.

By rapidly drying in the early stage of casting as discussed above, the diffusion speed of the fine particles of the matting agent and additives in the film is lowered and thus the aggregation of the fine particles of the matting agent and the aggregation of the additives can be prevented. In the case of adding the fine particles of the matting agent exclusively to the dope solution in the uppermost layer as described above, the migration and diffusion of the fine particles of the matting agent from the uppermost layer toward lower layers can be prevented. As a result, the slipperiness-imparting effect of the fine particles of the matting agent can be established at a lower addition level. These cases are both favorable since an increase in haze caused by the matting agent can be prevented thereby.

The resulting film is stripped off from the drum or band and dried by high-temperature air whose temperature is changed successively from 100° C. to 160° C., whereby the residual solvent can be vaporized. Such a method is described in JP-B-5-17844. According to this method, the time from casting until stripping off can be shortened. In order to carry out this method, the dope must be gelled at the surface temperature of the drum or band at the time of casting.

Using the prepared cellulose acylate solution (dope), two or more layers are cast, whereby a film can be formed. In this case, it is preferred to prepare the cellulose acylate film by the solvent casting method. The dope is cast on a drum or bad, and the solvent is vaporized to form a film. It is preferred to adjust the concentration of the dope before casting such that the solids content falls within the range of from 10 to 40%. It is preferred to finish the surface of the drum or band in a mirror state.

In the case of casting plural cellulose acylate solutions of two or more layers, a film may be prepared by casting solutions containing a cellulose acylate respectively from plural casting nozzles capable of casting plural cellulose acylate solutions and provided at intervals in the advancing direction of a support while laminating. For example, methods as described in JP-A-61-158414, JP-A-1-122419, and JP-A-11-198285 can be employed. Furthermore, a film can be formed by casting cellulose acylate solutions from two casting nozzles. For example, methods as described in JP-B-60-27562, JP-A-61-94724, JP-A-61-947245, JP-A-61-104813, JP-A-61-158413, and JP-A-6-134933 can be employed. A casting method of a cellulose acylate film by encompassing a flow of a high-viscosity cellulose acylate solution by a low-viscosity cellulose acylate solution and simultaneously extruding the high-viscosity and low-viscosity cellulose acylate solutions, as described in JP-A-56-162617, can be employed.

Furthermore, a film can be prepared by a method in which by using two casting nozzles, a film as molded on a support from a first casting nozzle is stripped off and second casting is carried out in the side coming into contact with the support surface. For example, a method as described in JP-B-44-20235 is enumerated.

As the cellulose acylate solutions to be cast, the same solution may be used, or different cellulose acylate solutions may be used. For bringing functions to the plural cellulose acylate layers, the cellulose acylate solutions each adaptive with the function may be extruded from the respective casting nozzles. In addition, the cellulose acylate solutions of the invention can be cast at the same time with other functional layers (for example, an adhesive layer, a dye layer, an antistatic layer, an antihalation layer, an ultraviolet absorbing layer, and a polarizing layer).

According a conventional single-layered solution, it is necessary to extrude a high-viscosity cellulose acylate solution in a high concentration for the purpose of attaining a necessary film thickness. In that case, there often occurred a problem that solids are generated due to poor stability of the cellulose acylate solution, thereby causing spitting or failure of flatness. As a method for overcoming this problem, by casting plural cellulose acylate solutions from casting nozzles, high-viscosity solutions can be simultaneously extruded on the support, and the flatness becomes improved so that a planar film can be prepared. Also, by using the concentrated cellulose acylate solutions, a reduction of drying load can be achieved, and the production speed of a film can be enhanced.

[Stretching Treatment]

It is preferable that the cellulose acylate film of the invention is subjected to a stretching treatment. By performing the stretching treatment, it is possible to impart desired retardation to the cellulose acylate film.

The stretching direction of the cellulose acylate film may be any of a widthwise direction or a longitudinal direction.

A method for stretching in the widthwise direction is described in, for example, JP-A-62-115035, JP-A-4-152125, JP-A-4-284211, JP-A-4-298310, and JP-A-11-48271. The stretching of the film is carried out at the normal temperature or under a heating condition. The heating temperature is preferably not higher than the glass transition temperature of the film. In the case of stretching in the longitudinal direction, for example, by adjusting the rate of conveyance rollers of the film and making a winding up rate faster than a stripping off rate, the film is stretched.

In the case of stretching in the widthwise direction, the film can be stretched by conveying the film while keeping its width by a tenter and widening the width of the tenter step by step. After drying, the film can also be stretched by using stretching machine (preferably by uniaxial stretching using a long stretching machine).

It is preferable that the cellulose acylate film of the invention is stretched at a residual solvent content of from 1% by weight to 30% by weight, more preferably at 1% by weight to 25% by weight and most preferably from 3% by weight to 20% by weight.

It is also preferable that the stretching temperature falls within the following range concerning the glass transition temperature (Tg) of the film at a residual solvent content of less than 0.5%:

(Tg-30)° C.<Stretching temperature<(Tg+10)° C.;

more preferably, (Tg-25)° C.<Stretching temperature<(Tg)° C.;

and most preferably, (Tg-20)° C.<Stretching temperature<(Tg-5)° C.

The glass transition temperature can be measured as follows.

An unstretched film sample (5 mm×30 mm) is conditioned at 25° C. 60% RH for 2 hours or longer and then the glass transition temperature is measured with a dynamic viscoelasticity meter (VIBRON:DVA-225 manufactured by IT KEISOKUSEIGYO K.K.) at a sample length between grips of 20 mm, at a heating rate of 2° C./min, over a measurement temperature range of from 30° C. to 200° C. and at a frequency of 1 Hz. In a graph having storage elastic modulus as the logarithmic ordinate and temperature (° C.) as the linear abscissa, a line 1 (solid region) and a line 2 (glass transition region) showing a rapid decrease in storage elastic modulus observed at the conversion from the solid region to the glass transition region are drawn.

Thus, the intersection of the lines 1 and 2 indicates the temperature from which the storage elastic modulus is rapidly lowered and softening of the film starts. Since the conversion into the glass transition region starts at this point, the temperature is referred to as the glass transition temperature Tg (dynamic viscoelasticity).

By performing the stretching within the temperature range as defined above, an increase in haze due to crazing and an increase in haze due to crystallization can be both prevented.

It is preferable that the cellulose acylate film of the invention is stretched for a fixed time in a state of containing an amount of the residual solvent. The content of the residual solvent at the time of start of the stretching is preferably from 5% to 100%, and more preferably from 10% to 50% of the content of the solvent before the stretching. The content of the residual solvent at the time of completion of the stretching is preferably from 0.1% to 50%, and more preferably from 1% to 30%.

The stretching time is preferably from 10 seconds to 120 seconds, and more preferably from 20 seconds to 90 seconds.

The atmosphere temperature at the time of stretching is preferably from 100° C. to 160° C., and more preferably from 120° C. to 150° C.

The stretching magnification of the film is preferably from 1% to 100%, and more preferably from 5% to 90%. Incidentally, in the invention, the stretching magnification of the film as referred to herein is defined by {[(size after stretching)/(size before stretching)−1]×100 (%)}.

[Additives]

It is preferable that the cellulose acylate film of the invention contains additives such as an ultraviolet absorber and a plasticizer in addition to the retardation exhibiting agent.

<Ultraviolet Absorber>

The cellulose acylate film of the invention may contain an ultraviolet absorber.

As the ultraviolet absorber, for example, an oxybenzophenone based compound, a benzotriazole based compound, a salicylic acid ester based compound, a benzophenone based compound, a cyano acrylate based compound, and a nickel complex salt based compound can be enumerated. Of these, a benzotriazole based compound which is less in coloration is preferable. Also, an ultraviolet absorber as described in JP-A-10-182621 and JP-A-8-337574 and a high molecular ultraviolet absorber as described in JP-A-6-148430 are preferably used. In the case where the cellulose acylate film of the invention is used as a protective film of a polarizing plate, as the ultraviolet absorber, one having less absorption of visible light having an excellent ability for absorbing ultraviolet rays having a wavelength of not more than 370 nm from the viewpoint of preventing deterioration of a polarizer or a liquid crystal and having less absorption of visible light having a wavelength of 400 nm or more from the viewpoint of liquid crystal display properties is preferable.

Specific examples of the benzotriazole based ultraviolet absorber which is useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazol-2-yl)-6-(linear or side chain decyl)-4-methylphenol, and a mixture of octyl-3-[3-tert-butyl-4-hydroxy-5-(5-chloro-2H-benzotriazol-2-yl)phenyl]propionate and 2-ethylhexyl-3-[3-tert-butyl-4-hydroxy-5-(5-chloro-2H-benzotriazol-2-yl)phenyl]propionate. However, it should not be construed that the invention is limited thereto. Also, commercially available products such as TINUVIN 109, TINUVIN 171, TINUVIN 326, and TINUVIN 328 (all of which are manufactured by Ciba Speciality Chemicals) can be preferably used.

<Plasticizer>

In order to improve mechanical physical properties, the following plasticizer can be used in the cellulose acylate film. As the plasticizer, a phosphoric acid ester or a carboxylic acid ester is used. Examples of the phosphoric acid ester include triphenyl phosphate (TPP) and tricresyl phosphate (TCP). As the carboxylic acid ester, a phthalic acid ester and a citric acid ester are representative. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include triethyl o-acetylcitrate (OACTE) and tributyl o-acetylcitrate (OACTB). Examples of other carboxylic acid esters include butyl oleate, methylacetyl licinolate, dibutyl sebacate, and a varierty of trimellitic acid esters. A phthalic acid ester based plasticizer (for example, DMP, DEP, DBP, DOP, DPP, and DEHP) is preferably used. DEP and DPP are especially preferable.

The amount of addition of the plasticizer is preferably from 0.1 to 25% by weight, more preferably from 1 to 20% by weight, and most preferably from 3 to 15% by weight of the amount of the cellulose acetate.

<Degradation Preventing Agent>

Furthermore, a degradation preventing agent (for example, an antioxidant, a peroxide decomposing agent, a radical inhibitor, a metal inactivating agent, an acid scavenger, and an amine) may be added in the cellulose acylate film. The degradation preventing agent is described in JP-A-3-199201, JP-A-5-197073, JP-A-5-194789, JP-A-5-271471, and JP-A-6-107854. The amount of addition of the degradation preventing agent is preferably from 0.01 to 1% by weight, and more preferably from 0.01 to 0.2% by weight of the solution (dope) as prepared. When the addition amount is less than 0.01% by weight, an effect of the degradation preventing agent is not substantially noticed. When the addition amount exceeds 1% by weight, bleedout of the degradation preventing agent onto the film surface may possibly be noticed. Especially preferred examples of the degradation preventing agent include butylated hydroxytoluene (BHT) and tri-benzylamine (TBA).

The steps from casting until post-drying may be carried out in an air atmosphere or an inert gas atmosphere. As a winding machine which is used for the production of the cellulose acylate film in the invention, generally used winding machines may be used. The cellulose acylate can be wound up by a winding method such as a constant tension method, a constant torque method, a taper tension method, and a program tension control method with a fixed internal stress.

[Physical Properties]

<Haze of Film>

The haze of the cellulose acylate film of the invention is preferably from 0.01 to 0.8%, and more preferably from 0.05 to 0.7%. When the haze exceeds 0.8%, a reduction in the contrast of the liquid crystal display device is remarkable. When the haze is low, the optical performance is excellent. However, taking into consideration of the selection of a raw material and the production management, the foregoing range is preferable.

The haze of the film rises roughly due to two factors. The first factor is an increase of secondary particles due to the aggregation of the matting agent particle, and the second factor is an increase of a void in the film due to the stretching treatment. By properly adjusting the degree of acylation of the cellulose acylate and the kind of the acyl group and/or using a retardation exhibiting agent having high polarizability anisotropy of the invention, all of the foregoing two factors for the haze rise can be effectively suppressed.

The measurement of the haze was carried out at 25° C. and 60% RH with respect to a cellulose acylate film sample (40 mm×80 mm) by using a haze meter (HGM-2DP, manufactured by Suga Test Instruments Co., Ltd.) according to JIS K7136.

<Coefficient of Thermal Expansion of Film>

The coefficient of thermal expansion of the cellulose acylate film can be measured as a dimensional change per unit temperature when the temperature is raised under a fixed load by a thermomechanical analyzer.

The of the cellulose acylate film of the invention is preferably from 20 ppm/° C. to 100 ppm/° C., more preferably from 25 ppm/° C. to 80 ppm/° C., and most preferably from 30 ppm/° C. to 70 ppm/° C. By making the coefficient of thermal expansion fall within the foregoing range, it is possible to reduce the retardation change when used at high temperatures.

<Thickness of Cellulose Acylate Film>

The thickness of the cellulose acylate film of the invention is preferably from 10 µm to 200 µm, more preferably from 20 µm to 150 µm, and most preferably from 30 µm to 100 µm.

<In-plane Orientation Degree of Cellulose Acylate Film>

The in-plane orientation degree (orientation order parameter) P of the cellulose acylate film can be determined from an average value of a peak intensity of 2θ=6 to 11° in the transmission 2-dimensional X-ray measurement according to the following expression.

$$P_o = \leq 3\cos^2\beta - 1 > /2$$

In the foregoing expression, $$<\cos^2\beta> = \int_0^\pi \cos^2\beta I(\beta)\sin\beta d\beta \bigg/ \int_0^\pi I(\beta)\sin\beta d\beta$$

The in-plane orientation degree of the cellulose acylate film of the invention is preferably from 0.20 to 0.50, and more preferably from 0.30 to 0.45. By properly controlling the in-plane orientation degree of the cellulose acylate film, it is possible to obtain a cellulose acylate film having low haze and desired Rth/Re.

<Crystallization Index>

The crystallization index of the cellulose acylate film of the invention is defined in accordance with the following expression (A) based on the X-ray diffraction intensity measurement.

Crystallization index=(X-ray diffraction intensity at 2θ of 27')/(X-ray diffraction intensity at 2θ of 25°). (A)

The terms "X-ray diffraction intensity at 2θ of 27°" and "X-ray diffraction intensity at 2θ of 25°" as used herein respectively mean the X-ray diffraction intensity based on the non-crystalline part and the X-ray diffraction intensity based on (the non-crystalline part+the crystalline part). Therefore, the value (X-ray diffraction intensity at 2θ of 27')/(X-ray diffraction intensity at 2θ of 25°) can be considered as corresponding to a value proportional to the content of microcrystals, i.e., the crystallization index.

The crystallization index of the cellulose acylate film of the invention is from 0.80 to 1.1, preferably from 0.85 to 1.0 and more preferably from 0.85 to 0.95.

By controlling the crystallization index of the cellulose acylate film within the range as defined above, haze can be lessened.

<Fine Particle Count in Film>

When observed under a confocal laser scanning microscope, the cellulose acylate film of the invention preferably has not more than 20 fine particles of 0.2μ to 3μ per 100 μm², more preferably not more than 10 fine particles and most preferably not more than 5 fine particles. Fine particles observed under a confocal laser scanning microscope are formed by the aggregation of the additives such as a plasticizer added to the cellulose acylate film on the surface of the matting agent. The formation of these aggregates can be suppressed by controlling the methods of adding the matting agent, additives and the cellulose acylate as discussed above, thereby giving a cellulose acylate film having a low haze.

<Curl>

It is preferable that the cellulose acylate film of the invention has a small curl change due to the humidity.

The degree of curl can be determined by cutting the subject film into 50 mm in the widthwise direction and 2 mm in the longitudinal direction, subjecting to humidity control at a prescribed humidity for 24 hours, and measuring a curl value of the subject film by using a curvature scale. The curl value is expressed by 1/R, wherein R represents a radius of curvature (unit: m) (see JIS K7619).

The curl value change of the cellulose acylate film of the invention is preferably not more than 0.02, and not more preferably 0.015 per 1% of a relative humidity.

By making the curl value change per 1% of a relative humidity fall within the foregoing range, after processing into a polarizing plate, deformation due to the change of the circumferential humidity becomes small, and light leakage of a liquid crystal display device caused following the change of the circumferential humidity can be prevented.

<Dimensional Change Under High-temperature and High-humidity Condition>

In the cellulose acylate film of the invention, it is preferable that the dimensional change under a high-temperature and high-humidity condition is small. A rate of the dimensional change before and after the treatment at 40° C. and 95% for 24 hours is preferably not more than 0.20%, and more preferably not more than 0.15%.

By making the dimensional change under a high-temperature and high-humidity condition fall within the foregoing range, after processing into a polarizing plate, deformation due to the change of the circumferential humidity becomes small, and light leakage of a liquid crystal display device caused following the change of the circumferential humidity can be prevented.

<Water Vapor Permeability>

The water vapor permeability is determined by measuring the water vapor permeability of each sample and calculating the content of water (g) which is vaporized for 24 hours per 1 m² of an area according to a method as described in JIS Z0208. The water vapor permeability is of physical properties of the film closely related to the durability of a polarizing plate, and by decreasing the water vapor permeability, it is possible to improve the durability of a polarizing plate. The water vapor permeability of the cellulose acylate film of the invention is preferably from 200 g/m² to 1,700 g/m², and more preferably from 500 g/m² to 1,400 g/m².

<Water Content of Cellulose Acylate Film>

The water content of the cellulose acylate film can be evaluated by measuring an equilibrium water content at a fixed temperature and relative humidity. The equilibrium water content is determined by after allowing a sample to stand at the foregoing temperature and relative humidity for 24 hours, measuring the amount of water of the sample which has reached an equilibrium state by the Karl Fisher's method and dividing the amount of water (g) by the sample weight (g).

The water content of the cellulose acylate film of the invention at 25° C. and 80% RH is preferably not more than 4.5% by weight, more preferably not more than 4.0% by weight, and most preferably not more than 3.5% by weight.

<Saponification Treatment>

The cellulose acylate film of the invention can be used as a protective film for polarizing plate by subjecting it to an alkaline saponification treatment to impart adhesion to polyvinyl alcohol.

It is preferable that the alkaline saponification treatment of the cellulose acylate film is carried out through a cycle of dipping the film surface in an alkaline solution, neutralizing with an acidic solution, washing with water, and then drying.

Examples of the alkaline solution include a potassium hydroxide solution and a sodium hydroxide solution. A normality concentration of a hydroxide ion is preferably within the range of from 0.1 to 5.0 N, and more preferably from 0.5 to 4.0 N. The temperature of the alkaline solution is preferably within the range of from room temperature to 90° C., and more preferably from 40 to 70° C.

<Retardation of Film>

In the present specification, Re(λ) and Rth(λ) represent an in-plane retardation and a retardation in the thickness direction at a wavelength of λ, respectively. The Re(λ) and Rth(λ) are each determined by making light incident from a prescribed direction and measuring a refractive index in the subject direction by using a birefringence meter. For example, the Re(λ) is measured by making light having a wavelength of λ nm incident into the normal line direction in KOBRA 21ADH (manufactured by Oji Science Instruments). The Rth (λ) is computed by KOBRA21 ADH on the basis of retardation values, as measured in three directions in total, of the foregoing Re(λ), a retardation value as measured by making light having a wavelength of λ nm incident from a direction inclined by +40° against the normal line direction of the film while making the in-plane slow axis (judged by KOBRA 21ADH) serve as a tilt axis (rotational axis), and a retardation value as measured by making light having a wavelength of λ nm incident from a direction inclined by −40° against the normal line direction of the film while making the in-plane slow axis serve as a tilt axis (rotational axis). Here, as hypothetical values of average refractive index, values described in *Polymer Handbook* (John Wiley & Sons, Inc.) and various catalogues of optical films can be employed. When an average refractive index value is not known, it can be measured by an Abbe's refractometer. Average refractive index values of major optical films are exemplified below.

Cellulose acylate (1.48), cycloolefin polymer (1.52), polycarbonate (1.59), polymethyl methacrylate (1.49), polystyrene (1.59)

By inputting a hypothetical value of the average refractive index and a film thickness, KOBRA 21ADH computes nx, ny and nz.

Re(590) of the cellulose acylate film of the invention is preferably from 20 to 200 nm, more preferably from 40 to 150 nm, and most preferably from 60 to 120 nm. Rth(590) is preferably from 70 to 400 nm, more preferably from 100 to 300 nm, and most preferably from 150 to 250 nm.

Furthermore, an Rth(590)/Re(590) ratio is preferably from 1.0 to 3.0, and more preferably from 1.2 to 2.9.

<Photoelasticity>

The coefficient of photoelasticity of the cellulose acylate of the invention is preferably not more than $60 \times 10^{-8}$ cm$^2$/N, and more preferably not more than $20 \times 10^{-8}$ cm$^2$/N. The coefficient of photoelasticity can be determined by an ellipsometer.

<Glass Transition Temperature>

The glass transition temperature of the cellulose acylate of the invention is preferably 120° C. or higher, and more preferably 140° C. or higher. The glass transition temperature is determined as an average value of a temperature at which the base line of the film derived from the glass transition begins to change and a temperature at which the film returns to the base line when measured at a temperature rise rate of 10° C./min using a differential scanning calorimeter (DSC).

Next, the polarizing plate of the invention will be described in detail.

(Construction of Polarizing Plate)

The polarizing plate of the invention may have, as constructional elements, an adhesive layer, a separate film, and a protective film in addition to a polarizer and a protective film.

(1) Protective Film

The polarizing plate of the invention has two protective films in total on the both sides of a polarizer, and at least one of the two protective films is the cellulose acylate film of the invention. Furthermore, it is preferable that at least one of the two protective films has also a function as a retardation film. When the polarizing plate of the invention is used in a liquid crystal display device, it is preferable that at least one of two polarizing plates to be disposed on the both sides of a liquid crystal cell is the polarizing plate of the invention.

It is preferable that the protective film which is used in the invention is a polymer film made of a norbornene resin, polyethylene terephthalate, polyethylene naphthalate, polycarbonate, polystyrene, polyallylate, polysulfone, a cellulose acylate, etc. It is the most preferable that the protective film which is used in the invention is a cellulose acylate film.

(2) Polarizer

The polarizer of the invention is preferably constructed of polyvinyl alcohol (PVA) and a dichroic molecule. A polyvinylene based polarizer obtained by dehydrating or dechlorinating PVA or polyvinyl chloride to form a polyene structure and orienting it as described in JP-A-11-248937 can also be used.

PVA is a polymer raw material resulting from saponification of polyvinyl acetate and may contain a component copolymerizable with vinyl acetate, such as unsaturated carboxylic acids, unsaturated sulfonic acids, olefins, and vinyl ethers. Furthermore, modified PVA containing an acetoactyl group, a sulfonic acid group, a carboxyl group, an oxyalkylene group, etc. can be used.

Though the degree of saponification of PVA is not particularly limited, it is preferably from 80 to 100% by mole, and especially preferably from 90 to 100% by mole from the viewpoints of solubility, etc. Further, though the degree of polymerization of PVA is not particularly limited, it is preferably from 1,000 to 10,000, and especially preferably from 1,500 to 5,000.

As described in Japanese Patent No. 2,978,219, for the purpose of improving the durability, the syndiotacticity of PVA is preferably 55% or more. However, as described in Japanese Patent No. 3,317,494, PVA having a syndiotacticity of from 45 to 52.5% can also be preferably used.

It is preferable that after film formation of PVA, a dichroic molecule is introduced to construct a polarizer. As a method for producing a PVA film, in general, a method in which a stock solution of a PVA based resin dissolved in water or an organic solvent is cast to form a film is preferably employed. The concentration of the polyvinyl alcohol based resin in the stock solution is usually from 5 to 20% by weight. By subjecting this stock solution to film formation, a PVA film having a film thickness of from 100 to 200 μm can be produced. The production of the PVA film can be carried out by referring to Japanese Patent No. 3,342,516, JP-A-09-328593, JP-A-2001-302817, and JP-A-2002-144401.

Though the crystallinity of the PVA film is not particularly limited, a PVA film having an average crystallinity (Xc) of from 50 to 75% by weight as described in Japanese Patent No. 3,251,073 can be used. A PVA film having a crystallinity of not more than 38% as described in JP-A-2002-236214 can also be used for the purpose of reducing in-plane hue scatter.

It is preferable that the birefringence (Δn) of the PVA film is small. A PVA film having a birefringence of not more than $1.0 \times 10^{-3}$ as described in Japanese Patent No. 3,342,516 can be preferably used. However, as described in JP-A-2002-228835, for the purpose of obtaining a high degree of polarization while avoiding cutting at the time of stretching the PVA film, the birefringence of the PVA film may be regulated at from 0.002 to 0.01; and as described in JP-A-2002-060505, a value of [(nx+ny)/2−nz] may be regulated at from 0.0003 to 0.01. The retardation (in-plan) of the PVA film is preferably from 0 nm to 100 nm, and more preferably from 0 nm to 50 nm. Furthermore, the Rth (in the film thickness direction) of the PVA film is preferably from 0 nm to 500 nm, and more preferably from 0 nm to 300 nm.

Besides, for the polarizing plate of the invention, a PVA film having a 1,2-glycol binding amount as described in Japanese Patent No. 3,021,494; a PVA film having the number of optical foreign matters of 5 μm or more of not more than 500 per 100 cm$^2$ as described in JP-A-2001-316492; a PVA film having an unevenness in hot-water cutting temperature of not more than 1.5° C. in the TD direction of the film as described in JP-A-2002-030163 and a PVA film resulting from further mixing from 1 to 100 parts by weight of a trihydric to hexahydric polyhydric alcohol such as glycerin therewith; and a PVA film resulting from film formation of a solution of PVA having a 15% by weight or more of a plasticizer mixed therewith as described in JP-A-06-289225 can be preferably used.

Though the film thickness of the PVA film before stretching is not particularly limited, it is preferably from 1 μm to 1 mm, and especially preferably from 20 to 200 μm from the viewpoints of stability of film retention and uniformity of stretching. A thin PVA film in which a stress as generated at the time of stretching in water by from 4 to 6 times becomes 10 N or less as described in JP-A-2002-236212 may be used.

As the dichroic molecule, a high-order iodine ion such as 13- and 15- or a dichroic dye can be preferably used. In the invention, a high-order iodine ion is especially preferably used. The high-order iodine ion can be formed by dipping PVA in a solution of iodine dissolved in a potassium iodide aqueous solution and/or a boric acid aqueous solution, thereby adsorbing and orienting PVA as described in *Henkoban-no-Oyo* (Application of Polarizing Plate), edited by Ryo Nagata and published by CMC Publishing Co., Ltd. and *Kogyo Zairyo* (Industrial Materials), Vol. 28, No. 7, pages 39 to 45.

When a dichroic dye is used as the dichroic molecule, an azo based dye is preferable, and a bisazo based dye and a trisazo based dye are especially preferable. As the dichroic dye, a water-soluble dichroic dye is preferable. For that reason, it is preferred to introduce a hydrophilic substituent (for example, a sulfonic acid group, an amino group, and a hydroxyl group) into the dichroic molecule and use it as a free acid or an alkali metal salt, an ammonium salt or an amine salt.

Specific examples of such a dichroic dye include benzidine based dichroic dyes (for example, C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1); diphenylurea based dichroic dyes (for example, C.I. Direct Yellow 44, C.I. Direct Red 23, and C.I. Direct Red 79); stilbene based dichroic dyes (for example, C.I. Direct Yellow 12); dinaphthylamine based dichroic dyes (for example, C.I. Direct Red 31); and J-acid based dichroic dyes (for example, C.I. Direct Red 81, C.I. Direct Violet 9, and C.I. Direct Blue 78).

Besides, C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and the like; dichroic dyes as described in JP-A-62-70802, JP-A-1-161202, JP-A-1-172906, JP-A-1-172907, JP-A-1-183602, JP-A-1-248105, JP-A-1-265205, and JP-A-7-261024; and the like can also be preferably used. For the purpose of producing a dichroic molecule having a variety of hues, two or more kinds of these dichroic dyes may be blended. When the dichroic dye is used, the adsorption thickness may be 4 μm or more as described in JP-A-2002-082222.

When the content of the subject dichroic molecule in the film is too low, the degree of polarization is low, while when it is too high, the single plate transmittance is lowered. Accordingly, the content of the dichroic molecule in the film is usually adjusted so as to fall within the range of from 0.01% by weight to 5% by weight based on the polyvinyl alcohol based polymer which constructs the matrix of the film.

The film thickness of the polarizer is preferably from 5 μm to 40 μm, and more preferably from 10 μm to 30 μm. It is also preferable that a ratio of the thickness of the polarizer to the thickness of the protective film falls within the range of [0.01≦A (thickness of polarizer)/B (thickness of protective film)≦0.16].

Though the crossing angle between the slow axis of the protective film and the absorption axis of the polarizer may be an arbitrary value, it is preferably parallel or an azimuth of 45±20°.

[Production Step of Polarizing Plate]

Next, the production step of the polarizing plate of the invention will be described.

The production step of the polarizer in the invention is preferably constructed of a swelling step, a dyeing step, a film hardening step, a stretching step, a drying step, a sticking step of protective film, and a drying step after the sticking step. The order of the dyeing step, the film hardening step and the stretching step may be arbitrarily varied, and some steps may be combined and carried out at the same time. Furthermore, water washing can be preferably carried out after the film hardening step as described in Japanese Patent No. 3,331,615.

In the invention, it is especially preferred to successively carry out a swelling step, a dyeing step, a film hardening step, a stretching step, a drying step, a sticking step of protective film, and a drying step after the sticking step in this order. Furthermore, an on-line plane condition inspection step may be provided during or after the foregoing steps.

It is preferable that the swelling step is carried out by using only water. However, as described in JP-A-10-153709, for the purposes of stabilizing the optical performance and avoiding the generation of wrinkles of a base material of the polarizing plate in the production line, the degree of swelling of the base material of the polarizing plate can also be controlled by swelling the base material of the polarizing plate with a boric acid aqueous solution.

Furthermore, the temperature and time of the swelling step can be arbitrarily determined and are preferably from 10° C. to 60° C. and from 5 seconds to 2,000 seconds, respectively.

As the dyeing step, a method as described in JP-A-2002-86554 can be employed.

Furthermore, as the dyeing method, not only dipping means but also arbitrary means such as coating or spraying of iodine or a dye solution are employable. Moreover, as described in JP-A-2002-290025, a method for achieving dyeing by controlling the concentration of iodine, the dyeing bath temperature and the stretching magnification in the bath while stirring the solution in the bath.

When a high-order iodine ion is used as the dichroic molecule, in order to obtain a polarizing plate with high contrast, it is preferred to use a solution having iodine dissolved in a potassium iodide aqueous solution in the dyeing step. In this case, it is preferable that the iodine-potassium iodine aqueous solution has an amount of iodine in the range of from 0.05 to 20 g/L, an amount of potassium iodide in the range of from 3 to 200 g/L, and a weight ratio of iodine to potassium iodide in the range of from 1 to 2,000. The dyeing time is preferably from 10 to 1,200 seconds, and the solution temperature is preferably from 10 to 60° C. More preferably, the amount of iodine is from 0.5 to 2 g/L, the amount of potassium iodide is from 30 to 120 g/L, the weight ratio of iodine to potassium iodide is from 30 to 120, the dyeing time of from 30 to 600 seconds, and the solution temperature is from 20 to 50° C.

Furthermore, as described in Japanese Patent No. 3,145,747, a boron based compound such as boric acid and borax may be added in the dyeing solution.

In the film hardening step, it is preferred to contain a crosslinking agent by dipping in a crosslinking agent solution or coating the solution. Furthermore, as described in JP-A-11-52130, the film hardening step can also be dividedly carried out.

As the crosslinking agent, a crosslinking agent as described in U.S. Reissue Pat. No. 232,897 can be used. As described in Japanese Patent No. 3,357,109, for the purpose of improving the dimensional stability, a polyhydric aldehyde can be used as the crosslinking agent. Of these, boric acids are most preferably used.

When boric acid is used as the crosslinking agent which is used in the film hardening step, a metal ion may be added in a boric acid-potassium iodide aqueous solution. Zinc chloride is preferable as the metal ion. However, as described in JP-A-2000-35512, a zinc halide such as zinc iodide and a zinc salt such as zinc sulfate and zinc acetate can also be used in place of the zinc chloride.

In the invention, it is preferred to prepare a boric acid-potassium iodide aqueous solution having zinc chloride added thereto and dipping a PVA film therein to achieve film hardening. It is preferable that the amount of boric acid is from 1 to 100 g/L, that the amount of potassium iodide is from 1 to 120 g/L, that the amount of zinc chloride is from 0.01 to 10 g/L, that the film hardening time is from 10 to 1,200 seconds, and that the solution temperature is from 10 to 60° C. More preferably, the amount of the boric acid is from 10 to 80 g/L, the amount of potassium iodide is from 5 to 100 g/L, the amount of zinc chloride is from 0.02 to 8 g/L, the film hardening time is from 30 to 600 seconds, and the solution temperature of from 20 to 50° C.

As the stretching step, a longitudinal uniaxial stretching system as described in U.S. Pat. No. 2,454,515 or a tenter system as described in JP-A-2002-86554 can be preferably employed.

The stretching magnification is preferably from 2 times to 12 times, and more preferably from 3 times to 10 times. Furthermore, it can be preferably carried out that the relation among the stretching magnification, the thickness of the raw film and the thickness of the polarizer is regulated at [(thickness of polarizer after sticking the protective film)/(thickness of the raw film)×(total stretching magnification)>0.17] as described in JP-A-2002-040256; and that the relation between the width of the polarizer at the time of leaving a final bath and the width of the polarizer at the time of sticking the protective film is regulated at [0.80≦(width of the polarizer at the time of sticking the protective film)/(width of the polarizer at the time of leaving a final bath)≦0.95] as described in JP-A-2002-040247.

As the drying step, a method which is known by JP-A-2002-86554 can be employed. The temperature range is preferably from 30° C. to 100° C., and the drying time is preferably from 30 seconds to 60 minutes. Furthermore, a thermal treatment in which the discoloration temperature in water is 50° C. or high as described in Japanese Patent No. 3,148,513 and aging in an atmosphere in which the temperature and relative humidity are controlled as described in JP-A-07-325215 and JP-A-07-325218 can also be preferably carried out.

The sticking step of protective film is a step for sticking two protective films on the both surfaces of the foregoing polarizer which has left the drying step. A method in which an adhesive solution is fed immediately before sticking and the polarizer and the protective films are superimposed and stuck by a pair of rollers is preferably employed. Furthermore, as described in JP-A-2001-296426 and JP-A-2002-86554, in order to suppress record groove-like irregularities caused due to stretching of the polarizer, it is preferred to adjust the water content of the polarizer at the time of sticking. In the invention, a water content of from 0.1% to 30% is preferably used.

An adhesive between the polarizer and the protective film is not particularly limited. Examples thereof include PVA based resins (including modified PVAs containing an acetoacetyl group, a sulfonic acid group, a carboxyl group, an oxyalkylene group, etc.) and boron compound aqueous solutions. Of these, PVA based resins are preferable. The thickness of the adhesive layer after drying is preferably from 0.01 to 5 μm, and especially preferably from 0.05 to 3 μm.

Furthermore, in order to improve the adhesive strength between the polarizer and the protective film, it is preferable that the protective film is subjected to a surface treatment and then provided for adhesion. Though the surface treatment method is not particularly limited, examples thereof include known methods such as a saponification method using an alkaline solution and a corona treatment method. Furthermore, after the surface treatment, an easily adhesive layer such as a gelatin undercoating layer may be provided. As described in JP-A-2002-267839, a contact angle between the protective film surface and water is preferably not more than 50°.

The drying condition after sticking follows a method as described in JP-A-2002-86554. However, the temperature range is preferably from 30° C. to 100° C., and the drying time is preferably from 30 seconds to 60 minutes. Furthermore, it is preferred to carry out aging in an atmosphere in which the temperature and relative humidity are controlled as described in JP-A-07-325220.

With respect to the contents of elements in the polarizer, it is preferable that the contents of iodine, boron, potassium and zinc are from 0.1 to 3.0 g/m$^2$, from 0.1 to 5.0 g/m$^2$, from 0.1 to 2.00 g/m$^2$ and from 0 to 2.00 g/m$^2$, respectively Furthermore, the content of potassium in the polarizer may be not more than 0.2% by weight as described in JP-A-2001-166143; and the content of zinc in the polarizer may be from 0.04% by weight to 0.5% by weight as described in JP-A-2000-035512.

As described in Japanese Patent No. 3,323,255, in order to enhance the dimensional stability of the polarizing plate, it is also possible to add and use an organotitanium compound and/or an organozirconium compound in any one step of the dyeing step, the stretching step and the film hardening step, thereby containing at least one compound selected from an organotitanium compound and an organozirconium compound. Furthermore, for the purpose of adjusting the hue of the polarizing plate, a dichroic dye may be added.

[Characteristics of Polarizing Plate]

(1) Transmittance and Degree of Polarization

The single plate transmittance of the polarizing plate of the invention is preferably from 42.5% to 49.5%, and more preferably from 42.8% to 49.0%. The degree of polarization as defined by the expression 4 is preferably in the range of from 99.900% to 99.999%, and more preferably from 99.940% to 99.995%. The parallel transmittance is preferably in the range of from 36% to 42%, and the crossed transmittance is preferably in the range of from 0.001% to 0.05%. The dichroic ratio as defined by the following expression 5 is preferably in the range of from 48 to 1,215, and more preferably from 53 to 525.

The foregoing transmittance is defined by the following expression on the basis of JIS Z8701.

$$T = K \int S(\lambda) y(\lambda) \tau(\lambda) d\lambda$$

In the foregoing expression, K, S(λ), y(λ), and τ(λ) are as follows.

$$K = \frac{100}{\int S(\lambda) y(\lambda) d\lambda}$$

S(λ): Spectral distribution of standard light to be used in the color display
y(λ): Color matching function of the XYZ system
τ(λ): Spectral transmittance $$\text{Dichroic ratio } (Rd) = \frac{\log\left[\frac{\text{Single plate transmittance}}{100}\left(1 - \frac{\text{Degree of polarization}}{100}\right)\right]}{\log\left[\frac{\text{Single plate transmittance}}{100}\left(1 + \frac{\text{Degree of polarization}}{100}\right)\right]} \quad \text{Expression 5}$$

The iodine concentration and single plate transmittance may be in the ranges as described in JP-A-2002-258051.

The parallel transmittance may be less in wavelength dependency as JP-A-2001-083328 and JP-A-2002-022950. When the polarizing plate is disposed in the crossed Nicols configuration, the optical characteristic may be in the range as described in JP-A-2001-091736; and the relation between the parallel transmittance and the crossed transmittance may be in the range as described in JP-A-2002-174728.

As described in JP-A-2002-221618, a standard deviation of the parallel transmittance at every 10 nm of a wavelength of light of from 420 to 700 nm may be not more than 3, and a minimum value of (parallel transmittance)/(crossed transmittance) at every 10 nm of a wavelength of light of from 420 to 700 nm.

It is also preferable that the parallel transmittance and the crossed transmittance at a wavelength of the polarizing plate of 440 nm, the parallel transmittance and the crossed transmittance at a wavelength of the polarizing plate of 550 nm, and the parallel transmittance and the crossed transmittance at a wavelength of the polarizing plate of 610 nm may be in the ranges as described in JP-A-2002-258042 and JP-A-2002-258043.

(2) Hue

The hue of the polarizing plate of the invention is preferably evaluated by using a lightness index L* and chromaticness indices a* and b* in the L*a*b* colorimetric system as recommended as a CIE uniform perception space.

L*, a* and b* are defined by the following expression 6 by using the foregoing X, Y and Z.

$$L^* = 116(Y/Y_0)^{1/3} - 16$$

$$a^* = 500[(X/X_0)^{1/3} - (Y/Y_0)^{1/3}]$$

$$b^* = 200[(Y/Y_0)^{1/3} - (Z/Z_0)^{1/3}] \quad \text{Expression 6}$$

In the foregoing expression, $X_0$, $Y_0$, and $Z_0$ each independently represents a tristimulus value of the illumination light source; and in the case of standard light C, $X_0$=98.072, $Y_0$=100, and $Z_0$=118.225, and in the case of standard light $D_{65}$, $X_0$=95.045, $Y_0$=100, and $Z_0$=108.892.

a* of a single polarizing plate is preferably in the range of from −2.5 to 0.2, and more preferably from −2.0 to 0. b* of a single polarizing plate is preferably in the range of from 1.5 to 5, and more preferably from 2 to 4.5. a* of parallel transmitted light of two polarizing plates is preferably in the range of from −4.0 to 0, and more preferably from −3.5 to −0.5. b* of parallel transmitted light of two polarizing plates is preferably in the range of from 2.0 to 8, and more preferably from 2.5 to 7. a* of crossed transmitted light of two polarizing plates is preferably in the range of from −0.5 to 1.0, and more preferably from 0 to 2. b* of crossed transmitted light of two polarizing plates is preferably in the range of from −2.0 to 2, and more preferably from −1.5 to 0.5.

The hue may be evaluated by the chromaticity coordinates (x, y) as calculated from the foregoing X, Y and Z. For example, it is preferably carried out to make the chromaticity ($x_p$, $y_p$) of the parallel transmitted light of two polarizing plates and the chromaticity ($x_c$, $y_c$) of the crossed transmitted light of two polarizing plates fall within the ranges as described in JP-A-2002-214436, JP-A-2001-166136, and JP-A-2002-169024, respectively or to make the relation between the hue and the absorbance fall within the range as described in JP-A-2001-311827.

(3) Viewing Angle Characteristic

In the case where the polarizing plate is disposed in the crossed Nicols configuration and light having a wavelength of 550 nm is made incident, when vertical light is made incident and when light is made incident from the azimuth of 45° against the polarization axis at an angle of 40° against the normal line, it is also preferred to make the transmittance ratio and the xy chromaticity difference fall within the ranges as described in JP-A-2001-166135 and JP-A-2001-166137, respectively. Furthermore, it can be preferably carried out that a ratio ($T_{60}/T_0$) wherein $T_0$ represents a light transmittance of a polarizing plate laminate as disposed in the crossed Nicols configuration in the vertical direction and $T_{60}$ represents a light transmittance in a direction as inclined by 60° from the normal line of the laminate is regulated at not more than 10,000 as described in JP-A-10-068817; that when natural light is made incident into the polarizing plate at an arbitrary angle from the normal line to an angle of elevation of 80°, a difference of transmittance of transmitted light within a wavelength region of 20 m in the wavelength range of its transmission spectrum of from 520 to 640 nm is regulated at not more than 6% as described in JP-A-2002-139625; and that a difference of luminance of transmitted light in an arbitrary place far from the film by 1 cm is regulated at not more than 30% as described in JP-A-08-248201.

(4) Durability (4-1) Wet Heat Durability

It is preferable that in the case of standing in an atmosphere at 60° C. and 95% RH for 500 hours, a rate of change in each of the light transmittance and the degree of polarization before and after standing is not more than 3% on the basis of the absolute value. In particular, it is preferable that a rate of change in the light transmittance is not more than 2% and that a rate of change in the degree of polarization is not more than 1.0% on the basis of the absolute value. Furthermore, it is preferable that after standing at 80° C. and 90% RH for 500 hours, the degree of polarization is 95% or more and the single plate transmittance is 38% or more as described in JP-A-07-077608.

(4-2) Dry Durability

It is preferable that in the case of standing in a dry atmosphere at 80° C. for 500 hours, a rate of change in each of the light transmittance and the degree of polarization before and after standing is not more than 3% on the basis of the absolute value. In particular, a rate of change in the light transmittance is preferably not more than 2%; and a rate of change in the degree of polarization is preferably not more than 1.0%, and more preferably not more than 0.1% on the basis of the absolute value.

(4-3) Other Durability

In addition, it can be preferably carried out that after standing at 80° C. for 2 hours, a rate of shrinkage is regulated at not more than 0.5% as described in JP-A-06-167611; that the x value and y value after allowing a polarizing plate laminate as disposed in the crossed Nicols configuration on the both surfaces of a glass plate in an atmosphere at 69° C. for 750 hours are regulated so as to fall within the ranges as described in JP-A-10-068818; and that a change in a spectral intensity ratio at 105 $cm^{-1}$ and 157 $cm^{-1}$ by the Raman spectroscopy after standing in an atmosphere at 80° C. and 90% RH for 200 hours is regulated so as to fall within the ranges as described in JP-A-08-094834 and JP-A-09-197127.

(5) Degree of Orientation

When the degree of orientation of PVA is high, a good polarization performance is obtained. An order parameter value as calculated by a measure such as polarization Raman scattering and polarization FT-IR is preferably in the range of from 0.2 to 1.0. Furthermore, it can be preferably carried out that a difference between a coefficient of orientation of a high molecular segment of the entire amorphous region of the polarizer and a coefficient of orientation (0.75 or more) of the occupied molecule is regulated to be at least 0.15 as described in JP-A-59-133509; and that a coefficient of orientation of the amorphous region of the polarizer is regulated to be from 0.65 to 0.85, or a degree of orientation of a high-order iodine ion such as $I_3^-$ and $I_5^-$ is regulated to be from 0.8 to 1.0 in terms of an order parameter value as described in JP-A-04-204907.

(6) Other Characteristics

Also, it can be preferably carried out that when heated at 80° C. for 30 minutes, a shrinkage force in the direction of the absorption axis per unit width is regulated at not more 4.0 N/cm as described in JP-A-2002-006133; that in the case of allowing the polarizing plate to stand under a heating condition at 70° C. for 120 hours, both a rate of dimensional change in the direction of the absorption axis of the polarizing plate and a rate of dimensional change in the direction of the polarization axis of the polarizing plate are regulated to fall within +0.6% as described in JP-A-2002-236213; and that the water content of the polarizing plate is regulated at not more than 3% by weight as described in JP-A-2002-090546. In addition, it can be preferably carried out that the surface roughness in a direction vertical to the stretching axis is regulated at not more than 0.04 μm on the basis of the centerline average roughness as described in JP-A-2000-249832; that a refractive index no in the direction of the transmitting axis is regulated at more than 1.6 as described in JP-A-10-268294; and that the relation between the thickness of the polarizing plate and the thickness of the protective film is regulated so as to fall within the range as described in JP-A-10-1114111.

[Functionalization of Polarizing Plate]

The polarizing plate of the invention is preferably used as a viewing angle enlarging film for LCD, a retardation film (for example, a λ/4 plate) to be applied in a reflection type LCD, an antireflection film for improving the visibility of a display, a luminance improving film, or a functionalized polarizing plate complexed with an optical film having a functional layer such as a hard coat layer, a forward scattering layer, and an antiglare layer.

Figure 1B:
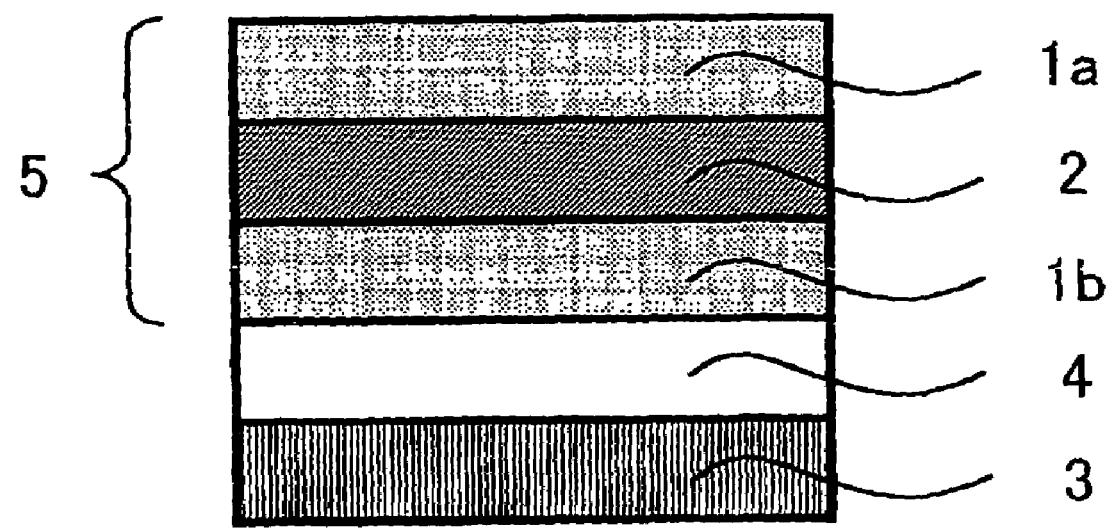

A constructional example of the polarizing plate of the invention complexed with the foregoing functional optical film is shown in FIG. 1. As a protective film 1 in one side of a polarizing plate 5, a functional optical film 3 and a polarizer 2 may be bonded to each other via an adhesive layer (FIG. 1A); and a functional optical film 3 may be bonded to a polarizing plate 5 having protective films 1a, 1b on the both surfaces of a polarizer 2 via an adhesive layer 4 (FIG. 1B). In the former case, an arbitrary transparent protective film may be used for the protective film of the other side. Furthermore, in the polarizing plate of the invention, it is preferable that an optical functional layer is stuck onto the protective film via an adhesive layer, thereby constructing the functional optical film 3 as shown in FIG. 1A. The release strength between the respective layers such as a functional layer and a protective film is regulated as 4.0 N/25 mm or more as described in JP-A-2002-311238. It is preferable that the functional optical film is disposed in the side of a liquid crystal module or in the opposite side to the liquid crystal module, namely the display side or backlight side depending upon a desired function.

(Functional Optical Film)

The functional optical film which is used upon being complexed with the polarizing plate of the invention will be hereunder described.

(1) Viewing Angle Enlarging Film

The polarizing plate of the invention can be used in combination with a viewing angle enlarging film as proposed in display modes such as TN (twisted nematic), IPS (in-plane switching), OCB (optically compensatory band), VA (vertically aligned), and ECB (electrically controlled birefringence) modes.

As the viewing angle enlarging film for TN mode, WV films (manufactured by Fuji Photo Film Co., Ltd.) as described in *Journal of Printing Science and Technology*, Vol. 36, No. 3 (1999), pages 40 to 44, the issue of *Monthly Display* for August 2002, pages 20 to 24, JP-A-4-229828, JP-A-6-75115, JP-A-6-214116, JP-A-8-50206, etc. are preferably combined and used.

A preferred construction of the viewing angle enlarging film for TN mode is one having an oriented layer and an optically anisotropic layer in this order on the foregoing transparent polymer film. The viewing angle enlarging film may be stuck to the polarizing plate via an adhesive and used. However, it is especially preferable from the viewpoint of realizing a reduction in the thickness that the viewing angle enlarging film is used while serving as one of the protective films of the polarizer as described in *SID'00 Dig*, page 551 (2000).

The oriented layer can be provided by a measure such as a rubbing treatment of an organic compound (preferably a polymer), oblique vapor deposition of an inorganic compound, and formation of a layer having micro grooves. In addition, an oriented layer whose orientation function is generated by imparting an electrical field, imparting a magnetic field, or irradiating light is known. However, an oriented layer as formed by a rubbing treatment of a polymer is especially preferable. The rubbing treatment is preferably carried out by rubbing the surface of a polymer layer by paper or a cloth several times in a fixed direction. It is preferable that the absorption axis of the polarizer and the rubbing direction are substantially parallel to each other. With respect to the kind of the polymer to be used in the oriented layer, polyimide, polyvinyl alcohol, a polymerizable group-containing polymer as described in JP-A-9-152509, and the like can be preferably used. The thickness of the oriented layer is preferably from 0.01 to 5 μm, and more preferably from 0.05 to 2 μm.

It is preferable that the optically anisotropic layer contains a liquid crystalline compound. It is especially preferable that the liquid crystalline compound which is used in the invention is a discotic compound (discotic liquid crystal). The discotic liquid crystal molecule has a structure in which a disc-like core segment is present and side chains radially extend therefrom. In order to impart stability with time, it is also preferably carried out to further introduce a group capable of causing reaction by heat, light, etc. Preferred examples of the foregoing discotic liquid crystal are described in JP-A-8-50206.

The discotic liquid crystal molecule is oriented substantially parallel to the film plane with a pre-tilt angle against the rubbing direction in the vicinity of the oriented layer, and in the opposite air surface side, the discotic liquid crystal molecule stands up and is oriented in a substantially vertical form against the plane. The whole of the discotic liquid crystal layer takes hybrid orientation, and viewing angle enlargement of TFT-LCD of a TN mode can be realized by this layer structure.

The foregoing optically anisotropic layer is generally obtained by coating a solution of a discotic compound and other compound (additionally, for example, a polymerizable monomer and a photopolymerization initiator) dissolved in a solvent on the oriented layer, drying, heating to the discotic nematic phase forming temperature, polymerizing upon irradiation of UV light or by other means, and then cooling. The discotic nematic liquid crystal phase-solid phase transition temperature of the discotic liquid crystalline compound which is used in the invention is preferably from 70 to 300° C., and especially preferably from 70 to 170° C.

Furthermore, as other compound that the discotic compound to be added in the foregoing optically anisotropic layer, any compound can be used so far as it has compatibility with the discotic compound and can give a preferred change of the tilt angle to the liquid crystalline discotic compound or does not hinder the orientation. Of these, polymerizable monomers (for example, compounds containing a vinyl group, a vinyloxy group, an acryloyl group, or a methacryloyl group), additives for orientation control in the air interface side (for example, fluorine-containing triazine compounds), and polymers (for example, cellulose acetate, cellulose acetate propionate, hydroxypropyl cellulose, and cellulose acetate butyrate) can be enumerated. Such a compound can be generally used in an amount of addition of from 0.1 to 50% by weight; and preferably from 0.1 to 30% by weight to the discotic compound.

The thickness of the optically anisotropic layer is preferably from 0.1 to 10 μm, and more preferably from 0.5 to 5 μm.

A preferred embodiment of the viewing angle enlarging film is constructed of a cellulose acylate film as a transparent base material film, an oriented layer provided thereon, and an optically anisotropic layer made of a discotic liquid crystal as formed on the subject oriented layer, in which the optically anisotropic layer is crosslinked upon irradiation with WV light.

Furthermore, in addition to the above, in the case where the viewing angle enlarging film is combined with the polarizing plate of the invention, for example, it can be preferably carried out that a retardation plate having an optical axis in a direction crossing the plate surface to exhibit anisotropy against birefringence is laminated as described in JP-A-07-198942; and that a rage of dimensional change of the protective film is made substantially equal to a rate of dimensional change of the optically anisotropic layer as described in JP-A-2002-258052. Furthermore, it can be preferably carried out that the water content of the polarizing plate to be stuck to the viewing angle enlarging film is regulated at not more than 2.4% as described in JP-A-12-258632; and that the contact angle between the surface of the viewing angle enlarging film and water is regulated at not more than 70° as described in JP-A-2002-267839.

The viewing angle enlarging film for liquid crystal cell of an IPS mode is used for optically compensating the liquid crystal molecule which orients parallel to the base material surface and improving a viewing angle characteristic of the crossed transmittance of the polarizing plate at the time of black display in the state that no electrical field is applied. In the IPS mode, black display is revealed in the state that no electrical field is applied, and the transmission axes of a pair of upper and lower polarizing plates are crossed to each other. However, when observed obliquely, the crossed angle of the transmission exes is not 90°, and light leakage is generated, resulting in a lowering of the contrast. When the polarizing plate of the invention is used in a liquid crystal cell of an IPS mode, for the purpose of lowering the light leakage, it is preferably used in combination with a viewing angle enlarging film having an in-plane retardation close to 0 and having retardation in the thickness direction as described in JP-A-10-54982.

The viewing angle enlarging film for liquid crystal cell of an OCB mode is used for optically compensating the liquid crystal molecule which orients vertically in the center of the liquid crystal layer by the application of an electrical field and orients obliquely in the vicinity of the interface of the base material and improve a viewing angle characteristic of black display. When the polarizing plate of the invention is used in a liquid crystal cell of an OCB mode, it is preferably used in combination with a viewing angle enlarging film in which a disc-like liquid crystalline compound is subjected to hybrid orientation as described in U.S. Pat. No. 5,805,253.

The viewing angle enlarging film for liquid crystal cell of a VA mode improves a viewing angle characteristic of black display in the state that the liquid crystal molecule orients vertically to the base material surface in the state that no electrical field is applied. Such a viewing angle enlarging film is preferably used in combination with a film having an in-plane retardation close to 0 and having retardation in the thickness direction as described in U.S. Pat. No. 2,866,372, a film in which a disc-like compound orients parallel to the base material, a film in which stretched films having the same in-plane retardation value are laminated and disposed such that the slow axes are crossed to each other, or a laminate of films made of a rod-like compound such as a liquid crystal molecule for the purpose of preventing deterioration of the crossed transmittance of the polarizing plate in the oblique direction.

(2) Retardation Film

It is preferable that the polarizing plate of the invention has a retardation layer. As the retardation layer in the invention, a λ/4 plate is preferable, and when the polarizing plate of the invention is laminated with a λ/4 plate, it can be used as a circularly polarizing plate. The circularly polarizing plate has a function to convert the incident light into circularly polarized light and is preferably utilized in a reflection type liquid crystal display device, a semi-transmission type liquid crystal display device, or an organic EL element.

In order to obtain substantially complete circularly polarized light in the wavelength range of visible light, it is preferable that the λ/4 plate which is used in the invention is a retardation film having a retardation (Re) of substantially ¼ of the wavelength in the wavelength range of visible light. The "retardation of substantially ¼ of the wavelength in the wavelength range of visible light" means a range which meets the relation in which in the wavelength of from 400 to 700 nm, the longer the wavelength, the larger the retardation is, a retardation value as measured at a wavelength of 450 nm (Re450) is from 80 to 125 nm, and a retardation value as measured at a wavelength of 590 nm (Re590) is from 120 to 160 nm. [(Re590-R450)≧5 nm] is more preferable, and [(Re590-R450)≧10 nm] is especially preferable.

The λ/4 plate which is used in the invention is not particularly limited so far as it meets the foregoing condition. Examples thereof include known λ/4 plates such as λ/4 plates resulting from laminating plural polymer films as described in JP-A-5-27118, JP-A-10-68816, and JP-A-10-90521; λ/4 plates resulting from stretching a single polymer film as described in WO 00/65384 and WO 00/26705; and λ/4 plates having at least one optically anisotropic layer on a polymer film as described in JP-A-2000-284126 and JP-A-2002-31717. Furthermore, the direction of the slow axis of the polymer film and the orientation direction of the optically anisotropic layer can be disposed in an arbitrary direction adaptive with the liquid crystal cell.

In the circularly polarizing plate, though the slow axis of the λ/4 plate and the transmission axis of the foregoing polarizer can be crossed to each other at an arbitrary angle, they are preferably crossed to each other at an angle within the range of 45°±20°. However, the slow axis of the λ/4 plate and the transmission axis of the foregoing polarizer may be crossed to each other at an angle outside the foregoing range.

When the λ/4 plate is constructed by laminating a λ/4 plate and a λ/2 plate, it is preferred to stick the both plates in such a manner that an angle between the in-plane slow axes of the λ/4 plate and the λ/2 plate and the transmission axis of the polarizing plate is 75° and 15°, respectively.

(3) Antireflection Film

The polarizing plate of the invention can be used in combination with an antireflection film.

As the antireflection film, any of a film having a reflectance of about 1.5%, in which only a single layer made of a low refractive index raw material such as a fluorine based polymer is imparted or a film having a reflectance of not more than 1% utilizing multilayered interference of a thin film can be used. In the invention, a construction comprising a transparent support having laminated thereon a low refractive index layer and at least one layer having a refractive index higher than the low refractive index layer (namely, a high refractive index layer and a middle refractive index layer) is preferably used. Antireflection films as described in *Nitto Giho*, Vol. 38, No. 1, May 2000, pages 26 to 28 and JP-A-2002-301783 can also be preferably used.

The refractive index of each of the layers meets the following relation.

(Refractive index of high refractive index layer)>(Refractive index of middle refractive index layer)>(Refractive index of transparent support)>(Refractive index of low refractive index layer)

As the transparent support to be used in the antireflection film, a transparent polymer film which is used in the protective film of the foregoing polarizer can be preferably used.

The refractive index of the low refractive index layer is from 1.20 to 1.55, and preferably from 1.30 to 1.50. The low refractive index layer is preferably used as an outermost layer having scratch resistance or antifouling properties. For the purpose of improving the scratch resistance, it is preferably carried out to impart slipperiness to the surface by using a raw material containing a silicone group or fluorine.

As the fluorine-containing compound, for example, compounds as described in JP-A-9-222503, paragraphs [0018] to [0026]; JP-A-11-38202, paragraphs [0019] to [0030]; JP-A-2001-40284, paragraphs [0027] to [0028]; and JP-A-2000-284102 can be preferably used.

The silicone-containing compound is preferably a compound having a polysiloxane structure, and useful examples thereof include reactive silicones (for example, SILAPLANE (manufactured by Chisso Corporation) and polysiloxanes containing a silanol group on the both terminals thereof (JP-A-11-258403). An organometallic compound such as silane coupling agents and a silane coupling agent containing a specific fluorine-containing hydrocarbon group may be cured by a condensation reaction in the presence of a catalyst (for example, compounds as described in JP-A-58-142958, JP-A-58-147483, JP-A-58-147484, JP-A-9-157582, JP-A-11-106704, JP-A-2000-117902, JP-A-2001-48590, and JP-A-2002-53804).

In the low refractive index layer, a filler (for example, a low refractive index inorganic compound having an average primary particle size of from 1 to 150 nm such as silicon dioxide (silica) and fluorine-containing particles (for example, magnesium fluoride, potassium fluoride, and barium fluoride), and organic fine particles as described in JP-A-11-3820, paragraphs [0020] to [0038]), a silane coupling agent, a lubricant, a surfactant, and the like can be preferably contained as additives other than the foregoing compounds.

Though the low refractive index layer may be formed by a vapor phase method (for example, a vacuum vapor deposition method, a sputtering method, an ion plating method, and a plasma CVD method), it is preferable from the standpoint of cheap production costs that the low refractive index layer is formed by a coating method. As the coating method, a dip coating method, an air knife coating method, a curtain coating method, a roller coating method, a wire bar coating method, a gravure coating method, and a micro gravure method can be preferably employed.

The film thickness of the low refractive index layer is preferably from 30 to 200 nm, more preferably from 50 to 150 nm, and most preferably from 60 to 120 nm.

It is preferable that the middle refractive index layer and the high refractive index layer are each constructed by dispersing a high refractive index inorganic compound superfine particle having an average particle size of not more than 100 nm in a matrix material. As the high refractive index inorganic compound superfine particle, an inorganic compound having a refractive index of 1.65 or more, such as oxides of Ti, Zn, Sb, Sn, Zr, Ce, Ta, La, In, etc. and composite oxides containing such a metal atom, can be preferably used.

Such a superfine particle can be used in an embodiment such as an embodiment of treating the particle surface with a surface treating agent (for example, silane coupling agents as described in JP-A-11-295503, JP-A-11-153703, and JP-A-2000-9908; and anionic compounds or organometallic coupling agents as described in JP-A-2001-310432), an embodiment of taking a core-shell structure using the high refractive index particle as a core (as described in JP-A-2000-166104), and an embodiment of jointly using a specific dispersant (as described in, for example, JP-A-11-153703, U.S. Pat. No. 6,210,858B1, and JP-A-2002-2776069).

As the matrix material, conventionally known thermoplastic resins and curable resin films and the like can be used. Polyfunctional materials as described in JP-A-2000-47004, JP-A-2001-315242, JP-A-2001-31871, JP-A-2001-296401, etc.; and curable films obtained from a metal alkoxide composition as described in JP-A-2001-293818, etc. can also be used.

The refractive index of the high refractive index layer is preferably from 1.70 to 2.20. The thickness of the high refractive index layer is preferably from 5 nm to 10 μm, and more preferably from 10 nm to 1 μm.

The refractive index of the middle refractive index is adjusted such that it is a value between the refractive index of the low refractive index layer and the refractive index of the high refractive index layer. The refractive index of the middle refractive index is preferably from 1.50 to 1.70.

The haze of the antireflection film is preferably not more than 5%, and more preferably not more 3%. Furthermore, the strength of the film is preferably H or more, more preferably 2H or more, and most preferably 3H or more by a pencil hardness test according to JIS K5400.

(4) Luminance Improving Film

The polarizing plate of the invention can be used in combination with a luminance improving film. The luminance improving film has a function to separate circularly polarized light or linearly polarized light, is disposed between the polarizing plate and the backlight, and backwardly reflects or backwardly scatters the one-sided circularly polarized light or linearly polarized light. When the light having been again reflected from the backlight part partially changes the polarization state and comes again into the luminance improving film and the polarizing plate, it is partially transmitted. Thus, by repeating this process, the rate of use of light is improved, and the front luminance is improved by about 1.4 times. As the luminance improving film, an anisotropic reflection system and an anisotropic scattering system are known, and all of them can be combined with the polarizing plate of the invention.

With respect to the anisotropic reflection system, a luminance improving film in which a uniaxially stretched film and an unstretched film are laminated in a multiple manner to make a difference in the refractive index in the stretching direction large, thereby having anisotropy of the reflectance and transmittance is known. There are known a multilayered film system using the principle of a dielectric mirror (as described in WO 95/17691, WO 95/17692, and WO 95/17699) and a cholesteric liquid crystal system (as described in European Patent No. 606,940A2 and JP-A-8-271731). In the invention, DBEF-E, DBEF-D and DBEF-M (all of which are manufactured by 3M) can be preferably used as the luminance improving film of a multilayered system using the principle of a dielectric mirror, and NIPOCS (manufactured by Nitto Denko Corporation) can be preferably used as the luminance improving film of a cholesteric liquid crystal system. With respect to NIPOCS, *Nitto Giho*, Vol. 38, No. 1, May 2000, pages 19 to 21 and the like can be made herein by reference.

Furthermore, it is preferred to use the polarizing plate of the invention in combination with a luminance improving film of an anisotropic scattering system obtained by blending a positive intrinsic birefringent polymer and a negative intrinsic birefringent polymer and uniaxially stretching the blend as described in WO 97/32223, WO 97/32224, WO 97/32225, WO 97/32226, JP-A-9-274108, and JP-A-11-174231. As the luminance improving film of an anisotropic scattering system, DRPF-H (manufactured by 3M) is preferable.

It is preferable that the polarizing plate of the invention and the luminance improving film are used in an embodiment in which the both are stuck to each other via an adhesive or in an integrated body in which the one-sided protective film of the polarizing plate is made to serve as the luminance improving film.

(5) Other Functional Optical Film

It is also preferable that the polarizing plate of the invention is used in additional combination with a functional optical film provided with a hard coat layer, a forward scattering layer, an antiglare layer, a gas barrier layer, a lubricating layer, an antistatic layer, an undercoating layer, a protective layer, etc. Furthermore, it is also preferred to use such a functional layer mutually complexed with the antireflection layer in the foregoing antireflection film or the optically anisotropic layer or the like in the viewing angle compensating film within the same layer. Such a functional layer can be provided on either one surface or the both surfaces of the polarizer side and the opposite surface to the polarizer (the surface closer to the air side) and used.

(5-1) Hard Coat Layer

In order to impart a dynamic strength such as scratch resistance, it is preferably carried out that the polarizing plate of the invention is combined with a functional optical film having a hard coat layer provided on the surface of the transparent support. When the hard coat layer is applied to the foregoing antireflection film and used, it is especially preferred to provide the hard coat layer between the transparent support and the high refractive index layer.

It is preferable that the hard coat layer is formed by a crosslinking reaction of a curable compound by light and/or heat or a polymerization reaction. As a curable functional group, a photopolymerizable functional group is preferable, and as a hydrolyzable functional group-containing organometallic compound, an organic alkoxysilyl compound is preferable. As a specific constructional composition of the hard coat layer, ones described in, for example; JP-A-2002-144913, JP-A-2000-9908, and WO 0/46617 can be preferably used.

The film thickness of the hard coat layer is preferably from 0.2 to 100 μm.

The strength of the hard coat layer is preferably H or more, more preferably 2H or more, and most preferably 3H or more by a pencil hardness test according to JIS K5400. Furthermore, it is preferable that the amount of abrasion of a specimen before and after the test in the Taber test according to JIS K5400 is small as far as possible.

As a material for forming the hard coat layer, an ethylenically unsaturated group-containing compound and a ring opening polymerizable group-containing compound can be used. These compounds can be used alone or in combination. Preferred examples of the ethylenically unsaturated group-containing compound include polyacrylates of a polyol (for example, ethylene glycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate); epoxy acrylates (for example, diacrylate of bisphenol A diglycidyl ether and diacrylate of hexanediol diglycidyl ether); and urethane acrylates obtained by a reaction of a polyisocyanate and a hydroxyl group-containing acrylate such as hydroxyethyl acrylate. Furthermore, EB-600, EB-40, EB-140, EB-1150, EB-1290K, IRR214, EB-2220, TMPTA, and TMPTMA (all of which are manufactured by Daicel-UCB Company, Ltd.); UV-630 and UV-1700B (all of which are manufactured by Nippon Synthetic Chemical Industry Co., Ltd.); and the like are enumerated as commercially available products.

Furthermore, preferred examples of the ring opening polymerizable group-containing compound include glycidyl ethers (for example, ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl cyanurate, sorbitol tetraglycidyl ether, pentaerythritol tetraglycidyl ether, polyglycidyl ether of a cresol novolak resin, and polyglycidyl ether of a phenol novolak resin); alicyclic epoxys (for example, CELLOXIDE 2021P, CELLOXIDE 2081, EPOLEAD GT-301, EPOLEAD GT-401, and EHPE3150CE (all of which are manufactured by Daicel Chemical Industries, Ltd.), and polycyclohexyl epoxy methyl ether of a phenol novolak resin); and oxetanes (for example, OXT-121, OXT-221, OX-SQ, and PNOX-1009 (all of which are manufactured by Toagosei Co., Ltd.)). Besides, polymers of glycidyl (meth)acrylate or copolymers of glycidyl (meth)acrylate and a copolymerizable monomer can be used in the hard coat layer.

For the purposes of lowering hardening and shrinkage of the hard coat layer, improving adhesion to a base material, and lowering curl of a hard coat-treated article of the invention, it is preferably carried out that a crosslinked fine particle such as an oxide fine particle of silicon, titanium, zirconium, aluminum, etc. and an organic fine particle (for example, a crosslinked particles of polyethylene, polystyrene, a poly(meth)acrylic acid ester, polydimethylsiloxane, etc. and a crosslinked rubber fine particle of SBR, NBR, etc.) is added in the hard coat layer. The average particle size of such a crosslinked fine particle is preferably from 1 nm to 20,000 nm. Furthermore, the crosslinked fine particle is not particularly limited with respect to its shape, and examples of the shape include spherical, rod-like, acicular, and tabular shapes. The amount of addition of the fine particle is preferably not more than 60% by volume, and more preferably not more than 40% by volume of the hard coat layer after hardening.

In the case where the foregoing inorganic fine particle is added, since the inorganic fine particle is in general poor in compatibility with a binder polymer, it is preferably carried out that the inorganic fine particle is subjected to a surface treatment with a surface treating agent containing a metal such as silicon, aluminum, and titanium and having a functional group such as an alkoxide group, a carboxyl group, a sulfonic acid group, and a phosphonic acid group.

It is preferable that the hard coat layer is hardened using heat or active energy rays. Above all, it is more preferred to use active energy rays such as radiations, gamma rays, alpha rays, electron beams, and ultraviolet rays. Taking into account the stability and productivity, it is especially preferred to use electron beams or ultraviolet rays. In the case of performing hardening by heat, taking into account the heat resistance of the plastic itself, the heating temperature is preferably not higher than 140° C., and more preferably not higher than 100° C.

(5-2) Forward Scattering Layer

The forward scattering layer is used for improving the viewing angle characteristic in the up and down and right and left directions (hue and luminance distribution) in applying the polarizing plate of the invention in a liquid crystal display device. In the invention, a construction in which fine particles having a different refractive index are dispersed in a binder is preferable. For example, a construction in which a coefficient of forward scattering is specified as described in JP-A-11-38208; a construction in which a relative refractive index between a transparent resin and a fine particle is made to fall within a specified range as described in JP-A-2000-199809; and a construction in which the haze value is specified at 40% or more as described in JP-A-2002-107512 can be employed. For the purpose of controlling the viewing angle characteristic of haze, the polarizing plate of the invention can also be preferably combined with "LUMISTRY" as described on pages 31 to 39 of Technical Report "Photo-functional Films" of Sumitomo Chemical Co., Ltd. and used.

(5-3) Antiglare Layer

The antiglare layer is used for the purpose of scattering reflected light to prevent glare. An antiglare function is obtained by forming irregularities on the most superficial surface (display side) of the liquid crystal display device. The haze of an optical film having an antiglare function is preferably from 3 to 30%, more preferably from 5 to 20%, and most preferably from 7 to 20%.

As a method for forming irregularities on the film surface, for example, a method for adding a fine particle to form irregularities on the film surface (see, for example, JP-A-2000-271878); a method for adding a small amount (from 0.1 to 50% by weight) of a relatively large particle (particle size: 0.05 to 2 μm) to form a film having an irregular surface (see, for example, JP-A-2000-281410, JP-A-2000-95893, JP-A-2001-100004, and JP-A-2001-281407); a method for physically transferring an irregular shape onto the film surface (for example, an embossing method as described in JP-A-63-278839, JP-A-11-183710, and JP-A-2000-275401); and the like can be preferably employed.

(Liquid Crystal Display Device Using Polarizing Plate)

Next, a liquid crystal display device in which the polarizing plate of the invention is used will be described.

Figure 2:
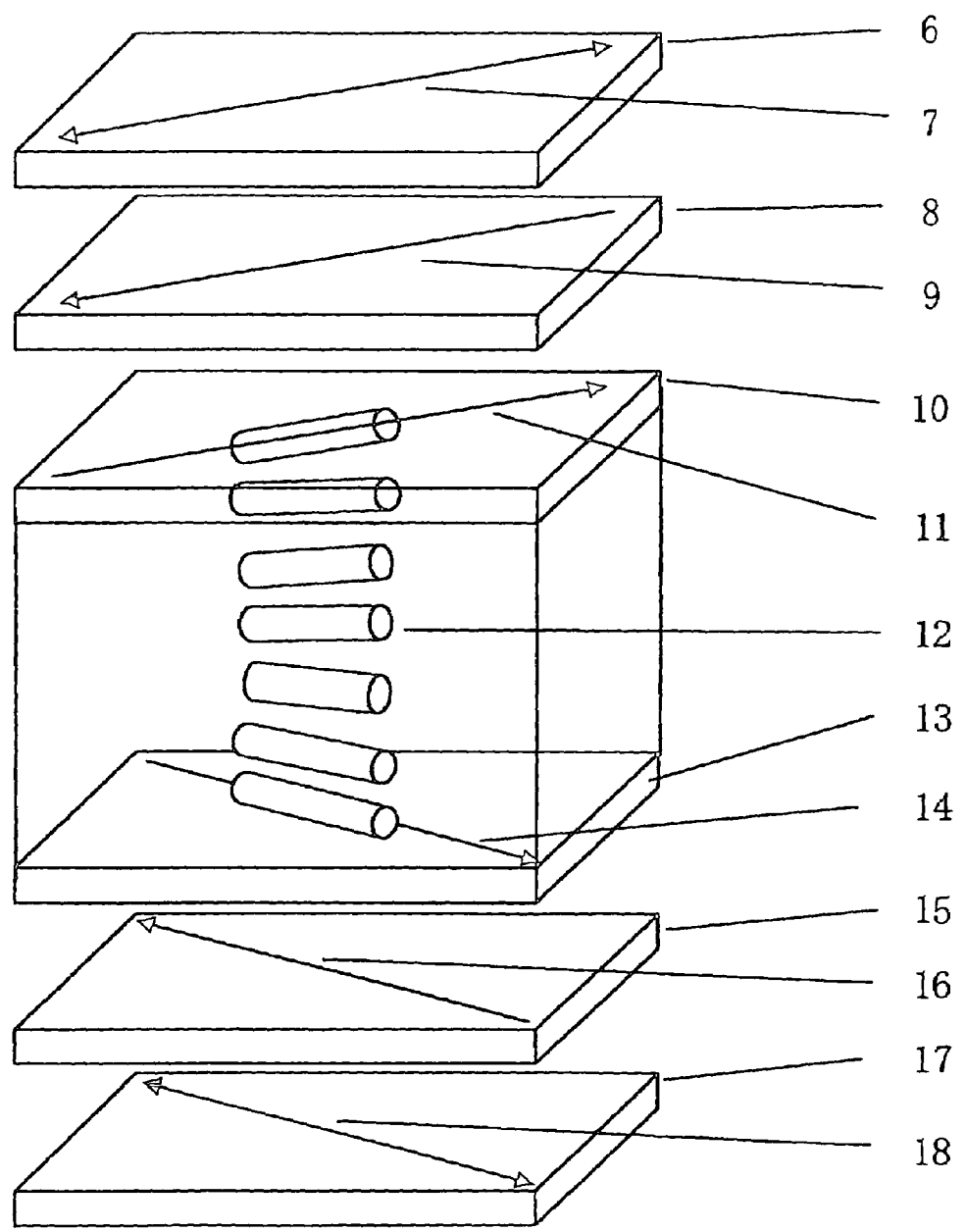
FIG. 2 is one example of a liquid crystal display device in which the polarizing plate of the invention is used.

FIG. 2 is one example of a liquid crystal display device in which the polarizing plate of the invention is used.

The liquid crystal display device as illustrated in FIG. 2 has a liquid crystal cell (10 to 14) and an upper polarizing plate 6 and a lower polarizing plate 17 disposed so as to interpose the liquid crystal cell (10 to 14) therebetween. Though the polarizing plate is interposed by a polarizer and a pair of transparent protective films, in FIG. 2, the polarizing plate is shown as an integrated polarizing plate, and a detail structure is omitted. The liquid crystal cell is composed of a liquid crystal layer which is formed of an upper substrate 10 and a lower substrate 13 and a liquid crystal molecule 12 as interposed therebetween. The liquid crystal cell is classified into various display modes such as TN (twisted nematic), IPS (in-plane switching), OCB (optically compensatory band), VA (vertically aligned), and ECB (electrically controlled birefringence) modes depending upon a difference in the orientation state of the liquid crystal molecule which performs an ON/OFF display. The polarizing plate of the invention can be used in any display mode regardless of the transmission type or reflection type.

An oriented film (not shown) is formed on the surface of each of the substrates 10 and 13 coming into contact with the liquid crystal molecule 12 (hereinafter sometimes referred to as "inner surface"), and the orientation of the liquid crystal molecule 12 in the state that no electrical field is applied or in the state that a low electrical field is applied is controlled by a rubbing treatment as applied on the oriented film or the like. Furthermore, a transparent electrode (not shown) capable of applying an electrical field to the liquid crystal layer composed of the liquid crystal molecule 12 is formed on the inner surface of each of the substrates 10 and 13.

Rubbing of a TN mode is applied in such a manner that the rubbing directions are crossed to each other on the upper and lower substrates, and the size of a tilt angle can be controlled by the strength and number of rubbing. The oriented film is formed by coating a polyimide film and then baking it. The size of a twist angle of the liquid crystal layer is determined by a crossing angle in the rubbing directions on the upper and lower substrates and a chiral agent to be added to a liquid crystal material. In order that the twist angle may become 90°, a chiral agent having a pitch of about 60 μm is added.

Incidentally, the twist angle is set up in the vicinity of 90° (from 85 to 95°) in the case of monitors of notebook PC and PC and liquid crystal display devices for TV and is set up at from 0 to 70° in the case of use as a reflection type display device such as mobile telephones. Furthermore, in an IPS mode or ECB mode, the twist angle is 0°. In the IPS mode, an electrode is disposed only on the lower substrate 13, and an electrical field parallel to the substrate surface is applied. Moreover, in an OCB mode, a twist angle does not exist, and a tilt angle is made large; and in a VA mode, the liquid crystal molecule 12 orients vertically to the upper and lower substrates.

Here, the size of the product (Δnd) of the thickness (d) of the liquid crystal layer and the anisotropy (Δn) changes the brightness at the time of white display. For this reason, in order to obtain the maximum brightness, its range is set up at every display mode.

In general, by performing lamination so as to make a crossing angle between an absorption axis 7 of the upper polarizing plate 6 and an absorption axis 18 of the lower polarizing plate 17 substantially orthogonal, a high contrast is obtained. In the liquid crystal cell, a crossing angle between the absorption axis 7 of the upper polarizing plate 6 and the rubbing direction of the upper substrate 10 varies depending upon the liquid crystal display mode. In the TN mode and IPS mode, the crossing angle is generally set up either parallel or vertical. In the OCB mode and ECB mode, the crossing angle is often set up at 45°. However, for the purpose of adjusting the color tone of the display color or viewing angle, the optimum value is different in every display mode, and therefore, the crossing angle is not limited to the foregoing ranges.

The liquid crystal display device in which the polarizing plate of the invention is used is not limited to the construction as shown in FIG. 2 but may contain other members. For example, a color filter may be disposed between the liquid crystal cell and the polarizer. Furthermore, viewing angle enlarging filters 8 and 15 as described previously can be separately disposed between the liquid crystal cell and the polarizing plate. The polarizing plates 6 and 17 and the viewing angle enlarging films 8 and 15 may be disposed in a laminated state as stuck with an adhesive or may be disposed as a so-called integrated elliptical polarizing plate in which the one-sided protective film in the side of the liquid crystal cell is used for enlarging the viewing angle.

Furthermore, in the case where the liquid crystal display device in which the polarizing plate of the invention is used as a transmission type, a cold cathode or hot cathode fluorescent tube, or a backlight using, as a light source, a luminescent diode, a field emission element, or an electroluminescent element can be disposed in the back side. Moreover, the liquid crystal display device in which the polarizing plate of the invention is used may be of a reflection type. In such case, only one polarizing plate may be disposed in the viewing side, and a reflection film is disposed in the back side of the liquid crystal cell or on the inner surface of the lower substrate of the liquid crystal cell. As a matter of course, a front light using the foregoing light source may be provided in the viewing side of the liquid crystal cell.

EXAMPLES

Example 1

(Preparation of Cellulose Acylate Film 1)

<Preparation of Cellulose Acetate Solution>

The following composition was charged into a mixing tank, and the respective components were dissolved with stirring to prepare a cellulose acylate solution A.

| Composition of cellulose acylate solution A | |
|---|---|
| Cellulose acetate having a degree of acetylation of 2.79: | 100.0 parts by weight |
| Triphenyl phosphate (plasticizer): | 8.0 parts by weight |
| Biphenyl phosphate (plasticizer): | 4.0 parts by weight |
| Methylene chloride (first solvent): | 402.0 parts by weight |
| Methanol (second solvent): | 60.0 parts by weight |

<Preparation of Matting Agent Solution>

The following composition was charged into a dispersing machine, and the respective components were dissolved with stirring to prepare a matting agent solution.

| Composition of matting agent solution | |
|---|---|
| Silica particle having an average particle size of 20 nm (AEROSIL R972, manufactured by Nippon Aerosil Co., Ltd.): | 2.0 parts by weight |
| Methylene chloride (first solvent): | 75.0 parts by weight |
| Methanol (second solvent): | 12.7 parts by weight |
| Cellulose acylate solution A: | 10.3 parts by weight |

<Preparation of Retardation Exhibiting Agent Solution>

The following composition was charged into a mixing tank, and the respective components were stirred while heating and dissolved to prepare a retardation exhibiting agent solution.

| Composition retardation exhibiting agent solution | |
|---|---|
| Retardation exhibiting agent (B-5): | 20.0 parts by weight |
| Methylene chloride (first solvent): | 58.4 parts by weight |
| Methanol (second solvent): | 8.7 parts by weight |
| Cellulose acylate solution A: | 12.8 parts by weight |

1.3 parts by weight of the matting agent solution and 2.9 parts by weight of the retardation exhibiting agent solution were each filtered and then mixed using an in-line mixer. 96.1 parts by weight of the cellulose acylate solution A was further added and mixed using an in-line mixer, and the mixture was cast using a band casting machine. A film with a residual solvent content of 33% was released from the band. The film was laterally stretched to an extent of 120% at a temperature of the atmosphere of 140° C. by using a tenter and then held at 140° C. for 30 seconds. The residual solvent content at the time of start of stretching was 10%. Thereafter, a clip was eliminated, and the resulting film was dried at 130° C. for 40 minutes to produce a cellulose acylate film. The resulting cellulose acylate film had a residual solvent content of 0.1% and a film thickness of 82 μm.

(Preparation of Cellulose Acylate Films 2 to 4)

Cellulose acylate films 2 to 4 were prepared in the same manner, except for changing the kind of the cellulose acylate, the kind of the retardation exhibiting agent, the addition amount, and the stretching magnification to the contents as shown in Table 1.

Example 2

(Preparation of Cellulose Acylate Film 5)

<Preparation of Cellulose Acetate Solution>

The following composition was charged into a mixing tank, and the respective components were dissolved with stirring to prepare a cellulose acylate solution B.

| Composition of cellulose acylate solution B | |
|---|---|
| Cellulose acylate having a degree of acetylation of 1.95 and a degree of propionylation of 0.90: | 100.0 parts by weight |
| Triphenyl phosphate (plasticizer): | 9.0 parts by weight |
| Ethylphthalylethyl glycolate (plasticizer): | 3.5 parts by weight |
| Methylene chloride (first solvent): | 362.0 parts by weight |
| Ethanol (second solvent): | 100.0 parts by weight |

<Preparation of Matting Agent Solution>

The following composition was charged into a dispersing machine, and the respective components were dissolved with stirring to prepare a matting agent solution.

| Composition of matting agent solution | |
|---|---|
| Silica particle having an average particle size of 20 nm (AEROSIL R972, manufactured by Nippon Aerosil Co., Ltd.): | 2.0 parts by weight |
| Methylene chloride (first solvent): | 75.0 parts by weight |
| Methanol (second solvent): | 12.7 parts by weight |
| Cellulose acylate solution A: | 10.3 parts by weight |

<Preparation of Additive Solution>

The following composition was charged into a mixing tank, and the respective components were stirred while heating and dissolved to prepare an additive solution.

| Composition of retardation exhibiting agent solution | |
|---|---|
| Retardation exhibiting agent (B-5): | 7.5 parts by weight |
| Ultraviolet absorber (A): | 4.0 parts by weight |
| Ultraviolet absorber (B): | 2.0 parts by weight |
| Methylene chloride (first solvent): | 75.2 parts by weight |
| Ethanol (second solvent): | 11.2 parts by weight |

1.3 parts by weight of the matting agent solution and 6.0 parts by weight of the retardation exhibiting agent solution were each filtered and then mixed using an in-line mixer. 92.7 parts by weight of the cellulose acylate solution B was further added and mixed using an in-line mixer, and the mixture was cast using a band casting machine. A film with a residual solvent content of 36% was released from the band. The film was laterally stretched to an extent of 130% at a temperature of the atmosphere of 130° C. by using a tenter and then held at 140° C. for 30 seconds. The residual solvent content at the time of start of stretching was 15%. Thereafter, a clip was eliminated, and the resulting film was dried at 130° C. for 40 minutes to produce a cellulose acylate film. The resulting cellulose acylate film had a residual solvent content of 0.1% and a film thickness of 90 μm.

(Preparation of Cellulose Acylate Films 6 to 7)

Cellulose acylate films 6 to 7 were prepared in the same manner, except for changing the kind of the cellulose acylate, the kind of the retardation exhibiting agent, the addition amount, and the stretching magnification to the contents as shown in Table 1.

Example 3

(Preparation of Cellulose Acylate Film 8)

<Preparation of Cellulose Acetate Solution C>

The following composition was charged into a mixing tank, and the respective components were dissolved with stirring to prepare a cellulose acylate solution C.

| Composition of cellulose acylate solution C | |
|---|---|
| Cellulose acylate having a degree of acetylation of 1.80 and a degree of propionylation of 0.90: | 100.0 parts by weight |
| Triphenyl phosphate (plasticizer): | 9.0 parts by weight |
| Ethylphthalylethyl glycolate (plasticizer): | 3.5 parts by weight |
| Methylene chloride (first solvent): | 442.0 parts by weight |
| Ethanol (second solvent): | 20.0 parts by weight |

<Preparation of Matting Agent Solution>

The following composition was charged into a dispersing machine, and the respective components were dissolved with stirring to prepare a matting agent solution.

| Composition of matting agent solution | |
|---|---|
| Silica particle having an average particle size of 20 nm (AEROSIL R972, manufactured by Nippon Aerosil Co., Ltd.): | 2.0 parts by weight |
| Methylene chloride (first solvent): | 83.0 parts by weight |
| Ethanol (second solvent): | 4.7 parts by weight |
| Cellulose acylate solution C: | 10.3 parts by weight |

<Preparation of Retardation Exhibiting Agent Solution>

The following composition was charged into a mixing tank, and the respective components were stirred while heating and dissolved to prepare an additive solution.

| Composition of retardation exhibiting agent solution | |
|---|---|
| Ultraviolet absorber (A): | 14.0 parts by weight |
| Ultraviolet absorber (B): | 6.0 parts by weight |
| Retardation exhibiting agent (Illustrative Compound I-2 of JP-A-2003-344655): | 10.5 parts by weight |
| Methylene chloride (first solvent): | 54.4 parts by weight |
| Ethanol (second solvent): | 2.3 parts by weight |
| Cellulose acylate solution C: | 12.8 parts by weight |

Ultraviolet absorber (A)

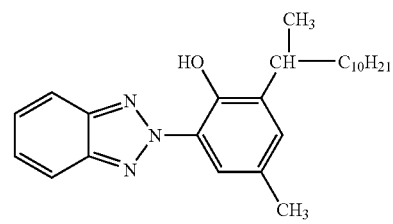

-continued

Ultraviolet absorber (B)

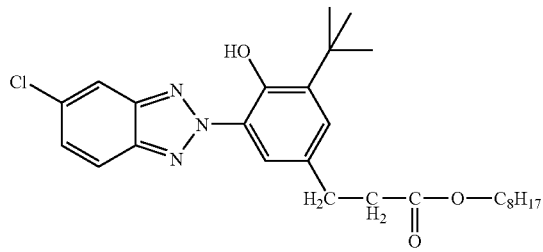

94.5 parts by weight of the cellulose acylate solution C, 1.3 parts by weight of the matting agent solution, and 3.4 parts by weight of the retardation exhibiting agent solution were each filtered and then mixed, and the mixture was cast using a band casting machine. A film with a residual solvent content of 31% was released from the band. The film was laterally stretched to an extent of 130% at a temperature of the atmosphere of 160° C. and a stretching rate of 6.0%/sec for 5 seconds by using a tenter and then relieved to 125%, followed by holding at 140° C. for 30 seconds. The residual solvent content at the time of start of stretching was 15%. Thereafter, a clip was eliminated, and the resulting film was dried at 130° C. for 40 minutes to produce a cellulose acylate film. The resulting cellulose acylate film had a residual solvent content of 0.2% and a film thickness of 83 μm.

Example 4

(Preparation of Cellulose Acylate Film 9)

A cellulose acylate film 9 was prepared in the same manner as in Example 1, except that in the cellulose acylate film 1, after mixing the matting agent solution and the cellulose acylate solution A, the retardation exhibiting agent solution was further mixed.

Example 5

(Preparation of Cellulose Acylate Film 10)

A cellulose acylate film 10 was prepared in the same manner as in Example 1, except that in the cellulose acylate film 2, after mixing the matting agent solution and the cellulose acylate solution A, the retardation exhibiting agent solution was further mixed.

TABLE 1

| Sample No. | Cellulose acylate | | | Retardation raising agent 1 | | Retardation raising agent 2 | | Stretching magnification | Remark |
| | Total acyl substitution degree | Acetyl substitution degree | Propionyl substitution degree | Kind | Addition amount (g/100 g of film) | Kind | Addition amount (g/100 g of film) | | |
| --- | --- | --- | --- | --- | --- | --- | --- | --- | --- |
| Cellulose acylate film 1 | 2.79 | 2.79 | 0.00 | B-1 | 3.4 | — | — | 120% | Invention |
| Cellulose acylate film 2 | 2.75 | 2.75 | 0.00 | B-6 | 1.2 | A-5 | 0.6 | 125% | Invention |
| Cellulose acylate film 3 | 2.92 | 2.92 | 0.00 | Illustrative Compound I-(2) of JP-A-2003-344655 | 8.0 | — | — | 135% | Comparison |
| Cellulose acylate film 4 | 2.92 | 2.92 | 0.00 | Illustrative Compound I-(2) of JP-A-2003-344655 | 8.0 | — | — | 110% | Comparison |
| Cellulose acylate film 5 | 2.85 | 1.95 | 0.90 | B-2 | 2.8 | — | — | 115% | Invention |
| Cellulose acylate film 6 | 2.85 | 1.90 | 0.95 | B-6 | 1.2 | A-5 | 0.6 | 120% | Invention |
| Cellulose acylate film 7 | 2.71 | 1.81 | 0.90 | B-1 | 0.5 | B-7 | 0.5 | 120% | Invention |
| Cellulose acylate film 8 | 2.70 | 1.80 | 0.90 | Illustrative Compound I-(2) of JP-A-2003-344655 | 2.1 | — | — | 180% | Comparison |
| Cellulose acylate film 9 | 2.79 | 2.79 | 0.00 | B-1 | 3.4 | — | — | 120% | Comparison |
| Cellulose acylate film 10 | 2.75 | 2.75 | 0.00 | B-6 | 1.2 | A-5 | 0.6 | 125% | Comparison |

(Measurement of Optical Characteristic)

Furthermore, Re and Rth were measured at 25° C. and 60% by an automatic birefringence analyzer (KOBRA-21ADH, manufactured by Oji Science Instruments). The measurement wavelength was set up at 590 nm.

(Measurement of Haze)

A haze of a film sample (40 mm×80 mm) was measured at 25° C. and 60% RH using a haze meter (HGM-2DP, manufactured by Suga Test Instruments Co., Ltd.) according to JIS K7136.

(Measurement of Coefficient of Thermal Expansion)

A coefficient of thermal expansion of the film was measured in terms of a dimensional change per 1° C. by elevating the temperature from 30° C. to 80° C. at a rate of 3° C./min under a load of 0.04 N by using TMA2940 (manufactured by TA Instrument).

(X-ray Measurement)

A degree of orientation by X-ray diffraction was determined in the following manner.

X-rays were emitted at 40 kV-36 mA by RINT RAPID (manufactured by Rigaku Corporation) using a Cu tubular lamp as an X-ray source. A collimator of 0.8 mmf was used, and a film sample was fixed by using a transmitted sample table. Furthermore, the exposure time was set up at 600 seconds.

(Measurement of Average Secondary Particle Size of Matting Agent)

With respect to the average secondary particle size of the matting agent, particles in a film were observed by a scanning electron microscope, and a diameter of a circle which is circumscribed on the particle was defined as the particle size. Furthermore, 200 parts are observed by changing the place, and an average value thereof was defined as the average particle size.

The results obtained are shown in Table 2.

It is understood from the results as shown in Table 2 that the cellulose acylate film samples of the invention are low in all of the haze value and coefficient of thermal expansion and direction dependency thereof and fall within the defined ranges, while the comparative cellulose film samples are inferior in either one or both of these physical properties.

Example 6

(Saponification Treatment)

Each of the cellulose acylate films 1 to 10 was dipped in a 2.3 N sodium hydroxide aqueous solution at 60° C. for one minute. The film was then washed in a water washing bath tank at room temperature and neutralized with 0.1 N sulfuric acid at 30° C. The film was again washed in a water washing bath tank at room temperature and further dried by warm air at 110° C. The surface of the cellulose acylate film was thus saponified.

In addition, a commercially available cellulose acetate film (FUJITAC TD80UF, manufactured by Fuji Photo Film Co., Ltd.) was saponified under the same condition and provided for the preparation of a sample of Example 7.

(Preparation of Polarizing Plate)

Iodine was absorbed onto a stretched polyvinyl alcohol film to prepare a polarizer. The cellulose acylate film 1 having been subjected to a saponification treatment in Example 6 was stuck on one side of the polarizer using a polyvinyl alcohol based adhesive. The transmission axis of the polarizer and the slow axis of the cellulose acylate film were disposed parallel to each other.

In addition, the FUJITAC TD80UF having been subjected to a saponification treatment in Example 6 was stuck on the opposite side of the polarizer using a polyvinyl alcohol based adhesive. There was thus prepared a polarizing plate (1).

Each of the cellulose acylate films 2 to 10 having been subjected to a saponification treatment in Example 6 was stuck on one side of the polarizer such that the transmission axis of the polarizer and the slow axis of the cellulose acylate film were disposed parallel to each other.

TABLE 2

| Sample No. | Cellulose acylate | | | Average particle size of matting agent (μm) | Haze | Coefficient of thermal expansion (ppm) | | Degree of orientation P | Remark |
| --- | --- | --- | --- | --- | --- | --- | --- | --- | --- |
| | Re | Rth | Rth/Re ratio | | | MD | TD | | |
| Cellulose acylate film 1 | 81 | 201 | 2.48 | 0.2 | 0.50 | 66 | 42 | 0.31 | Invention |
| Cellulose acylate film 2 | 53 | 130 | 2.45 | 0.3 | 0.55 | 70 | 45 | 0.32 | Invention |
| Cellulose acylate film 3 | 44 | 140 | 3.18 | 1.1 | 1.50 | 80 | 46 | 0.31 | Comparison |
| Cellulose acylate film 4 | 35 | 160 | 4.57 | 0.5 | 0.75 | 82 | 47 | 0.17 | Comparison |
| Cellulose acylate film 5 | 46 | 133 | 2.89 | 0.4 | 0.65 | 95 | 67 | 0.31 | Invention |
| Cellulose acylate film 6 | 51 | 128 | 2.51 | 0.4 | 0.66 | 94 | 60 | 0.32 | Invention |
| Cellulose acylate film 7 | 91 | 192 | 2.11 | 0.5 | 0.70 | 92 | 61 | 0.31 | Invention |
| Cellulose acylate film 8 | 46 | 126 | 2.74 | 1.1 | 1.80 | 115 | 65 | 0.52 | Comparison |
| Cellulose acylate film 9 | 61 | 198 | 3.25 | 1.4 | 2.10 | 92 | 72 | 0.27 | Comparison |
| Cellulose acylate film 10 | 42 | 129 | 3.07 | 1.2 | 2.03 | 104 | 72 | 0.28 | Comparison |

In addition, the FUJITAC TD80UF having been subjected to a saponification treatment was stuck on the opposite side of the polarizer using a polyvinyl alcohol based adhesive. There were thus prepared polarizing plates (2) to (10).

Example 7

[Preparation and Valuation 1 of VA Liquid Crystal Display Device]

1% by weight of octadecyldimethylammonium chloride (coupling agent) was added to a 3% by weight polyvinyl alcohol aqueous solution. The mixture was spin coated on an ITO electrode-provided glass substrate, thermally treated at 160° C., and then subjected to a rubbing treatment, thereby forming a vertically oriented film. The rubbing treatment was carried out such that the rubbing directions were opposite to each other on the two glass substrates. The two glass substrates were faced at each other such that a cell gap (d) became 5 μm. A liquid crystalline compound (Δn: 0.08) containing, as the major component, an ester based compound and an ethane based compound was injected into the cell gap to prepare a vertically oriented liquid crystal cell. The product of Δn and d was 400 nm.

Each of the polarizing plates 2 to 6, 8 and 10 as prepared in Example 6 was previously subjected to humidity control under a temperature and relative humidity condition at 25° C. and 60%, packed by a bag having been subjected to a dehumidification treatment, and then allowed to stand for 3 days. The bag was a packaging material composed of a laminated structure of polyethylene terephthalate and polyethylene and had a water vapor permeability of $1 \times 10^{-5}$ g/m$^2$·day.

The polarizing plate 2 was taken out under the circumstance at 25° C. and 60% and stuck on the both surfaces of the thus prepared vertically oriented liquid crystal cell using an adhesive sheet, thereby preparing a liquid crystal display device 2.

The polarizing plates 3 to 6, 8 and 10 were similarly treated to prepare liquid crystal display devices 3 to 6, 8 and 10.

With respect to each of the thus prepared liquid crystal display devices, the contrast was measured at the front, at azimuths of 45° and −45°, and at polar angles of 45° and −45°, respectively at the time of black display. The results obtained are shown in Table 3.

Example 8

[Preparation and Evaluation 2 of VA Liquid Crystal Display Device]

Figure 3:
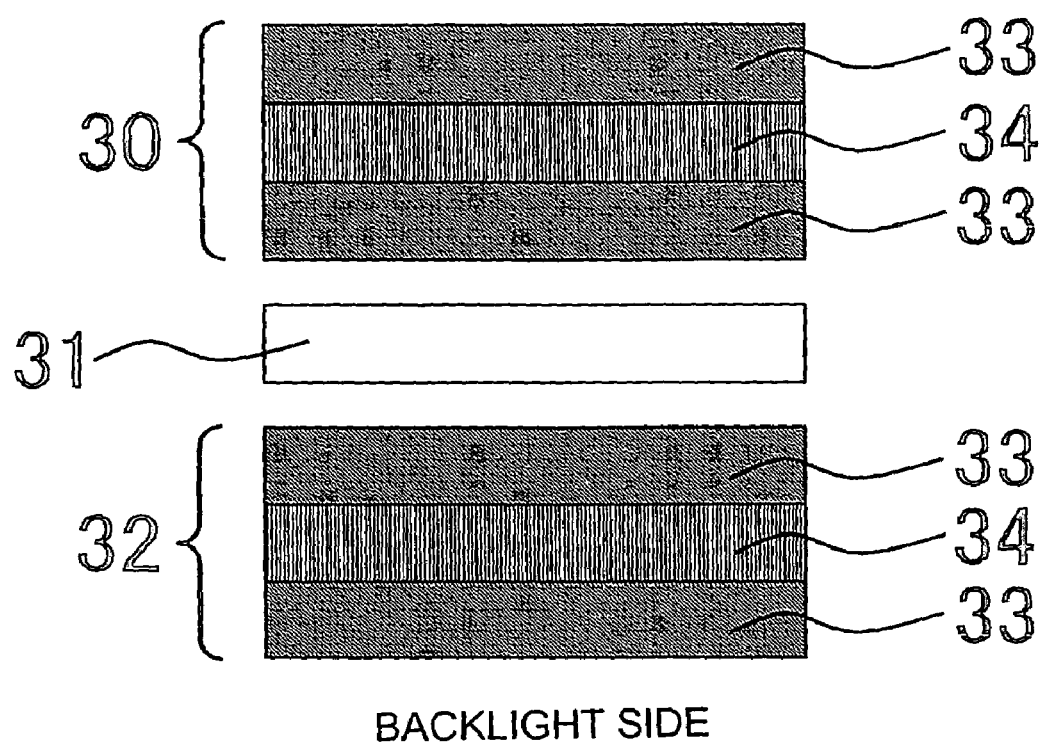
FIG. 3 is an outline constructional view of a liquid crystal display device using a vertically oriented liquid crystal cell as prepared using the polarizing plate of the invention.

A liquid crystal display device as shown in FIG. 3 was prepared. That is, an upper polarizing plate, a liquid crystal cell of a VA mode (upper substrate, liquid crystal layer and lower substrate), and a lower polarizing plate were laminated from the viewing direction (upper direction), and a backlight light source was further disposed. In the following example, a commercially available polarizing plate (HLC2-5618) was used as the upper polarizing plate, and the polarizing plate of the invention was used as the lower polarizing plate.

<Preparation of Liquid Crystal Cell>

A liquid crystal cell was prepared by defining a cell gap between the substrates at 3.6 μm, injecting dropwise a liquid crystal material having negative dielectric anisotropy (MLC6608, manufactured by Merck & Co. Inc.) between the substrates, and then sealing to form a liquid crystal layer between the substrates. A retardation of the liquid crystal layer (namely, the product (Δnd) of the thickness (d) (μm) of the foregoing liquid crystal layer and the refractive index anisotropy (Δn) was set up at 300 nm. Incidentally, the liquid crystal material was oriented such that it vertically oriented.

By using, as an upper polarizing plate (30) of the liquid crystal display device (FIG. 3) using the foregoing vertically oriented liquid crystal cell, a commercially available super-high contrast product (HLC2-5618, manufactured by Sanritz Corporation) and, as a lower polarizing plate (32 ), the polarizing plate 1 as prepared in Example 6, the both were stuck on each of the viewer side and the backlight side one by one using a an adhesive such that the cellulose acylate film 1 of the invention was positioned in the side of a liquid crystal cell (31). The polarizing plates were disposed in the crossed Nicols configuration such that the transmission axis of the polarizing plate in the viewer side was disposed in the up and down direction, while the transmission axis of the polarizing plate in the backlight side was disposed in the right and left direction. With respect to the polarizing plate (9), a liquid crystal display device was prepared in the same manner.

With respect to each of the thus prepared liquid crystal display devices, the contrast was measured at the front, at

TABLE 3

| Liquid crystal display device | Polarizing plate | Front contrast | Contrast in the inclined direction | | | | Front contrast after continuous lighting for 1,000 hours | Remark |
|---|---|---|---|---|---|---|---|---|
| | | | Azimuth: 45° | Azimuth: −45° | Polar angle: 45° | Polar angle: −45° | | |
| 2 | 2 | 740 | 110 | 111 | 108 | 107 | 710 | Invention |
| 3 | 3 | 580 | 64 | 63 | 62 | 63 | 520 | Comparison |
| 4 | 4 | 620 | 45 | 46 | 43 | 42 | 550 | Comparison |
| 5 | 5 | 690 | 100 | 101 | 97 | 96 | 660 | Invention |
| 6 | 6 | 680 | 94 | 93 | 89 | 88 | 650 | Invention |
| 8 | 8 | 530 | 58 | 59 | 57 | 56 | 400 | Comparison |
| 10 | 10 | 545 | 56 | 57 | 52 | 51 | 470 | Comparison |

It is understood from the results as shown in Table 3 that the liquid crystal display devices using the cellulose acylate film of the invention have high front contrast and less viewing angle dependency even after continuous lighting for 1,000 hours and therefore, are preferable.

azimuths of 45° and −45°, and at polar angles of 45° and −45°, respectively at the time of black display. As a result, it was noted that the liquid crystal display device using the polarizing plate (1) of the invention has high front contrast and less viewing angle dependency and is preferable and is markedly excellent as compared with the comparative liquid crystal display device using the polarizing plate (9).

Example 9

(Preparation of Cellulose Acylate Film 11)

<Preparation of Cellulose Acetate Solution>

The following composition was charged into a mixing tank, and the respective components were dissolved with stirring to prepare a cellulose acylate solution A.

| Composition of cellulose acylate solution D | |
|---|---|
| Cellulose acetate having a degree of acetylation of 2.80: | 100.0 parts by weight |
| Triphenyl phosphate (plasticizer): | 7.6 parts by weight |
| Biphenyl phosphate (plasticizer): | 3.8 parts by weight |
| Methylene chloride (first solvent): | 414.0 parts by weight |
| Methanol (second solvent): | 61.6 parts by weight |

<Preparation of Matting Agent Solution>

The following composition was charged into a dispersing machine, and the respective components were dissolved with stirring to prepare a matting agent solution.

| Composition of matting agent solution | |
|---|---|
| Silica particle having an average particle size of 20 nm (AEROSIL R972, manufactured by Nippon Aerosil Co., Ltd.): | 2.0 parts by weight |
| Methylene chloride (first solvent): | 74.4 parts by weight |
| Methanol (second solvent): | 11.1 parts by weight |
| Cellulose acylate solution D: | 12.4 parts by weight |

<Preparation of Retardation Exhibiting Agent Solution>

The following composition was charged into a mixing tank, and the respective components were stirred while heating and dissolved to prepare a retardation exhibiting agent solution.

| Composition of retardation exhibiting agent solution | |
|---|---|
| Retardation exhibiting agent (A-107): | 20.0 parts by weight |
| Methylene chloride (first solvent): | 57.3 parts by weight |
| Methanol (second solvent): | 8.6 parts by weight |
| Cellulose acylate solution D: | 14.1 parts by weight |

1.5 parts by weight of the matting agent solution and 2.6 parts by weight of the retardation exhibiting agent solution were each filtered and then mixed using an in-line mixer. 96.0 parts by weight of the cellulose acylate solution D was further added and mixed using an in-line mixer, and the mixture was cast using a band casting machine. The mixture was dried by blowing a drying air stream (average temperature 140° C. and average flow rate 180 m/min in the first half of the support (band); average temperature 60° C. and average flow rate 140 m/min in the second half of the support). Then a film with a residual solvent content of 27% was released from the band. The film was laterally stretched to an extent of 113% at a temperature of the atmosphere of 143° C. by using a tenter. The residual solvent content at the time of start of stretching was 20%, while the residual solvent content at the completion of stretching was 4%. Thereafter, a clip was eliminated, and the resulting film was dried at 130° C. for 40 minutes to produce a cellulose acylate film 11. The resulting cellulose acylate film had a residual solvent content of 0.1% and a film thickness of 80 μm.

(Preparation of Cellulose Acylate Films 12 to 17)

Cellulose acylate films 12 to 17 were prepared in the same manner, except for changing the kind of the cellulose acylate, the kind of the retardation exhibiting agent, the addition amount, and the stretching magnification to the contents as shown in Table 4.

TABLE 4

| | Cellulose acylate | | | Retardation exhibiting agent | | Cellulose acylate content (wt. %) in matting agent solution | Cellulose acylate content (wt. %) in retardation exhibiting agent solution | Cellulose | Solid content in casting solution | Tg of film | Stretching temp. (° C.) | Residual solvent content at start of stretching | Residual solvent content at completion of stretching |
|---|---|---|---|---|---|---|---|---|---|---|---|---|---|
| Sample no. | Total acyl subst. degree | Acetyl subst. degree | Propionyl subst. degree | Type | Addition amount (g/100 g of film) | | | acylate content (wt. %) in dope | | | | | |
| Cellulose acylate film 11 | 2.80 | 2.80 | 0.00 | A-107 | 3.0 | 2.1 | 2.4 | 17 | 19 | 149 | 143 | 20 | 4 |
| Cellulose acylate film 12 | 2.85 | 1.85 | 0.90 | A-107 | 2.0 | 2.1 | 2.4 | 19 | 21 | 140 | 130 | 10 | 5 |
| Cellulose acylate film 13 | 2.80 | 2.80 | 0.00 | A-107 | 3.0 | 2.1 | 2.4 | 15 | 17 | 149 | 143 | 31 | 9 |
| Cellulose acylate film 14 | 2.80 | 2.80 | 0.00 | A-107 | 3.0 | 2.1 | 2.4 | 15 | 17 | 149 | 143 | 36 | 13 |
| Cellulose acylate film 15 | 2.80 | 2.80 | 0.90 | A-107 | 3.0 | 2.1 | 2.4 | 15 | 17 | 149 | 155 | 36 | 13 |

TABLE 4-continued

| Cellulose acylate film 16 | 2.80 | 2.80 | 0.95 | A-107 | 3.0 | 0.0 | 0.0 | 15 | 17 | 149 | 155 | 36 | 13 |
| Cellulose acylate film 17 | 2.80 | 2.80 | 0.90 | Illustrative Compound I-(2) of JP-A-2003-344655 | 9.0 | 0.0 | 0.0 | 15 | 17 | 149 | 160 | 36 | 13 |

| | | First half of support | | Second half of support | | |
| --- | --- | --- | --- | --- | --- | --- |
| Sample no. | Stretching magnification | Average temp. (° C.) | Average flow rate (m/min) | Average temp. (° C.) | Average flow rate (m/min) | Remarks |
| Cellulose acylate film 11 | 113% | 140 | 10 | 60 | 2 | Invention |
| Cellulose acylate film 12 | 115% | 140 | 15 | 60 | 5 | Invention |
| Cellulose acylate film 13 | 113% | 140 | 10 | 60 | 2 | Invention |
| Cellulose acylate film 14 | 113% | 100 | 0.5 | 120 | 11 | Invention |
| Cellulose acylate film 15 | 113% | 100 | 0.5 | 120 | 11 | Comparison |
| Cellulose acylate film 16 | 113% | 100 | 0.5 | 120 | 11 | Comparison |
| Cellulose acylate film 17 | 140% | 100 | 0.5 | 120 | 11 | Comparison |

Evaluation of Cellulose Acylate Film

The retardation, in-plane orientation P, haze and secondary average particle side of the matting agent were measured as in Example 5.

<Measurement of Tg>

An unstretched film sample (5 mm×30 mm) was conditioned at 25° C. 60% RH for 2 hours or longer and then the glass transition temperature was measured with a dynamic viscoelasticity meter (VIBRON:DVA-225 manufactured by IT KEISOKUSEIGYO K.K.) at a sample length between grips of 20 mm, at a heating rate of 2° C./min, over a measurement temperature range of from 30° C. to 200° C. and at a frequency of 1 Hz. In a graph having storage elastic modulus as the logarithmic ordinate and temperature (° C.) as the linear abscissa, a line 1 (solid region) and a line 2 (glass transition region) showing a rapid decrease in storage elastic modulus observed at the conversion from the solid region to the glass transition region were drawn.

Thus, the intersection of the lines 1 and 2 indicated the temperature from which the storage elastic modulus was rapidly lowered and softening of the film starts. Since the conversion into the glass transition region started at this point, the temperature was referred to as the glass transition temperature Tg (dynamic viscoelasticity).

<Observation Under Confocal Laser Scanning Microscope>

Observation under confocal laser scanning microscope is conducted by using VL2000D manufactured by Lasertec Co., Ltd. GaN solid bule laser having a wavelength of 410 nm is used for the laser light source. For the improveent of contrast and spatial resolution, ×150 lens (NA=1.25) for use of immersion observation is used as objective lens, and immersion observation is conducted.

Under a confocal laser scanning microscope, fine particles of 0.2 μm to 3 μm in the major axis direction size were counted in three areas (10 μm×10 μm) and the average of the three areas was calculated.

<Crystallization Index>

By using RAPID R-AIXS (manufactured by Rigaku Corporation), X-rays were emitted at 50 kV-100 mA with the use of Cu as a rotational counter cathode. A collimator of 0.8 mm in diameter was used, and a film sample was fixed by using a transmitted sample table. Furthermore, the exposure time was set up at 180 seconds. Thus, the diffraction intensities at 2θ of 25° and 27° were read out and the crystallization index was determined in accordance with the following expression A:

$$\text{Crystallization index} = (\text{X-ray diffraction intensity at } 2\theta \text{ of } 27°)/(\text{X-ray diffraction intensity at } 2\theta \text{ of } 25°). \quad (A)$$

Table 5 shows the measurement data. Thus, it can be understood that the cellulose acylate films 11 to 14 of the invention are favorable because of exhibiting low haze and high retardation compared with the comparative cellulose acylate films 15 to 17.

TABLE 5

| Sample no. | Re (nm) | Rth (nm) | Re/Rth | Average secondary particle size of matting agent | No. of fine particles per 100 μm² under confocal laser scanning microscope | In-plane orientation | Crystallization index | Haze | |
|---|---|---|---|---|---|---|---|---|---|
| Cellulose acylate film 11 | 70 | 200 | 2.9 | 0.18 | 4 | 0.19 | 0.92 | 0.42 | Invention |
| Cellulose acylate film 12 | 47 | 135 | 2.9 | 0.19 | 5 | 0.22 | 0.89 | 0.47 | Invention |
| Cellulose acylate film 13 | 68 | 196 | 2.9 | 0.20 | 8 | 0.21 | 0.99 | 0.61 | Invention |
| Cellulose acylate film 14 | 67 | 182 | 2.7 | 0.29 | 17 | 0.19 | 1.05 | 0.72 | Invention |
| Cellulose acylate film 15 | 61 | 170 | 2.8 | 0.28 | 24 | 0.17 | 1.10 | 0.84 | Comparison |
| Cellulose acylate film 16 | 60 | 172 | 2.9 | 0.44 | 32 | 0.17 | 1.10 | 1.05 | Comparison |
| Cellulose acylate film 17 | 71 | 203 | 2.9 | 0.43 | 41 | 0.32 | 1.11 | 1.45 | Comparison |

According to the invention, it is possible to provide a liquid crystal display device which has high front contrast and small viewing angle dependency of contrast and which even upon lighting for a long period of time, can keep high image quality.

The entire disclosure of each and every foreign patent application from which the benefit of foreign priority has been claimed in the present application is incorporated herein by reference, as if fully set forth.

What is claimed is:

1. A process for producing a cellulose acylate film, comprising:
   casting a dope having a solid content of from 17% by weight to 25% by weight on a support, and
   drying the resulting material immediately after the casting by blowing an air stream at a speed of 1 m/min or above,
   wherein the cellulose acylate film comprises an additive and a matting agent having an average primary particle size of from 1 nm to 20 nm, wherein the matting agent has an average secondary particle size of from 0.05 μm to 1.05 μm,
   wherein the cellulose acylate film has a crystallization index represented by expression (A) of from 0.80 to 1.10, Crystallization index=(X-ray diffraction intensity at 2θ of 27°)/(X-ray diffraction intensity at 2θ of 25°), (A)

wherein the cellulose acylate film has an in-plane orientation degree, as determined by X-ray diffraction of from 0.20 to 0.50, and
   wherein the cellulose acylate film has an in-plane retardation Re and a retardation Rth in a thickness direction at a wavelength of 590 nm, which satisfy expressions (I) to (III); and a haze of from 0.05 to 0.7%:

20≦Re≦50 Expression (I)

70≦Rth≦200 Expression (II)

1.0≦Rth/Re≦3.0 Expression (III)

wherein each of Re and Rth is a value at 25° C. and 60% RH, and has a unit of nm.

2. The process according to claim 1, wherein the film has a coefficient of thermal expansion of from 20 ppm/° C. to 100 ppm/° C.

3. The process according to claim 1, wherein the film has not more than 20 fine particles of 0.2μ to 3μ per 1 mm² when observed under a confocal laser scanning microscope.

4. The process according to claim 1, further comprising:
   mixing the additive with a matting agent solution, so as to form a first mixture, wherein the first mixture comprises a cellulose acylate in a concentration of 0.01% by weight or more but less than 5% by weight;
   mixing the first mixture with a dope solution comprising a cellulose acylate in a concentration of from 5% by weight to 35% by weight, so as to form a second mixture;
   casting the second mixture, so as to form a film; and
   stretching the film in a ratio of from 1% to 100% in at least one of a conveyance direction and a widthwise direction.

5. The process according to claim 4,
   wherein the additive to be preliminarily mixed with the matting agent solution is at least one member selected from the group consisting of an ultraviolet absorber, a plasticizer, a retardation exhibiting agent, a retardation lowering agent and a degradation preventing agent.

6. The process according to claim 1, wherein a drying temperature on the support and a flow rate satisfy a relationship:

[Average temperature of drying air (° C.)×Average flow rate of drying air (m/min)] in a first half of support>[Average temperature of drying air (° C.)×Average flow rate of drying air (m/min)] in a second half of support.

7. The process according to claim 1, further comprising:
   stretching the film at a temperature from (glass transition temperature of film with solvent content less than 0.5%−

30° C.) to (glass transition temperature of film with solvent content less than 0.5%+10° C.) and a residual solvent content represented by a formula below of from 1% by weight to 30% by weight:

(Residual solvent content)=(Weight of solvent contained in film)/(Total film weight).

8. The process according to claim 1, wherein the film comprises a retardation exhibiting agent,
wherein the retardation exhibiting agent is a rod-like retardation exhibiting agent represented by formula (B):

Ar$^1$-L$^1$- X-L$^2$-Ar$^2$    Formula (B)

wherein Ar$^1$ and Ar$^2$ each independently represents an aryl group or an aromatic hetero ring;
L$^1$ and L$^2$ each independently represents —C(=O)O— or —C(=O)NR—;
R represents a hydrogen atom or an alkyl group; and
X represents formula (2) or formula (3):

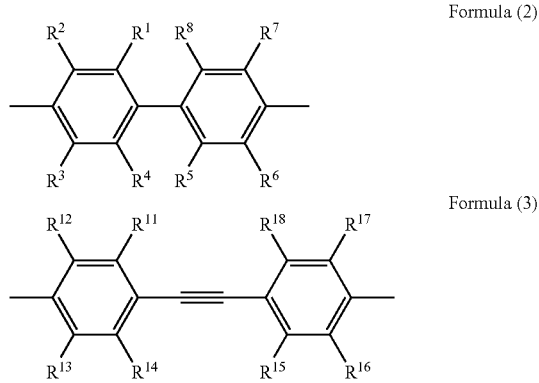

wherein R$^1$, R$^2$, R$^3$, R$^4$, R$^5$, R$^6$, R$^7$ and R$^8$ each independently represents a hydrogen atom or a substituent; and R$^{11}$, R$^{12}$, R$^{13}$, R$^{14}$, R$^{15}$, R$^{16}$, R$^{17}$ and R$^{18}$ each independently represents a hydrogen atom or a substituent.

9. The process according to claim 1, wherein the film comprises a retardation exhibiting agent,
wherein the retardation exhibiting agent is a rod-like retardation exhibiting agent represented by formula (4):

Formula (4)

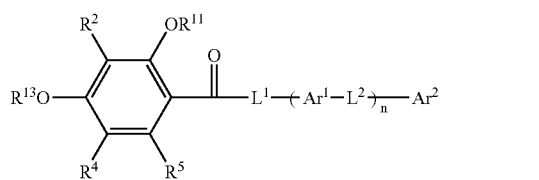

wherein R$^2$, R$^4$ and R$^5$ each independently represents a hydrogen atom or a substituent;
R$^{11}$ and R$^{13}$ each independently represents a hydrogen atom or an alkyl group;
L$^1$ and L$^2$ each independently represents a single bond or a divalent linking group;
Ar$^1$ represents an arylene group or a divalent aromatic hetero ring;
Ar$^2$ represents an aryl group or a monovalent aromatic hetero ring; and n is an integer of 3 or more, provided that L$^2$'s and Ar$^1$'s in a plural number n may be either the same or different, R$^{11}$ and R$^{13}$ may be either the same or different, and an alkyl group represented by R$^{13}$ has no hetero atom.

10. The process according to claim 1,
wherein a cellulose acylate comprised in the cellulose acylate film is a cellulose acetate having a degree of acetylation of from 2.5 to 2.95.

11. The process according to claim 1,
wherein a cellulose acylate comprised in the cellulose acylate film comprises an acetyl group and an acyl group having from 3 to 22 carbon atoms as acyl groups, and a degree of substitution A of the acetyl group and a degree of substitution B of the acyl group having from 3 to 22 carbon atoms are satisfied with ranges of expressions (VII) and (VIII):

$2.0 \leq (A+B) \leq 3.0$    Expression (VII)

$0.1 \leq A \leq 2.5$.    Expression (VIII)

12. The process according to claim 1, the process comprising:
mixing a retardation exhibiting agent solution comprising a retardation exhibiting agent with a matting agent solution, so as to form a first mixture, wherein the first mixture comprises a cellulose acylate in a concentration of 0.01% by weight or more but less than 5% by weight;
mixing the first mixture with a dope solution comprising a cellulose acylate in a concentration of from 5% by weight to 35% by weight, so as to form a second mixture;
casting the second mixture, so as to form a film; and
stretching the film in a ratio of from 1% to 100% in at least one of a conveyance direction and a widthwise direction.

13. A process for producing a cellulose acylate film, comprising:
casting a dope having a solid content of from 17% by weight to 25% by weight on a support, and
drying the resulting material immediately after the casting by blowing an air stream at a speed of 1 m/mm or above,
wherein the cellulose acylate film comprises an additive and a matting agent having an average primary particle size of from 1 nm to 20 nm, wherein the matting agent has an average secondary particle size of from 0.05 μm to 1.05 μm,
wherein the cellulose acylate film has a crystallization index represented by expression (A) of from 0.80 to 1.10, Crystallization index=(X-ray diffraction intensity at 2θ of 27°)/(X-ray diffraction intensity at 2θ of 25°),    (A)

wherein the cellulose acylate film has an in-plane orientation degree, as determined by X-ray diffraction of from 0.20 to 0.50, and
wherein the cellulose acylate film has: an in-plane retardation Re and a retardation Rth in a thickness direction at a wavelength of 590 nm, which satisfy expressions (IV) to (VI); and a haze of from 0.05 to 0.7%:

$50 \leq Re \leq 200$    Expression (IV)

$150 \leq Rth \leq 400$    Expression (V)

$2.0 \leq Rth/Re \leq 10.0$    Expression (VI)

wherein each of Re and Rth is a value at 25° C. and 60% RH, and has a unit of nm.

14. The process according to claim 13, wherein the film has a coefficient of thermal expansion of from 20 ppm/° C. to 100 ppm/° C.

15. The process according to claim 13, wherein the film has not more than 20 fine particles of 0.2λ to 3μ per 1 mm² when observed under a confocal laser scanning microscope.

16. The process according to claim 13, further comprising:
mixing an additive with a matting agent solution, so as to form a first mixture, wherein the first mixture comprises a cellulose acylate in a concentration of 0.01% by weight or more but less than 5% by weight;
mixing the first mixture with a dope solution comprising a cellulose acylate in a concentration of from 5% by weight to 35% by weight, so as to form a second mixture;
casting the second mixture, so as to form a film; and
stretching the film in a ratio of from 1% to 100% in at least one of a conveyance direction and a widthwise direction.

17. The process according to claim 16,
wherein the additive to be preliminarily mixed with the matting agent solution is at least one member selected from the group consisting of an ultraviolet absorber, a plasticizer, a retardation exhibiting agent, a retardation lowering agent and a degradation preventing agent.

18. The process according to claim 13, wherein a drying temperature on the support and a flow rate satisfy a relationship:

[Average temperature of drying air (° C.)×Average flow rate of drying air (m/min)] in a first half of support>[Average temperature of drying air (° C.)×Average flow rate of drying air (m/min)]in a second half of support.

19. The process according to claim 13, further comprising:
stretching the film at a temperature from (glass transition temperature of film with solvent content less than 0.5%−30° C.) to (glass transition temperature of film with solvent content less than 0.5%+10° C.) and a residual solvent content represented by a formula below of from 1% by weight to 30% by weight:

(Residual solvent content)=(Weight of solvent contained in film)/(Total film weight).

20. The process according to claim 13, wherein the film comprises a retardation exhibiting agent,
wherein the retardation exhibiting agent is a rod-like retardation exhibiting agent represented by formula (B):

$Ar^1-L^1-X-L^2-Ar^2$     Formula (B)

wherein $Ar^1$ and $Ar^2$ each independently represents an aryl group or an aromatic hetero ring;
$L^1$ and $L^2$ each independently represents —C(=O)O— or —C(=O)NR—;
R represents a hydrogen atom or an alkyl group; and
X represents formula (2) or formula (3):

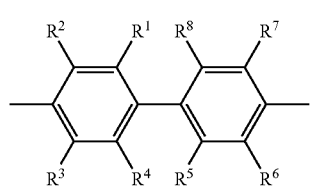

Formula (2)

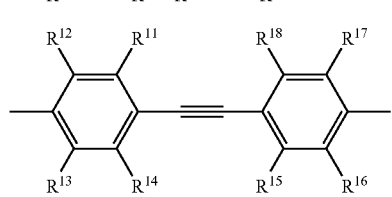

Formula (3)

wherein $R^1$, $R^2$, $R^3$, $R^4$, $R^5$, $R^6$, $R^7$ and $R^8$ each independently represents a hydrogen atom or a substituent; and
$R^{11}$, $R^{12}$, $R^{13}$, $R^{14}$, $R^{15}$, $R^{16}$, $R^{17}$ and $R^{18}$ each independently represents a hydrogen atom or a substituent.

21. The process according to claim 13, which the film comprises a retardation exhibiting agent,
wherein the retardation exhibiting agent is a rod-like retardation exhibiting agent represented by formula (4):

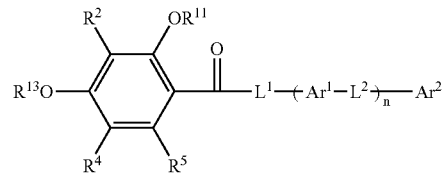

Formula (4)

wherein $R^2$, $R^4$ and $R^5$ each independently represents a hydrogen atom or a substituent;
$R^{11}$ and $R^{13}$ each independently represents a hydrogen atom or an alkyl group;
$L^1$ and $L^2$ each independently represents a single bond or a divalent linking group;
$Ar^1$ represents an arylene group or a divalent aromatic hetero ring;
$Ar^2$ represents an aryl group or a monovalent aromatic hetero ring; and
n is an integer of 3 or more, provided that $L^2$'s and $Ar^1$'s in a plural number n may be either the same or different, $R^{11}$ and $R^{13}$ may be either the same or different, and an alkyl group represented by $R^{13}$ has no hetero atom.

22. The process according to claim 13,
wherein a cellulose acylate comprised in the cellulose acylate film is a cellulose acetate having a degree of acetylation of from 2.5 to 2.95.

23. The process according to claim 13,
wherein a cellulose acylate comprised in the cellulose acylate film comprises an acetyl group and an acyl group having from 3 to 22 carbon atoms as acyl groups, and a degree of substitution A of the acetyl group and a degree of substitution B of the acyl group having from 3 to 22 carbon atoms are satisfied with ranges of expressions (VII) and (VIII):

$2.0 \leq (A+B) \leq 3.0$     Expression (VII)

$0.1 \leq A \leq 2.5$.     Expression (VIII)

24. The process according to claim 13, the process further comprising:
mixing a retardation exhibiting agent solution comprising a retardation exhibiting agent with a matting agent solution, so as to form a first mixture, wherein the first mixture comprises a cellulose acylate in a concentration of 0.01% by weight or more but less than 5% by weight;
mixing the first mixture with a dope solution comprising a cellulose acylate in a concentration of from 5% by weight to 35% by weight, so as to form a second mixture;
casting the second mixture, so as to form a film; and
stretching the film in a ratio of from 1% to 100% in at least one of a conveyance direction and a widthwise direction.

* * * * *